(12) United States Patent
Anjo et al.

(10) Patent No.: US 7,337,260 B2
(45) Date of Patent: Feb. 26, 2008

(54) BUS SYSTEM AND INFORMATION PROCESSING SYSTEM INCLUDING BUS SYSTEM

(75) Inventors: Kenichiro Anjo, Kanagawa (JP); Atsushi Okamura, Kanagawa (JP)

(73) Assignee: NEC Electronics Corporation (JP)

( * ) Notice: Subject to any disclaimer, the term of this patent is extended or adjusted under 35 U.S.C. 154(b) by 333 days.

(21) Appl. No.: 10/405,258

(22) Filed: Apr. 1, 2003

(65) Prior Publication Data
US 2003/0191884 A1    Oct. 9, 2003

(30) Foreign Application Priority Data
Apr. 2, 2002    (JP)    ............... 2002/100573

(51) Int. Cl.
*G06F 13/40*    (2006.01)
(52) U.S. Cl. ................................... 710/307
(58) Field of Classification Search ........... 710/307, 710/66
See application file for complete search history.

(56) References Cited

U.S. PATENT DOCUMENTS

| | | | | |
|---|---|---|---|---|
| 4,831,514 | A * | 5/1989 | Turlakov et al. | 710/66 |
| 5,148,351 | A * | 9/1992 | Patel | 361/707 |
| 5,224,213 | A * | 6/1993 | Dieffenderfer et al. | 710/53 |
| 5,363,494 | A * | 11/1994 | Kudou | 710/307 |
| 5,408,678 | A * | 4/1995 | Kato et al. | 710/60 |
| 5,414,820 | A * | 5/1995 | McFarland et al. | 710/307 |
| 5,530,891 | A * | 6/1996 | Gephardt | 710/8 |
| 5,613,078 | A * | 3/1997 | Kishigami | 710/307 |
| 5,627,976 | A * | 5/1997 | McFarland et al. | 710/309 |
| 5,664,122 | A * | 9/1997 | Rabe et al. | 710/307 |
| 5,687,381 | A * | 11/1997 | Swanstrom et al. | 710/269 |
| 5,706,477 | A * | 1/1998 | Goto | 703/14 |
| 5,748,917 | A * | 5/1998 | Krein et al. | 710/307 |

(Continued)

FOREIGN PATENT DOCUMENTS

EP    817090 A2 *    1/1998

(Continued)

OTHER PUBLICATIONS

Japanese Office Action issued Sep. 6, 2005 in connection with corresponding Japanese patent application No. 2002-100573.

(Continued)

*Primary Examiner*—Paul R. Myers
(74) *Attorney, Agent, or Firm*—Ostrolenk, Faber, Gerb & Soffen, LLP

(57) ABSTRACT

In a bus connection circuit for connecting buses having different bit widths, number of clock cycles can be reduced, and hardware amount can be reduced. The bus connection circuit connects buses of mutually different bit widths having control lines and data lines connected to a bus master unit and bus slave unit. The control command lines of the buses are connected to a common control command bus to control command information on the buses. The data lines of the buses are connected via a data conversion unit to perform bit width conversion between the buses. An arbitration circuit is provided to perform arbitration of bus right for the buses in response arbitration request. Upon transfer of data between the buses, by obtaining of bus right by sender side bus, write access and rear access between buses is performed.

8 Claims, 39 Drawing Sheets

U.S. PATENT DOCUMENTS

| | | | | |
|---|---|---|---|---|
| 5,761,454 | A | * | 6/1998 | Adusumilli et al. ........ 710/311 |
| 5,835,741 | A | * | 11/1998 | Elkhoury et al. ........... 710/310 |
| 5,854,638 | A | * | 12/1998 | Tung ........................... 345/542 |
| 5,857,080 | A | * | 1/1999 | Jander et al. ................ 710/315 |
| 5,911,053 | A | * | 6/1999 | Pawlowski et al. ......... 710/307 |
| 5,920,891 | A | * | 7/1999 | Steinbach et al. .......... 711/146 |
| 6,101,565 | A | * | 8/2000 | Nishtala et al. ............. 710/307 |
| 6,728,822 | B1 | * | 4/2004 | Sugawara et al. ........... 710/311 |
| 6,742,063 | B1 | * | 5/2004 | Hellum et al. ................ 710/66 |

FOREIGN PATENT DOCUMENTS

| | | | | |
|---|---|---|---|---|
| JP | 4-246757 | | | 9/1992 |
| JP | 4-280347 | | | 10/1992 |
| JP | 05250309 | A | * | 9/1993 |
| JP | 6-4465 | | | 1/1994 |
| JP | 06089257 | A | * | 3/1994 |
| JP | 9-153009 | | | 6/1997 |
| JP | 9-223104 | | | 8/1997 |
| JP | 10-21186 | | | 1/1998 |
| JP | 10-254819 | | | 9/1998 |
| JP | 2000-311132 | | | 11/2000 |
| JP | 2000311132 | A | * | 11/2000 |
| JP | 2001-14270 | | | 1/2001 |
| JP | 2001-60181 | | | 3/2001 |
| KP | 07-325667 | | | 12/1995 |

OTHER PUBLICATIONS

English translation of relevant parts of Japanese Office Action submitted in lieu of statement of relevancy of teachings of prior art to instant application.

Japanese Office Action issued Dec. 19, 2006 in connection with corresponding Japanese patent application No. 2002-100573.

English translation of relevant parts of Japanese Office Action submitted in lieu of statement of relevancy of teachings of prior art to instant application, unknown date.

Japanese Office Action issued Sep. 6, 2005 in connection with corresponding Japanese patent application No. 2002-100573.

English translation of relevant parts of Japanese Office Action submitted in lieu of statement of relevancy of teachings of prior art to instant application, unknown date.

* cited by examiner

Fig.12

| BIT POSITION | MEANING |
|---|---|
| CMD [0] | READ ACCESS : 1<br>WRITE ACCESS : 0 |
| CMD [3:1] | TRANSFER SIZE<br>000 : 4 BYTES<br>001 : 8 BYTES<br>010 : 16 BYTES<br>011 : 32 BYTES<br>100 : 64 BYTES<br>101 : 128 BYTES<br>110 : 256 BYTES<br>111 : 512 BYTES |
| CMD [7:4] | OTHER COMMAND |

RELATED ART

BUS SYSTEM AND INFORMATION PROCESSING SYSTEM INCLUDING BUS SYSTEM

CROSS REFERENCE TO THE RELATED APPLICATION

The present application has been filed with claiming priority based on Japanese Patent Application No. 2000-100573, filed on Apr. 2, 2002. Disclosure of the above-identified Japanese Patent Application are herein incorporated by reference.

BACKGROUND OF THE INVENTION

1. Field of the Invention

The present invention relates generally to a bus system and an information processing system including the bus system. More particularly, the invention relates to a bus system and an information processing system using control command line in common between a plurality of buses having different bit widths and having a data conversion unit performing data transfer between buses with conversion of bit widths.

2. Description of the Related Art

In recent years, attention has been attracted to a method for shortening a design period of LSI and reducing development cost of LSI by connecting circuit blocks developed in the past as intellectual property (IP) or design resource core.

Since each of such circuit blocks is frequently developed independently of each other, there should present difference in bus width and/or input/output interface between the blocks. Accordingly, in order to establish connection between the blocks, a technology for accommodating such difference of the bus width or the input/output interface is needed.

As an interface circuit accommodating difference of the interface, a bridge circuit disclosed in Japanese Patent Application Laid-Open No. 2000-311132 is employed, for example.

As shown in FIG. 39, a bus connection circuit employing the bridge circuit has a first bus 1001 including a 64 bit data line and a control command line, a second bus 1002 including a 32 bit data line and a control command line, a bus bridge circuit 1003 connected between the bus 1001 and the bus 1002, bus master units 1004 and 1005 having 64 bit data line connected to the first bus 1001, bus slave units 1006 and 1007 having 64 bit data line, bus master units 1008 and 1009 having 32 bit data line connected to the second bus 1002, bus slave units 1010 and 1011 having 32 bit data line, an arbitration circuit 1012 on the side of the first bus 1001 and an arbitration circuit 1013 on the side of the second bus 1002.

Operation of the conventional bus connection circuit will be discussed hereinafter with reference to FIG. 39.

It should be noted that while there are non-split transfer continuously performing command transfer and data transfer and split transfer performing command transfer and data transfer discontinuously as data transfer system, discussion will be given hereinafter in terms of split transfer.

The bus master unit 1004 is responsive to a read command or address output from an external master unit (not shown), such as CPU and so forth, to output an arbitration request signal to the arbitration circuit 1012 in order to obtain bus right. The arbitration circuit 1012 performs arbitration and thereafter provides bus right of the first bus 1001 to the bus master unit 1004 by outputting an arbitration grant signal.

The bus master unit 1004 obtaining the bus right outputs the read command, address and device ID (number uniquely assigned for each connected master) to the first bus 1001 via the control command line to release the bus right.

The bus bridge circuit 1003 receives read command, address and device ID output from the first bus 1001 for detecting that the read command is for the bus slave unit 1011 based on address. Since the bus slave unit 1011 is connected to the second bus 1002, the bus bridge circuit 1003 outputs the arbitration request signal to the arbitration circuit 1013 in order to obtain bus right for the second bus 1002. The arbitration circuit 1013 provides bus right for the second bus 1002 to the bus bridge circuit 1003 by outputting an arbitration grant signal after arbitration.

The bus bridge circuit 1003 obtaining the bus right outputs read command, address and device ID to the second bus 1002 to release the bus right for the second bus 1002.

The bus slave unit 1011 detects that the address indicates own unit, receives the read command and transfers the read command to the external slave unit (not shown) connected to the bus slave unit 1011. The external slave unit receiving the read command performs process on the basis of read command to output read data to the bus slave unit 1011.

The bus slave unit 1011 receiving the read data outputs an arbitration request signal to the arbitration circuit 1013 in order to obtain bus right for the second bus 1002. The arbitration circuit 1013 provides bus right for the second bus 1002 to the bus slave unit 1011 by outputting the arbitration grant signal after performing arbitration.

The bus slave unit 1011 obtaining the bus right outputs read data and device ID to the second bus 1002 to release bus right for the second bus 1002. The bus bridge circuit 1003 detects data output to the bus master unit 1004 on the basis of device ID output to the second bus 1002. The arbitration circuit 1012 performs arbitration to provide bus right for the first bus 1001 by outputting the arbitration grant signal.

The bus bridge circuit 1003 obtaining the bus right converts received read data of 32 bit width into data of 64 bit width to release bus right for the first bus 1001 by outputting the converted data together with device ID to the first bus.

Since device ID on the first bus 1001 matches with own device ID, the bus master unit 1004 takes read data on the first bus 1001 and outputs taken data to the external master unit.

Thus, non-split transfer based on read command is executed.

In case of split transfer based on write command, operation is performed as follows.

The bus master unit 1004 releases bus right for the first bus 1001 by outputting write command, address and write data.

The bus bridge circuit 1003 receives 64 bit write data converts 64 bit write data into 32 bit write data after obtaining bus right for the second bus 1002 and releases bus right of the second bus 1002 by outputting converted 32 bit write data together with write command and address to the second bus 1002.

The bus slave unit 1011 receives the write command and write data for transferring to the external slave unit. The external slave unit performs writing operation of the write data on the basis of the write command.

In case of non-split transfer, since the bus slave units 1006, 1007, 1010 and 1011 are not required to obtain bus right, discussion will be given as an arbitration request line and an arbitration grant line are not present between each bus slave unit and arbitration circuits 1012 and 1013 in FIG. 39.

In case of the non-split transfer based on read command, releasing of bus right for the first bus 1001 by the bus master unit 1004 is not performed until reception of read data from the bus slave unit 1011. Also, releasing of bus right for the second bus 1002 by the bus bridge circuit 1003 is not performed until reception of read data from bus slave unit.

On the other hand, non-split transfer based on the write command is substantially the same as split transfer except that the bus right for the first bus is not released after outputting write data, write command and address to the first bus 1001. Therefore, discussion will be eliminated in order to keep the disclosure simple enough by avoiding redundant disclosure and to facilitate clear understanding of the present invention.

As set forth above, number of times to obtain bus right and number of times requiring arbitration by arbitration circuit is four times in split transfer, twice in non-split transfer, and twice in both transfer in case of execution of the write command.

Normally, in arbitration operation in one time, approximately at least four clocks are required. Therefore, eight to sixteen clocks are required for arbitration operation.

As set forth above, in the conventional bus connection circuit, since a period required for arbitration operation is long for many times of arbitration to perform data transfer between buses in the bus bridge circuit, bus performance can be lowered.

Furthermore, upon execution of the write command, the bus master unit can terminate bus cycle by releasing bus right for the first bus before completion of transfer of write data to the slave side, it is feared that write data transmitted upon occurrence of transfer error is lost. Therefore, an extra circuit is required for sending notice of transfer error to the bus master unit.

On the other hand, for notifying transfer error to the bus master unit, it becomes necessary to perform notice after the bus bridge circuit obtains bus right for the first bus through arbitration by the arbitration circuit. Therefore, number of times of arbitration is further increased upon occurrence of the transfer error to lower throughput of the bus. It should be noted that loss of write data upon occurrence of transfer error can be avoided if bus right for the first bus is not released. However, since the first bus can be occupied until completion of bus cycle, use efficiency of bus can be lowered.

Also, in the conventional bus connection circuit, each bus bridge circuit 1003 is required to incorporate bus control circuit adapted to the bus master unit and bus slave unit in the first bus and the second bus.

Accordingly, in the conventional bus control circuit set forth above, the bus bridge circuit requires four control circuits, i.e. a bus master control circuit for the first bus, a bus master control circuit for the second bus, a bus slave control circuit for the first bus and a bus slave control circuit for the second bus. Thus, scale of circuit of the bus bridge circuit is inherently increased according to increasing of number of buses connected to the bus bridge circuit.

SUMMARY OF THE INVENTION

The present invention has been worked out in view of the problems in the prior art set forth above. It is therefore an object of the present invention to provide a bus connection circuit which requires lesser number of clock cycles for bus connection in read access and write access, can eliminate possibility of loss of data upon occurrence of transfer error and requires smaller hardware amount in circuit construction, an information processing system employing the bus connection circuit and a storage medium storing wiring information of the bus connection circuit.

According to the first aspect of the present invention, a bus system comprises:

a common control command bus commonly connecting control command lines of a plurality of buses having data lines of different bit widths; and data converting means to which data lines of the plurality of data buses are connected, for performing conversion of bit width between the data lines of different bit widths, for performing conversion of bit width between a plurality of buses having different bit widths in the same bus cycle.

According to the second aspect of the present invention, a bus system comprises:

a first bus connected to first interface means via a first control command line and a first data line having first bit width;

a second bus connected to second interface means via a second control command line and a second data line having second bit width;

a common control command bus commonly connecting the first and second control command lines and transmitting common command information;

data conversion means performing conversion of bit width between the data lines having different bit widths; and an arbitration circuit performing arbitration for bus right of the first and second buses in response to an arbitration request from the first and second interface means.

According to the third aspect of the present invention, a bus system comprises:

a first write bus connected to first interface means via a first write control command line and a write data line having first bit width;

a first read bus connected to the first interface means via a first read control command line and a read data line having the first bit width;

a second write bus connected to second interface means via a second write control command line and a write data line having second bit width;

a second read bus connected to the second interface means via a second read control command line and a read data line having second bit width;

a first common control command bus commonly connecting the first write control command line and the second write control command line;

a second common control command bus commonly connecting the first read control command line and the second read control command line;

a write data conversion circuit to which the first write bus and the second write bus are connected and performing conversion of bit width between these write buses;

a read data conversion circuit to which the first read bus and the second read bus are connected and performing conversion of bit width between these read buses;

a first arbitration circuit performing arbitration of bus right for the first and second write buses in response to a demand from the first and second interfaces; and a second arbitration circuit performing arbitration of bus right for the first and second read buses in response to a demand from the first and second interfaces.

According the fourth aspect of the present invention, a bus system comprises:

n in number of buses connecting master side interface means and slave side interface means via control command lines and data lines and having mutually different bit widths;

a common control command bus commonly connecting respective control command lines of n in number of buses;

a data conversion circuit connected to data lines of respective of n in number of buses and performing conversion of bit width between different bit widths; and an arbitration circuit simultaneously performing arbitration for then in number of buses.

In the bus system set forth above, the data conversion means may comprise:

a data buffer for performing writing and reading of data;

writing side multiplexer means for controlling writing of data from one of buses to the data buffer;

reading side multiplexer means for controlling reading of data to the other of buses from the data buffer; and timing control means for controlling the writing side multiplexer means or the reading side multiplexer means depending upon information of bit width in one of the buses or the other of buses, and up on data transfer, performing control for outputting signal notifying occupying of the buses and ready of output data.

Also, in the bus system set forth above, the master side interface means may comprise:

a bus command buffer holding address indicative of the bus slave unit and command from the external master unit;

first multiplexer means for controlling output of address and command from the bus command buffer and identification information indicative of the master side interface means to the common control command bus;

a bus write data buffer holding a part or all of write data from the external master unit;

second multiplexer means for controlling output of write data from the bus write data buffer to the bus;

a bus read data buffer for holding a part or all of read data from the bus;

timing control means for outputting a transfer start signal in response to a transfer request signal from the external master unit and outputting a completion signal to the external master unit;

comparing means for detecting matching of identification information indicative of the master side interface means and identification information from the bus; and a bus master control circuit responsive to detection of matching in the comparing means to output the arbitration request signal, upon reception of the arbitration grant signal, controlling the first multiplexer means for outputting to the common control command bus and outputting a write permission signal to permit writing of the read data from the but to the bus read data buffer, responsive to the transfer start signal from the timing control circuit, to permit the second multiplexer to read the write data from the bus write data buffer to the bus.

Furthermore, in the bus system set forth above, the slave side interface means may comprise a bus command buffer holding command and address indicative of the bus slave unit from the common control command bus and identification information indicative of the master side interface means;

a bus write buffer holding write data from the bus;

a bus read data buffer holding a part or all of read data from the external slave unit;

multiplexer means controlling outputting of read data from the bus read data buffer;

comparing means for detecting matching of address assigned to the external slave unit and address from the common control command bus;

a timing control circuit responsive to detection of matching in the comparing means to output write permission signal to permit writing of the write data to the bus write data buffer, outputting a transfer request signal to the external slave unit in response to the transfer start signal, and outputting the transfer start signal of read data in response to reception of the completion signal from the external slave unit; and a bus slave control circuit outputting a read permission signal in response to the transfer start signal of read data to permit the multiplexer to output read data to the bus.

According to the fifth aspect of the present invention, a bus system comprises:

a first bus having a data line of first bit width;

a first unit connected to the first bus;

a second bus having a data line of second bit width;

a second unit connected to the first bus;

an arbitration circuit simultaneously performing arbitration for the first bus and the second bus when command is output from the first unit to the second unit;

a conversion circuit performing converting operation between the first bit width and the second bit width between the first bus and the second bus; and a common control command bus connecting the first bus and the second bus.

In the bus system according to the first to fifth aspects of the present invention, by providing the common control command bus and the data conversion circuit, reading and writing of data can be executed in lesser clock cycles between buses having data lines of different bit widths.

According to the sixth aspect of the present invention, a bus connection circuit comprises:

a first selection circuit receiving a first output signal and a first enabling signal output from a first unit having first data bit width and a second output signal and a second enabling signal output from a second unit having the first data bit width, and selectively outputting the first or second output signal in response to the first or second enabling signal becoming active; and a second selection circuit receiving a third output signal and a third enabling signal output from a third unit having a second data bit width different from the first data bit width and supplied via a conversion unit, an output of the first selection circuit, and a signal on the basis of the first and second enabling signal, for supplying output of the first selection circuit to the first and second unit when the first or second enabling signal is active, and for supplying the third output signal to the first and second unit when the third enabling signal is active.

According to the seventh aspect of the present invention, a bus connection circuit comprises:

a first selection circuit receiving a first output signal and a first enabling signal output from a first bus master unit having first data bit width and a second output signal and a second enabling signal output from a second bus master unit having the first data bit width, and selectively outputting the first or second output signal in response to the first or second enabling signal becoming active; and a second selection circuit receiving a third output signal and a third enabling signal output from a third bus master unit having a second data bit width different from the first data bit width and supplied via a conversion unit, an output of the first selection circuit, and a signal on the basis of the first and second enabling signal, for supplying output of the first selection circuit to a bus slave unit having the first data bit width when the first or second enabling signal is active, and for supplying the third output signal to the bus slave unit when the third enabling signal is active.

According to the eighth aspect of the present invention, a bus connection circuit comprises:

a first selection circuit receiving a first output signal and a first enabling signal output from a first bus slave unit having first data bit width and a second output signal and a second enabling signal output from a second bus slave unit having the first data bit width, and selectively outputting the first or second output signal in response to the first or second enabling signal becoming active; and a second selection circuit receiving a third output signal and a third enabling signal output from a third bus master unit having a second data bit width different from the first data bit width and supplied via a conversion unit, an output of the first selection circuit, and a signal on the basis of the first and second enabling signal, for supplying output of the first selection circuit to a bus master unit having the first data bit width when the first or second enabling signal is active, and for supplying the third output signal to the bus master unit when the third enabling signal is active.

In the bus connection circuit of the sixth to eighth aspect of the present invention, the bus can be easily formed using selection circuits.

Since information processing system can be formed with incorporating bus system or bus connection system in the first to fifth aspect of the invention, high speed operation can be achieved.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings:

FIG. 12 is an explanatory illustration showing a data structure of a command in the second embodiment;

DESCRIPTION OF THE PREFERRED EMBODIMENT

The present invention will be discussed hereinafter in detail in terms of the preferred embodiments of a bus system, a bus connection circuit, an information processing system employing the bus system or the bus connection system according to the present invention with reference to the accompanying drawings. In the following description, numerous specific details are set forth in order to provide a thorough understanding of the present invention. It will be obvious, however, to those skilled in the art that the present invention may be practiced without these specific details. In other instances, well-known structure is not shown in detail in order to avoid unnecessary obscurity of the present invention.

Typical embodiments of the present invention will be discussed hereinafter with reference to FIG. 1.

The preferred embodiments of the present invention are generally constructed with a data conversion unit provided between a bus 1 and a bus 2, a common command bus 50 connecting a control command line of the bus 1 and a control command line of the bus 2, and an arbitration circuit provided in common for a bus master unit and a bus slave unit connected to the bus 1 and the bus 2.

The preferred embodiments will be discussed hereinafter in detail.

First Embodiment

Figure 1:
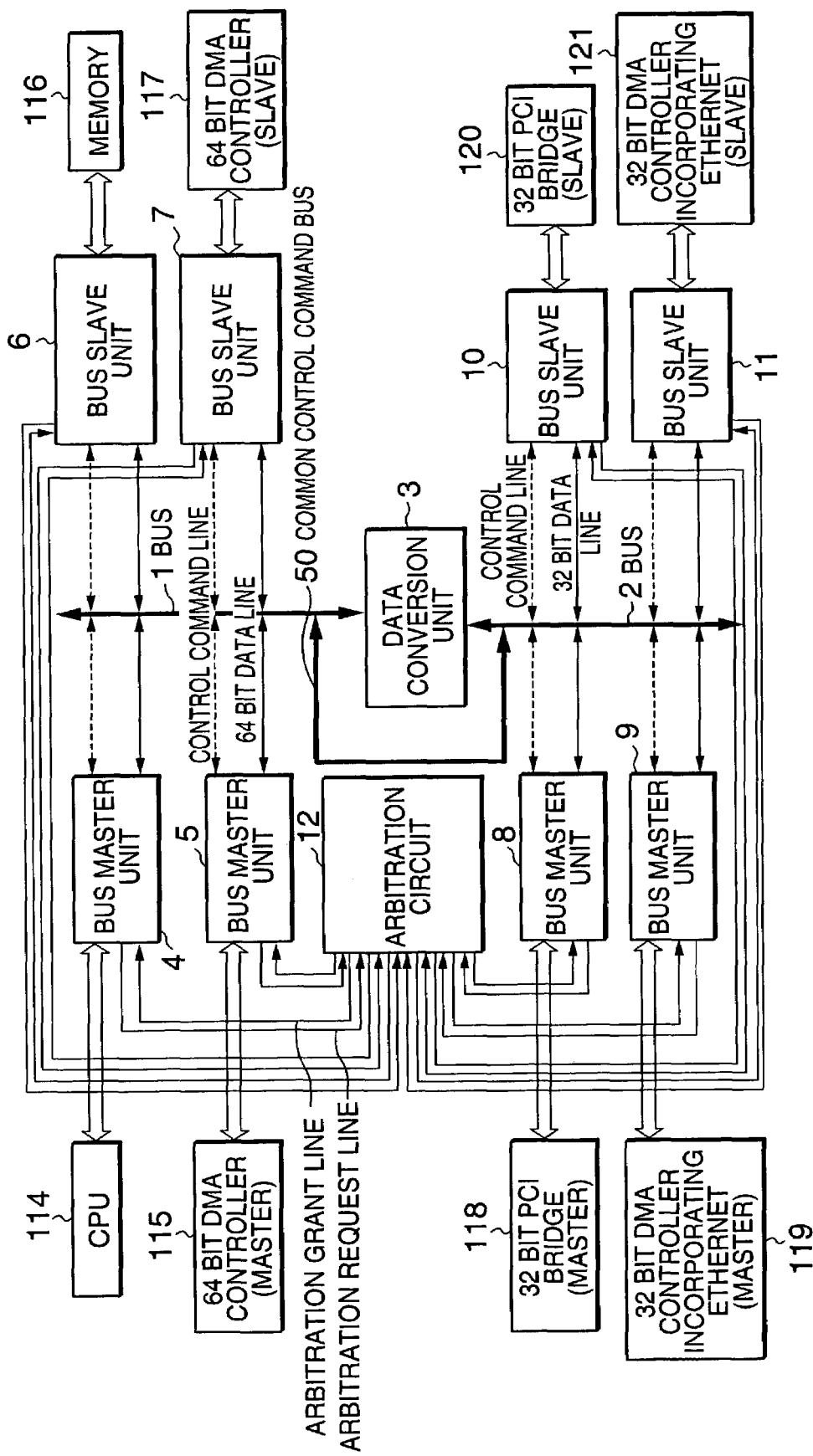
FIG. 1 is a block diagram showing a construction of the first embodiment of a bus system according to the present invention.
Figure 2:
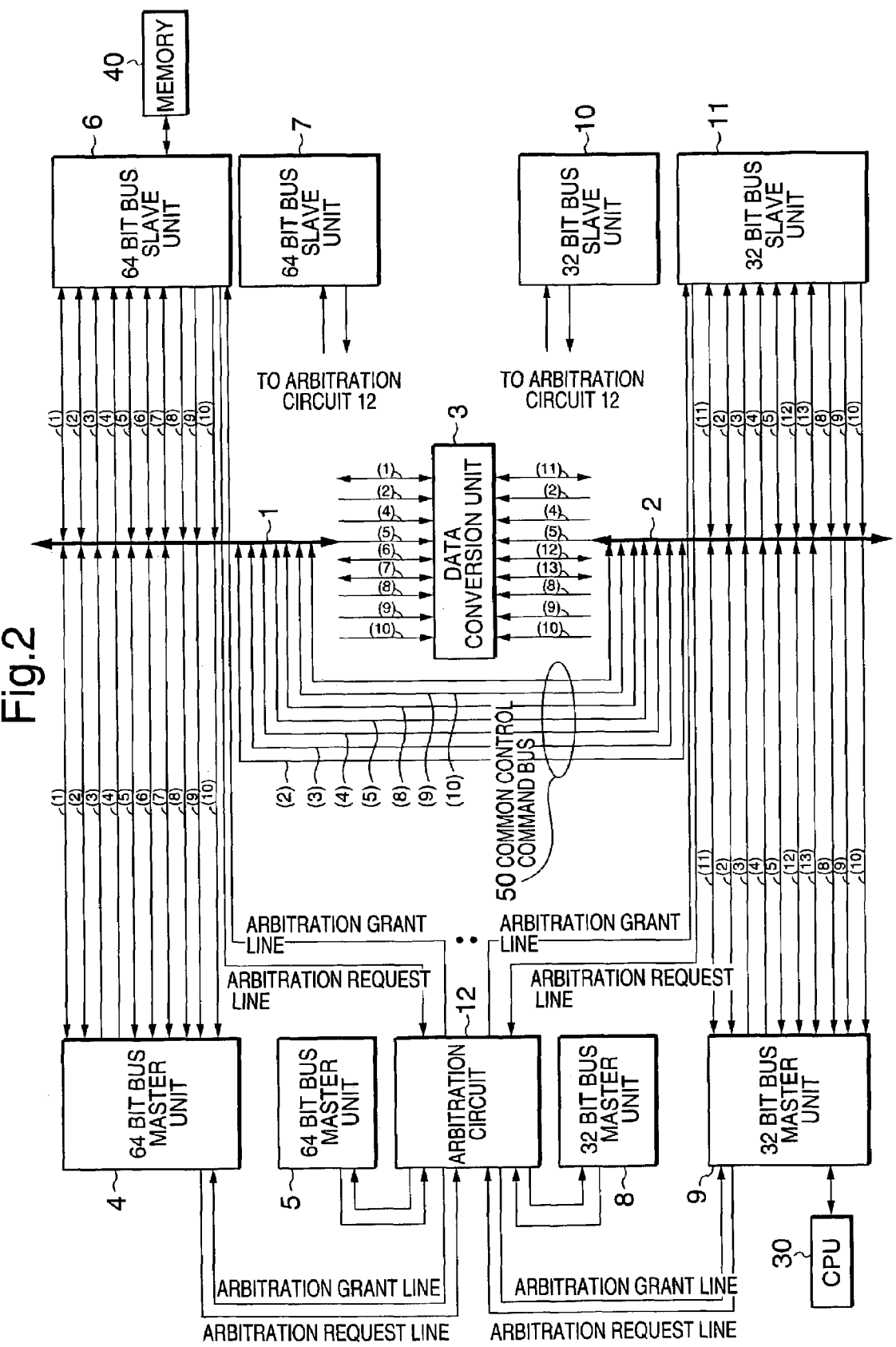
FIG. 2 is an illustration showing a system construction including a common control command bus in the first embodiment of a system bus.
Figure 3:
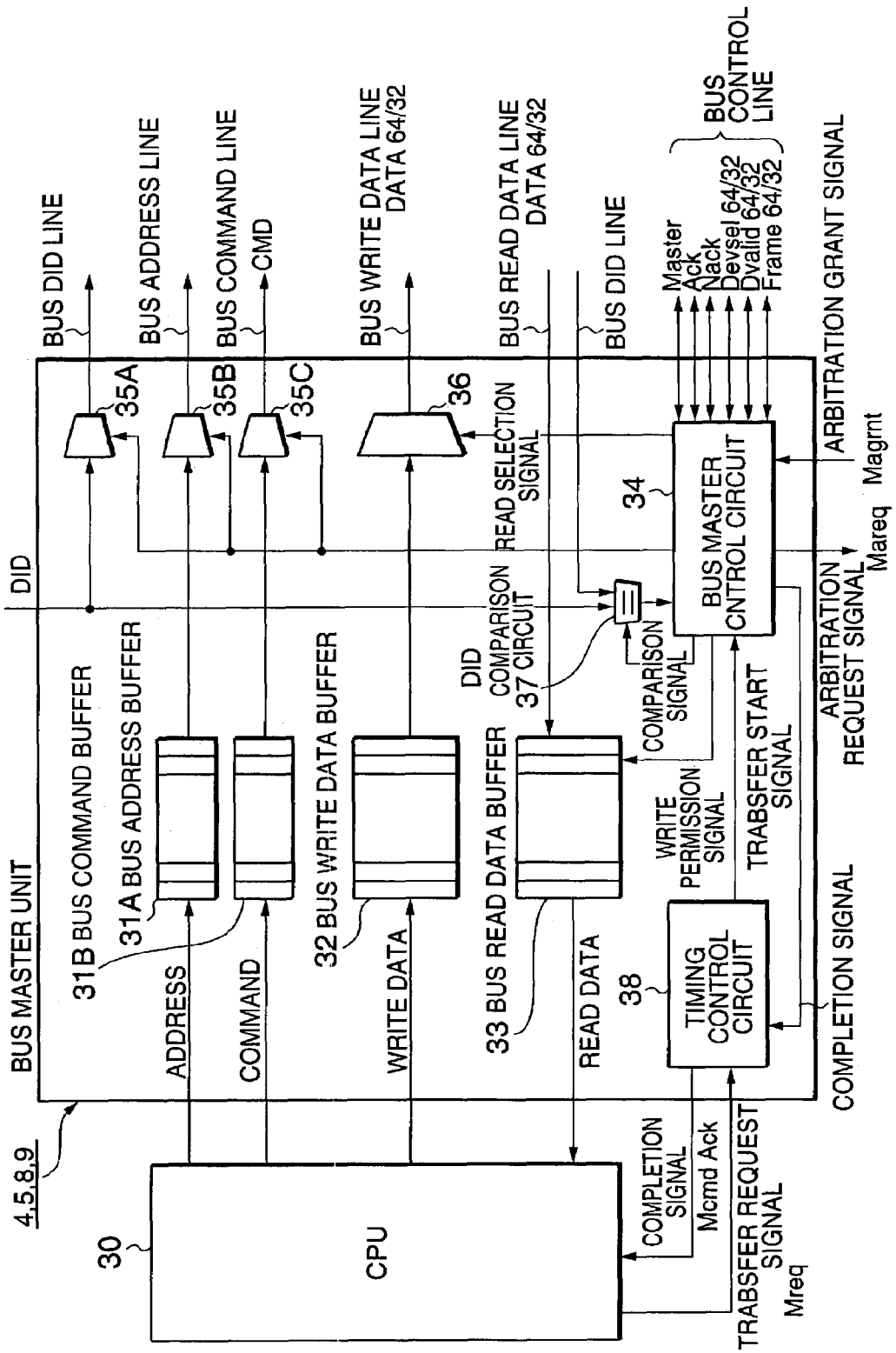
FIG. 3 is an illustration showing a construction of a bus master unit in the first embodiment.
Figure 4:
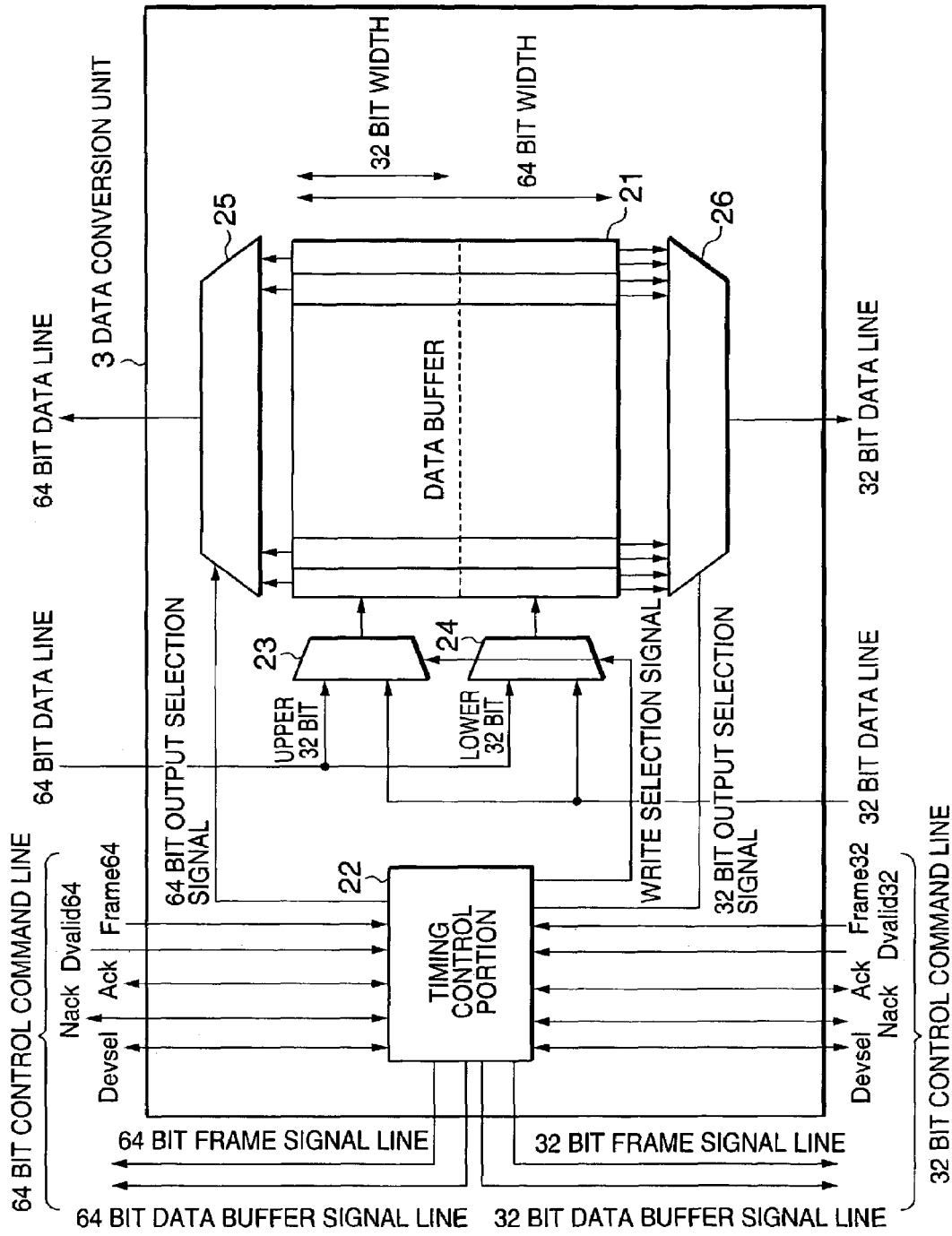
FIG. 4 is an illustration showing a construction of a data conversion unit in the first embodiment.
Figure 5:
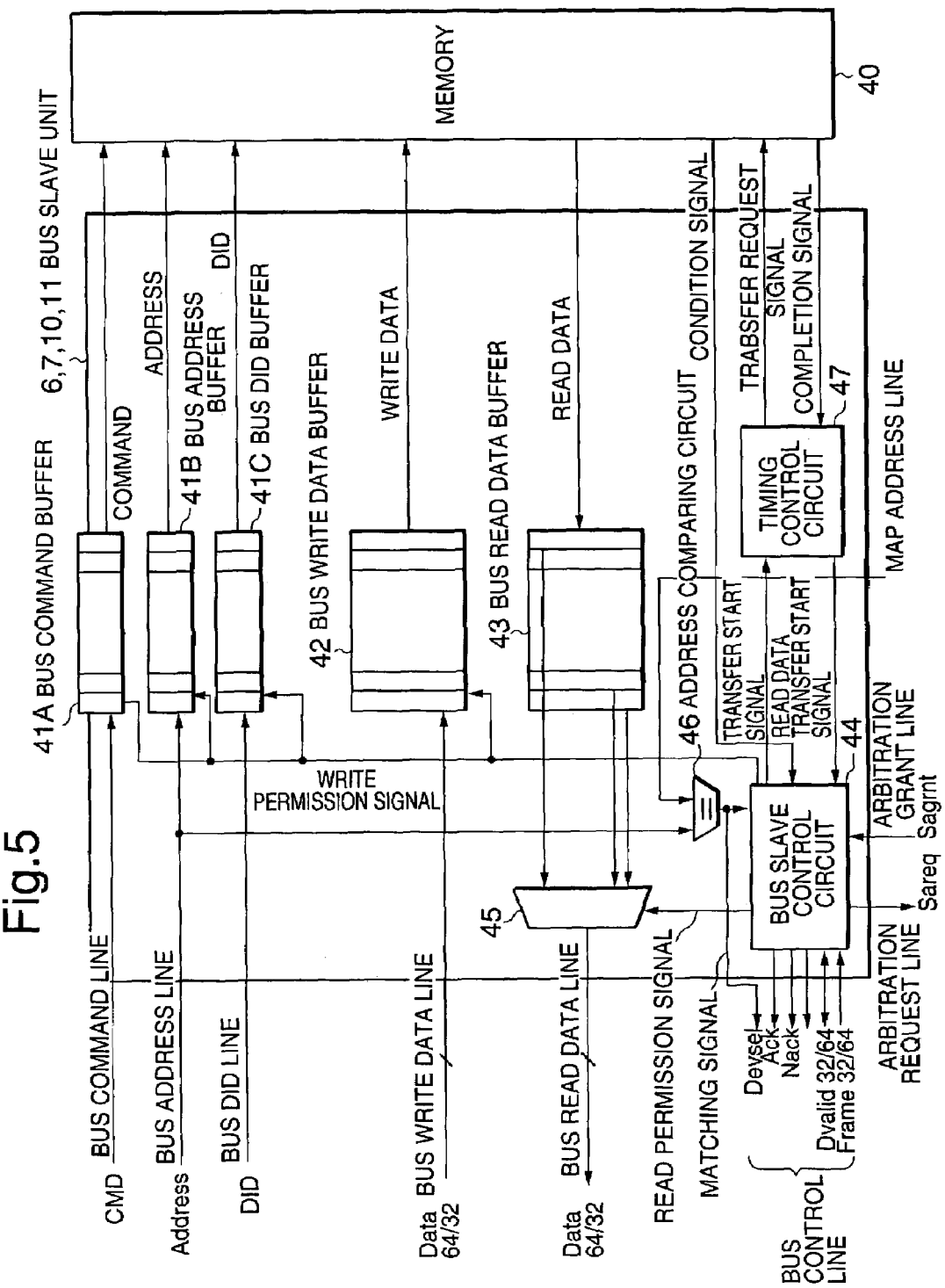
FIG. 5 is an illustration showing a bus slave unit in the first embodiment.
Figure 6:
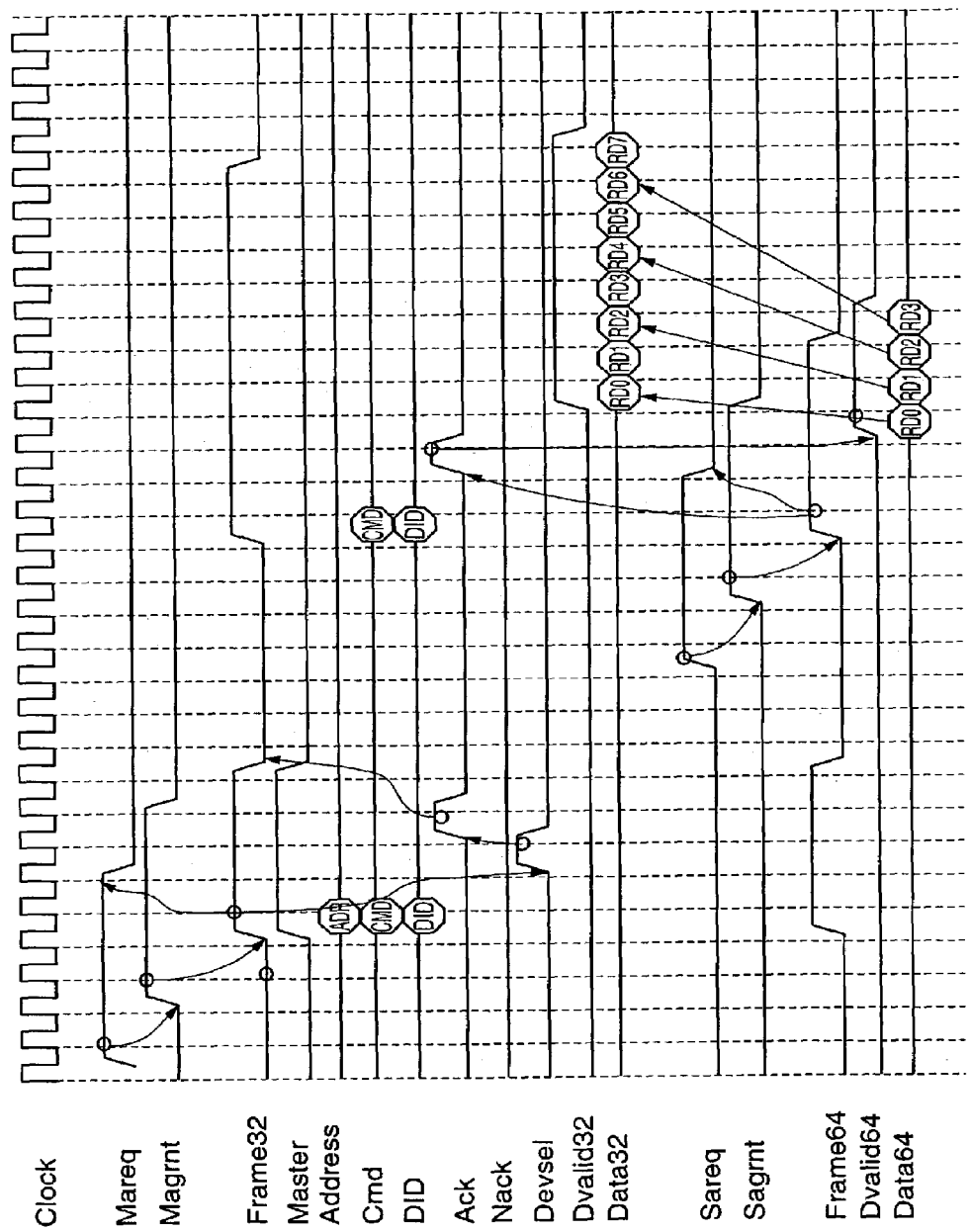
FIG. 6 is a timing chart showing a data transfer operation upon read access to a 64 bit bus slave unit from a 32 bit bus master unit in the first embodiment.
Figure 7:
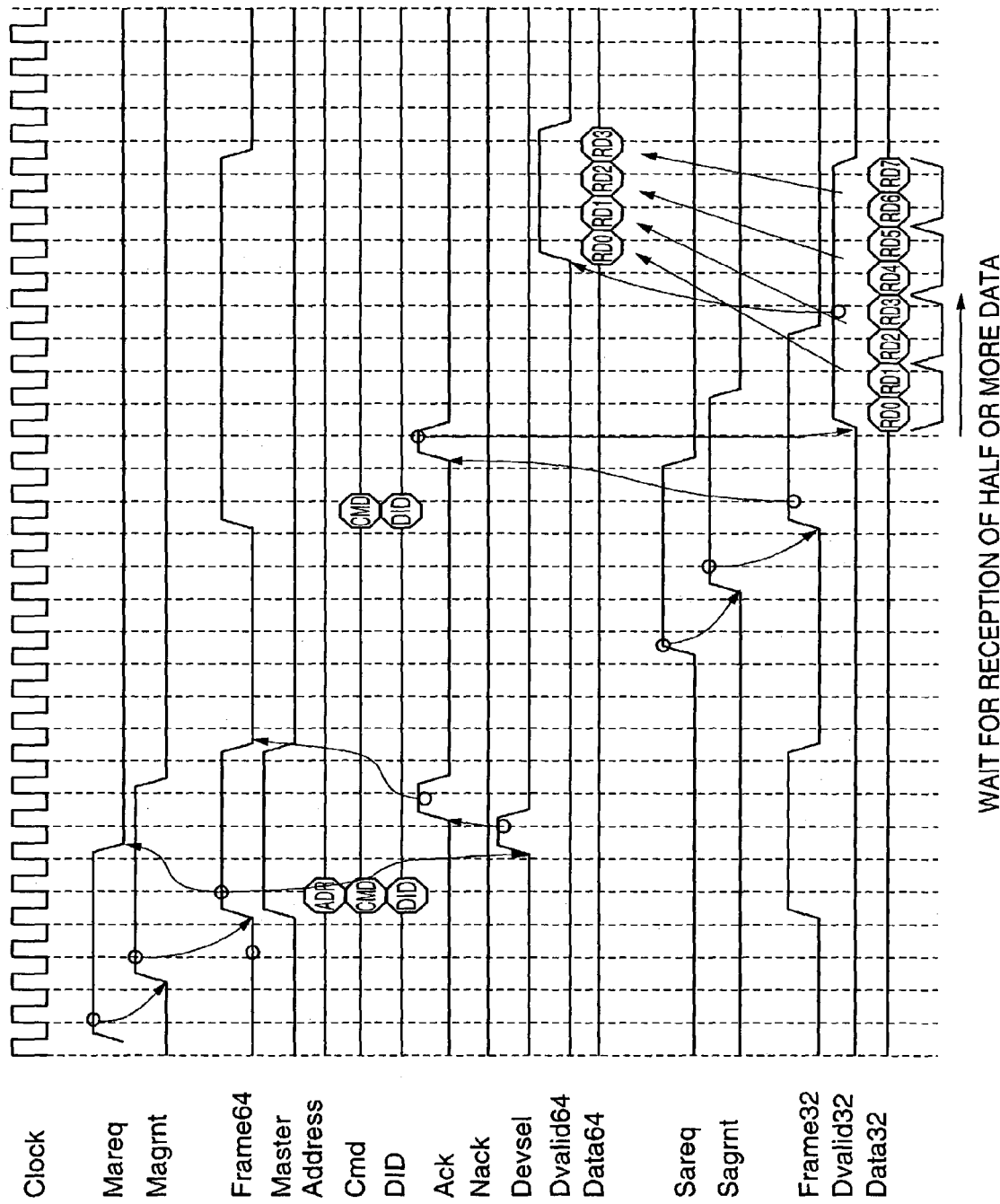
FIG. 7 is a timing chart showing a data transfer operation upon read access to a 32 bit bus slave unit from a 64 bit master unit in the first embodiment.
Figure 8:
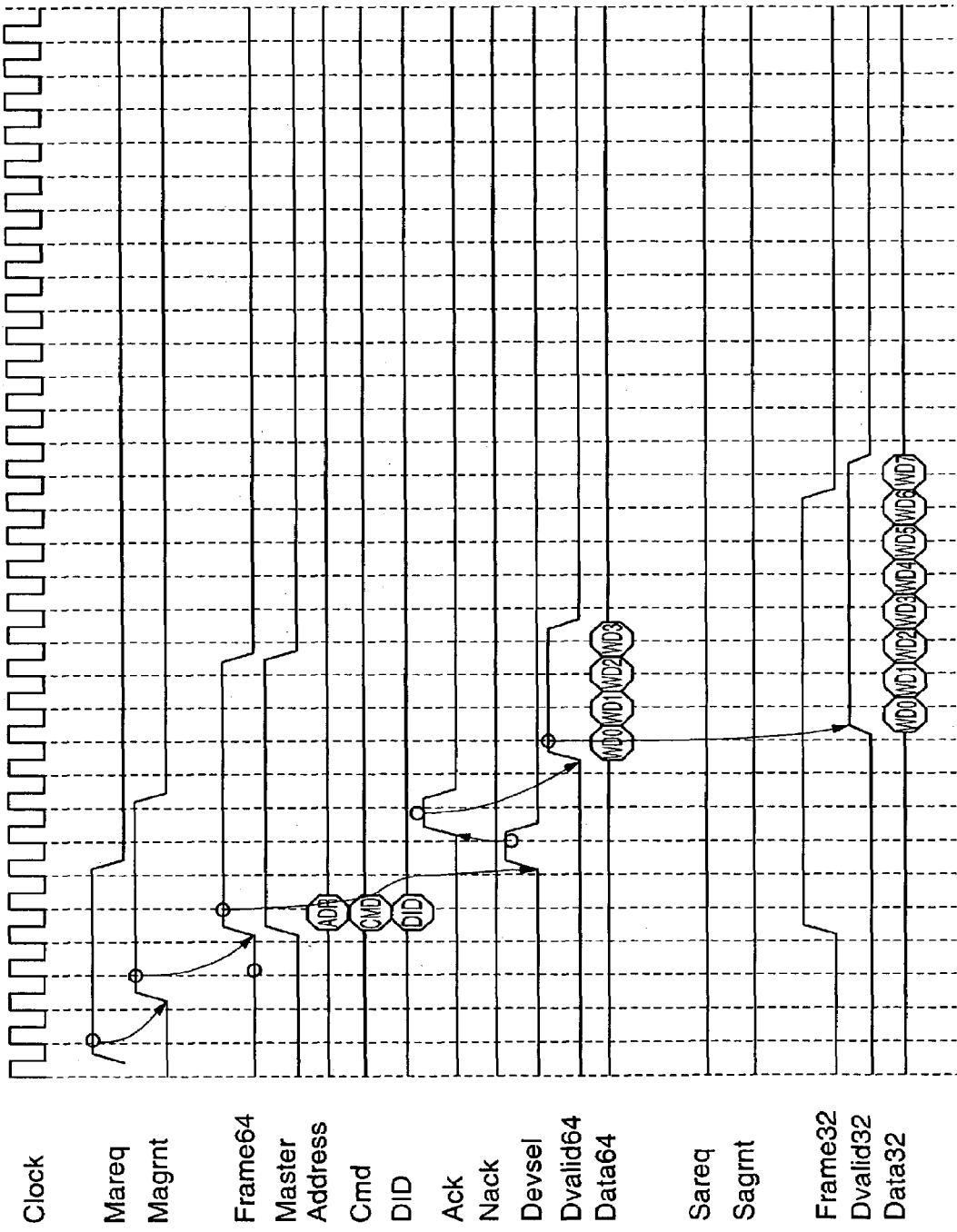
FIG. 8 is a timing chart showing a data transfer operation upon write access to the 32 bit bus slave unit from the 64 bit bus master unit in the first embodiment.
Figure 9:
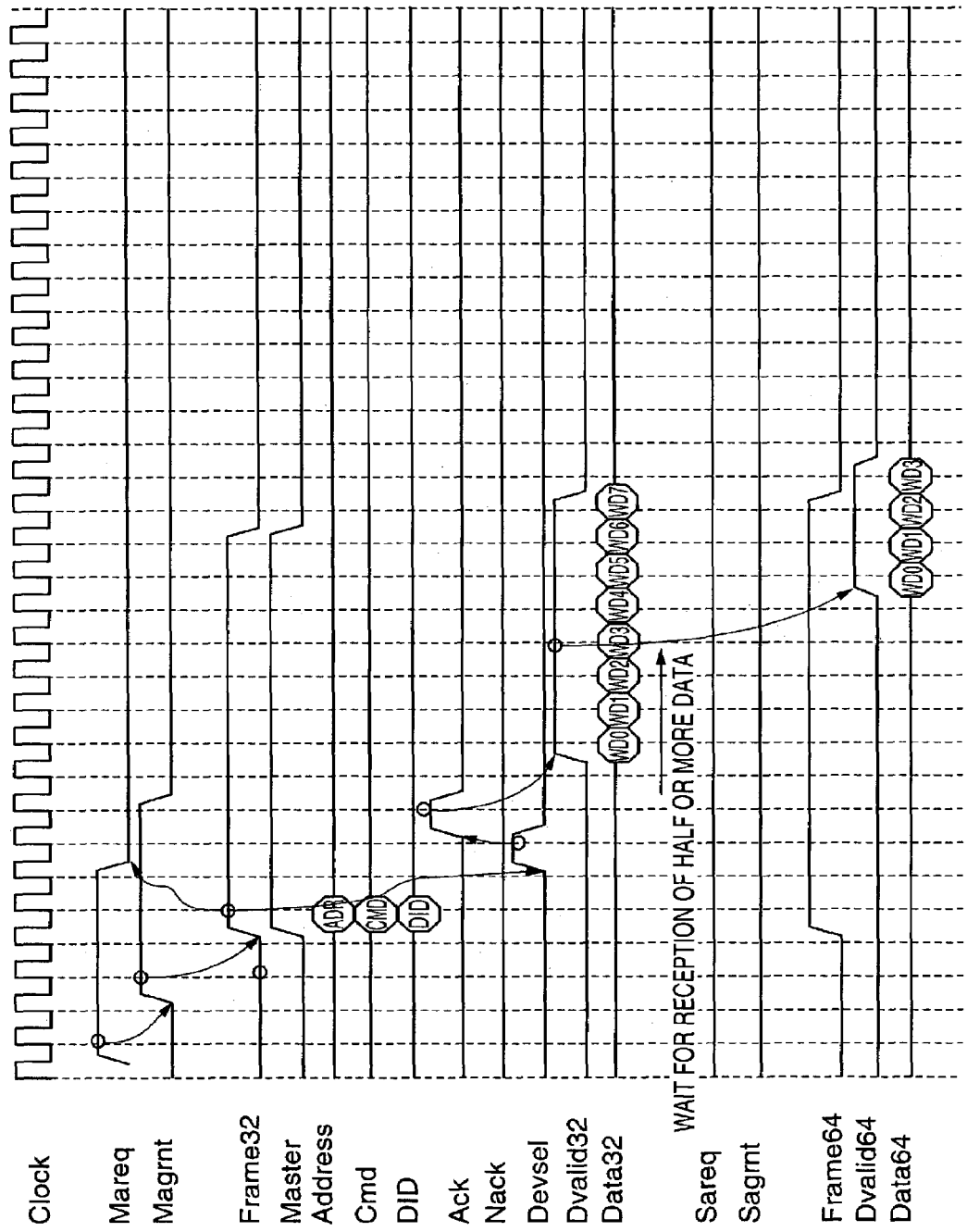
FIG. 9 is a timing chart showing a data transfer operation upon write access to the 64 bit bus slave unit from the 32 bit bus master unit in the first embodiment.

FIG. 1 is a block diagram showing a construction of the first embodiment of a bus system according to the present invention, FIG. 2 is an illustration showing a system construction including a common control command bus in the first embodiment of a system bus, FIG. 3 is an illustration showing a construction of a bus master unit in the first embodiment, FIG. 4 is an illustration showing a construction of a data conversion unit in the first embodiment, FIG. 5 is an illustration showing a bus slave unit in the first embodiment, FIG. 6 is a timing chart showing a data transfer operation upon read access to a 64 bit bus slave unit from a 32 bit bus master unit in the first embodiment, FIG. 7 is a timing chart showing a data transfer operation upon read access to a 32 bit bus slave unit from a 64 bit master unit in the first embodiment, FIG. 8 is a timing chart showing a data transfer operation upon write access to the 32 bit bus slave unit from the 64 bit bus master unit in the first embodiment, and FIG. 9 is a timing chart showing a data transfer operation upon write access to the 64 bit bus slave unit from the 32 bit bus master unit in the first embodiment.

As shown in FIG. 1, the shown embodiment of a bus system (bus connection circuit) includes the bus 1 connected to control command lines and 64 bit data lines, the bus 2 connected to the control command lines and 32 bit data lines, a data conversion unit 3, a common control command bus 50 connecting control command lines of the bus 1 and the bus 2, bus master units 4 and 5 and bus slave units 6 and 7 connected to the bus 1 via the control command lines and the 64 bit data lines, bus master units 8 and 9 and bus slave units 10, 11 connected to the bus 2 via the control command lines and the 32 bit data lines, and an arbitration circuit 12 connected to the bus master units 4, 5, 8 and 9 and the bus slave units 6, 7, 10 and 11.

It should be noted that, in the shown embodiment, discussion will be given in terms of a bus connection circuit (bus system) connecting between the bus having data width of 64 bits and the bus having data width of 32 bits, in which a read bus transferring read data and a write bus transferring command and write data are in common. Also, the shown embodiment will be discussed hereinafter with assumption that split transfer is performed upon read access.

Here, the bus master units serve as interface units interfacing between external units and the buses. The external master units are units having function for issuing commands. For example, the external units may be central processing unit (CPU), DMA (Direct Memory Access) controller controlling transfer of DMA of data for the memory, and so forth. In the shown embodiment illustrated in FIG. 1, the external unit may be CPU 114, a 64 bit DMA controller (master) 115, 32 bit PCI bridge (master) 118 and an Ethernet incorporating 32 bit DMA controller (master) 119.

On the other hand, the bus slave units serve as interface units between the external slave units and buses. The external slave units are units performing process receiving commands issued by the external master units. For example, the external slave units may be an input/output (I/O) circuit, a memory and so forth. In FIG. 1, as the external slave units, a memory 116, a 64 bit DMA controller (slave) 117, 32 bit PCI bridge (slave) 120 and an Ethernet incorporating 32 bit DMA controller (slave) 121 are shown.

The bus 1 is includes a 64 bit data line for transmitting and receiving data of 64 bit width and a command line transmitting and receiving control command. The bus 2 includes a 32 bit data line transmitting and receiving line transmitting and receiving control command.

The control command line of the bus 1 and the control command line of the bus 2 are connected via the common control command bus 50. The data conversion unit 3 performs conversion of bit width between the bus 1 and the bus 2 and between data of 64 bit width and data of 32 bit width for performing conversion of 32 bit to 64 bit or conversion of 64 bit to 32 bit.

The bus master units 4 and 5 are connected to the bus 1 via the control command line and the 64 bit data line. The bus master units 8 and 9 are connected to the bus 2 via the control command line and the 32 bit data line. Respective bus master units interface between the external master unit and the bus 1 or the bus 2.

The bus slave units 6 and 7 are connected to the bus 1 via the control command line and the 64 bit data line. The bus slave units 10 and 11 are connected to the bus 2 via the control command line and the 32 bit data line. Respective bus slave units interface between the bus 1 or the bus 2 and the external slave unit.

The arbitration circuit 12 performs arbitration of the bus right in the bus 1 and bus 2 depending upon an arbitration request signal output from each bus master unit or the bus slave unit. When bus right is established, obtaining of bus right is notified to the bus master unit or the bus slave unit by an arbitration grant signal.

Basic operational process of the present invention will be discussed hereinafter briefly.

Execution of read command by the external master unit will be done in the following manner. CPU 114 outputs read command for 32 bit PCI bridge (slave) 120 to the bus master unit 4. The bus master unit 4 performs arbitration request to the arbitration circuit 12 and obtains a bus right for the bus 1 and the bus 2. The bus master unit 4 obtaining the bus right outputs the read command to the bus 1. Then, read command on the bus 1 is transferred to the bus 2 via the common control command bus 50. The bus slave unit 10 receiving the read command via the bus 2 transmits the read command to the 32 bit PCI bridge 120.

The 32 bit PCI bridge 120 outputs data based on the read command to the bus slave unit 10. The bus slave unit 10 outputs received data to the bus 2 for feeding to CPU 114. Since data on the bus 2 is 32 bit data and CPU 114 on reception side has data width of 64 bits, the data conversion unit 3 performs conversion of data from 32 bit data into 64 bit data to output data after conversion to bus 1. The bus master unit 4 receiving data after conversion through the bus 1 transmits data to CPU 114.

Execution of write command by the external master unit will be done in the following manner.

CPU 114 outputs write command and write data for the 32 bit PCI bridge (slave) to the bus master unit 4. The bus master unit 4 performs arbitration request for the arbitration circuit 12 to obtain bus right of the bus 1 and the bus 2. The bus master unit 4 obtaining the bus right outputs write command and write data to the bus 1. The write command is transferred to the bus 2 via the common control command bus 50. The write data is transmitted to the bus 2 with conversion from 64 bit data to 32 bit data. The bus slave unit 10 receives write data and write command via the bus 2 to transmit them to the 32 bit PCI bridge.

Next, discussion will be given for the signal line of the bus connection circuit of FIG. 1 in detail with reference to FIG. 2. In FIG. 2, (1) to (13) denote respective control command and respective signal lines of the common control command bus discussed hereinafter.

The control command lines of the bus 1 transmits (1): Frame64, (2): Master, (3): Address, (4): CMD, (5) DID, (7): Dvalid64, (8): ACK, (9): NACK, (10): Devsel. The 64 bit data line of the bus 1 transmits (6): Data64.

The control command lines of the bus 2 transmits (1): Frame32, (2): Master, (3): Address, (4): CMD, (5) DID, (7): Dvalid32, (8): ACK, (9): NACK, (10): Devsel. The 32 bit data line of the bus 1 transmits (6): Data32.

The common control command bus 50 transmits (2): Master, (3): Address, (4): CMD, (5) DID, (8): ACK, (9): NACK, (10) Devsel.

Here, Frame64 is information indicating that the bus of 64 bit width is occupied, Master is information indicating transfer from the bus master unit to the bus slave unit, Address is an address data identifying the bus slave unit, CMD is a command data indicative of kind of the command, DID data is device ID for identifying the bus master unit, Data64 is a transfer data on 64 bit data line in the bus 1, Dvalid64 is information indicative of a valid period of the transfer data on the data line, ACK is information indicating that the selected unit can execute the demanded operation, NACK is information indicating that the selected unit cannot execute the demanded operation, Devsel is information indicating that the external slave unit is selected, Frame32 is information indicating that the bus of 32 bit width is occupied, Data32 is transfer data on 32 bit data line in the bus 2, and Dvalid32 is information indicating valid period of the transfer data on 32 bit data line.

It should be noted that DID data should be a unique value per bus master unit. On the other hand, DID data may be one externally provided or one stored in a register in the bus master.

A system construction shown in FIG. 2 shows the case where a bus construction is multiplexer type. However, when a bus construction is three state buffer type, system construction is similar to the multiplexer type except Ack signal has to be differentiated between the case of 32 bits and the case of 64 bits.

Operation of the shown embodiment will be discussed hereinafter with reference to the timing chart and constructional block diagram.

In the first embodiment of the present invention, with respect to the case where a command is output to the external slave unit 40 having 64 bit data width connected to the bus slave unit 6 from CPU 30 having 32 bit data width connected to the bus master unit 9, discussion will be given for the bus system with reference to FIGS. 2, 3, 4, 5 and 6. It should be noted that data on the bus is assumed to be controlled by split transfer.

At first, discussion will be given for constructions of the bus master units 4, 5, 8, 9, data conversion unit 3 and the bus slave units 6, 7, 10, 11.

As shown in FIG. 3, each of the bus master units 4, 5, 8, 9 is constructed with a bus address buffer 31A, a bus command buffer 31B, a bus write data buffer 32, a bus read data buffer 33, a bus master control circuit 34, multiplexers 35A, 35B, 35C, 36, a DID comparing circuit 37 and a timing control circuit 38.

As shown in FIG. 4, the data conversion unit 3 is constructed with a data buffer 21, a timing control portion 22 and multiplexers 23, 24, 25 and 26.

As shown in FIG. 5, each of the bus slave units 6, 7, 10, 11 is constructed with bus command buffers 41A, 41B, 41C, a bus write data buffer 42, a bus read data buffer 43, a bus slave control circuit 44, a multiplexer 45, an address comparison circuit 46 and a timing control circuit 47.

Next, in the block diagram of FIG. 2, an internal operation of each unit in the case where read command is output to the memory 40 from CPU 30 will be discussed in detail with reference to a timing chart of FIG. 6.

It should be noted that CPU 30 as the external master unit outputs write data to be written in the memory 40 by the write command and a transfer request signal Mreq demanding transfer of these data to the bus master unit 9 in the case of the address data ADD for designating the memory 40 as the external slave unit connected to the bus slave unit 6, the command data CMD for feeding write command or read command for the memory 40 or where the command data CMD contains write data. However, as shown in FIG. 12, the command data CMD includes a bit indicating read access or write access and indication of data amount to be transferred at one time indicating the size by byte.

CPU 30 outputs address ADD, command data CMD indicating the read command and the transfer request signal Mreq to the bus master unit 9. Address ADD and command data CMD output from CPU 30 are stored in the bus address buffer 31A and the bus command buffer 31B of the bus master unit 9. A timing control circuit 38 received receives the transfer request signal Mreq and outputs a transfer start signal to the bus master control circuit 34 (timing up to this timing is not illustrated).

The bus master control circuit 34 receiving the transfer start signal outputs the arbitration request signal Mreq to the arbitration circuit 12 for obtaining bus right. The arbitration circuit 12 performs arbitration in response to the received arbitration request signal Mreq. After confirming that Frame32 signal is inactive (shown by cycle on the Frame32 signal of FIG. 6), the arbitration grant signal Magrnt signal is output to provide bus right for the bus 1 and the bus 2 to the bus master unit 9. It should be noted that arbitration operation of the arbitration circuit 12 is generally known to those skilled in the art, and therefore discussion thereof will be eliminated for avoiding unnecessary obscurity and keeping the disclosure simple enough to facilitate clear understanding of the present invention. The bus master control circuit 34 receiving the arbitration grant signal Magrnt outputs the Frame32 signal and the Master signal to the bus control line for outputting the read selection signal.

The multiplexer 35A, 35B, 35C and 36 are responsive to the read selection signal to output DID data, address data ADD, the command data CMD to the bus DID line, the bus address line bus command line, respectively. It should be noted that DID is externally supplied to the bus master unit 9. The address data ADD, the command data CMD, the DID data output to the bus 2 and the Master signal in active condition are transferred to the bus 1 via the common control command bus 50.

The data conversion unit 3 of FIG. 2 connected between the bus 1 and the bus 2 outputs the Frame32 signal of the bus 2 with conversion into Frame64 signal by the timing control portion 22. By the Frame32 signal and the Frame64 signal, the bus 2 and the bus 1 can be occupied simultaneously. Namely, by one time arbitration by the arbitration circuit 12, it becomes possible to occupy both of the bus 1 and the bus 2 having different bus width.

The bus slave unit 6 of FIG. 5 connected to the bus 1 compares the address data ADD on the bus 1 whether the address data ADD falls within a range of address indicated by map address line by an address comparator 46. When the address data ADD falls within the range of address indicated by map address line, the address comparator 46 outputs matching signal to the bus slave control circuit 44 and outputs as Devsel signal indicating that the device is selected, to the bus control line. The bus slave control circuit 44 is responsive to the matching signal to make judgment whether the process demanded by the command data CMD can be executed or not by the condition signal to output Ack signal in executable state and NACK signal in non-executable state. In the shown case, the slave control circuit 44 outputs the Ack signal under judgment that the memory 40 can execute the command.

The Ack signal is supplied to the timing control portion 22 of the data conversion unit 3 via the bus control line in the 64 bit control command line and the bus 2, and is supplied to the bus master control circuit 34 of the bus master unit 9 via the bus control line in the 32 bit control command line and the bus 1. Here, since the split transfer is premised, the bus master control circuit 34 makes the Frame32 signal inactive in response to the input Ack signal, and in conjunction therewith, supplies completion signal to the timing control circuit 38. The timing control circuit 38 receiving the completion signal outputs a completion signal MCmdAck to CPU 30. At this time, in response to inactivation of the Frame32 signal, the Frame64 signal is also made inactive. Thus, the bus 1 and the bus 2 are released from occupied state.

The bus slave control circuit 44 of the bus slave unit 6 outputs Devsel signal and the Ack signal and in conjunction therewith, outputs the transfer start signal to the timing control circuit 47. On the other hand, in response to a write permission signal output from the bus slave control circuit 44, command data, address data and DID data written in the bus command buffers 41A to 41C are supplied to the memory 40 together with the transfer request signal output by the timing control circuit 47 in response to the transfer start signal.

The command data read command is supplied to the memory 40. When preparation of read data is completed in the memory 40, the memory 40 supplies read data to the bus read data buffer 43, and in conjunction therewith, outputs the completion signal to the timing control circuit 47. The timing control circuit 47 outputs a read data transfer start signal to the bus slave control circuit 44 in response to the completion signal.

The bus slave control circuit 44 receiving the read data transfer start signal outputs the arbitration request signal Sareg to the arbitration circuit 12 in order to obtain occupying right of the bus. The arbitration circuit 12 performs arbitration in response to arbitration request signal Sareg and outputs arbitration grant signal Sagrnt. The bus slave control circuit is responsive to the arbitration grant signal Sagrnt to output the active Frame64 signal indicating occupying of the bus 1. The Frame64 signal on the bus 1 becomes the Frame32 signal through the timing control portion 22 of data conversion unit 3 similarly to the Frame32 signal output by the bus master unit 9. On the other hand, the bus slave control circuit 44 outputs command data CMD and DID data for identifying the master together with the Frame64 signal.

Command data and DID data are fed to the bus 2 from the bus 1 through the common control command bus. The bus master control circuit 34 connected to the bus 2 outputs a comparison signal when the Master signal is inactive. The DID comparison circuit 37 is activated by the comparison signal. Accordingly, by the DID comparison circuit 37, DID data on the bus DID line of the bus 1 and value of DID of the bus master unit are compared. When the DID comparison circuit 37 outputs the matching signal, the bus master control circuit 34 outputs Ack signal to the bus control line of the bus 1.

The bus slave control circuit 44 receiving the Ack signal on the bus control line through the common control command bus and the bus 2 outputs a read permission signal, and in conjunction therewith makes Dvalid64 signal indicating that data on 64 bit data line is effective.

The multiplexer 45 outputs read data RD0 to RD3 written in the bus read data buffer 43 in response to the read permission signal to 64 bit bus read data line sequentially.

The data conversion unit 3 receives the read data RD0 to RD3 of 64 bit width through the 64 bit data line to write the data buffer of 64 bit width via the multiplexers 23 and 24. At this time, the 64 bit read data is divided into upper 32 bit read data and lower 32 bit read data corresponding to the multiplexers 23 and 24 and written in data buffer 21 by a write selection signal from the timing control portion 22. The written 64 bit read data is sequentially read as 32 bit read data corresponding to 32 bit output selection signal from the timing control portion 22. At this time, the timing control portion 22 outputs the 32 bit output selection signal, and in conjunction therewith makes Dvalid32 indicating that 32 bit data R0 to R7 are effective, active.

Here, the timing control portion 22 performs bit conversion corresponding from which bus, the Frame32 signal and Ack signal are fed. Namely, when the timing control portion 22 receives the Frame32 signal and the Ack signal from the 64 bit control command line, control is performed for performing conversion from 32 bit to 64 bit. Conversely, when the timing control portion 22 receives the Frame64 signal and the Ack signal from the 32 bit control command line, control is performed for performing conversion from 64 bit to 32 bit. It should be noted that when the timing control portion 22 receives the Frame signal and Ack signal from the same direction, it indicates that the master side and slave side have the same data width. Therefore, the data conversion unit 3 does not perform conversion. As such, when conversion is unnecessary, the data conversion unit 3 is not operated to contribute to power saving.

The bus slave control circuit 44 makes the Dvalid64 signal inactive in response to completion of output of the read data, and in conjunction therewith, makes Frame64 signal inactive. In the shown embodiment, since the amount of data is preliminarily known, in order to improve use efficiency of the bus 1, the Frame64 signal is made inactive at a timing one clock early earlier than the Dvalid64 signal.

Since the DID comparison circuit 37 outputs the matching signal and the Dvalid32 signal is active, the bus master control circuit 34 outputs a write permission signal to the bus read data buffer 33. In response to the write permission signal, the bus read data buffer 33 sequentially takes 32 bit read data on the bus read data line on the bus 2 to supply to CPU 30 as read data.

The timing control portion 22 of the data conversion unit 3 makes the Dvalid32 signal active only for the period depending upon amount of data, and in conjunction therewith makes Frame32 signal inactive corresponding to the final data. It should be noted that, in the shown embodiment, the Frame32 signal is made inactive at a timing one clock earlier than the Dvalid32 signal in order to improve use efficiency of the bus 2.

Thus, read command for the memory 40 having data width of 64 bits to CPU 30 having data width of 32 bits is executed.

Next, discussion will be given for the case where read command from the external master unit having data width of 64 bit connected to the bus master unit 4 to the external slave unit having data width of 32 bit connected to the bus slave unit 10 is executed, with reference to FIG. 7.

Concerning operation from a timing of outputting of the address data ADD, the command data CMD and the transfer request signal Mreq from the external master unit to the bus master unit 4 having data width of 64 bits to a timing of feeding of CMD and DID to the bus master unit 4 from the bus slave unit 10 and outputting of the Ack signal by the bus master unit 4, the operation timing is substantially equal to the timing illustrated in FIG. 6. Therefore, discussion will be eliminated in order to avoid redundant discussion and whereby to keep the disclosure simple enough to facilitate clear understanding of the present invention.

The bus slave control circuit 44 receiving the Ack signal output on the bus 1 from the bus master unit 4 through the common control command bus and the bus 2, outputs the read permission signal, and in conjunction therewith, makes Dvalid32 signal indicating data effective active.

The multiplexer 45 is responsive to the read permission signal to output read data RD0 to RD7 written in the bus read data buffer 43 to the 32 bit bus read data line sequentially.

The data conversion unit 3 receives read data RD0 to RD7 of 32 bit width through the 32 bit data line and writes in the data buffer 21 via the multiplexers 23 and 24. At this time, 32 bit read data is alternately written in the upper 32 bits and the lower 32 bits of the data buffer 21 (which of the upper bit and the lower bit of the data buffer is to be written earlier may be variable depending upon design) since the multiplexers 23 and 24 are made active alternately in response to the write selection signal from the timing control portion 22.

The written 32 bit read data is read out as 64 bit read data corresponding to 64 bit output selection signal from the timing control portion 22. At this time, the timing control portion 22 is responsive to reception of half or more of 32 bit read data RD0 to RD7, and responsive to reception of RD3, to output the 64 bit output selection signal, and in conjunction therewith to make Dvalid64 signal indicating 64 bit data RD0 to RD3 being effective.

The bus slave control circuit 44 makes the Dvalid32 signal inactive and in conjunction therewith makes the Frame32 signal inactive in response to completion of output of the read data. It should be noted that, in the shown embodiment, since amount of data is preliminarily known, Frame64 signal is made inactive at a timing one clock earlier than inactivation timing of the Dvalid64 signal in order to improve use efficiency of the bus 1.

Since the DID comparison circuit 37 outputs the matching signal and the Dvalid64 signal is active, the bus master control circuit 34 outputs the write permission signal to the bus read data buffer 33. In response to the write permission signal, the bus read data buffer 33 sequentially takes 64 bit read data on the bus read data line of the bus 2 to supply to CPU 30 as read data.

The timing control portion 22 of the data conversion unit 3 makes the Dvalid64 signal only for a period corresponding to amount of data active, and in conjunction therewith, makes the Frame64 signal inactive corresponding to the final data. It should be noted that, in the shown embodiment, the Frame64 is made inactive at one clock earlier timing than that of the Dvalid64 signal in order to improve use efficiency of the bus 1.

Thus, read command from the external master unit having data width of 64 bits to the external slave unit having data width of 32 bits can be executed.

Next, discussion will be given for the case where write command from the external master unit (not shown) having data width of 64 bits and connected to the bus master unit 4 to the external slave unit (not shown) having data width of 32 bits and connected to the bus slave unit 10, with reference to FIG. 8.

When the write command is executed, write data Data64, address data ADD and command data CMD are fed from the external master unit to the bus master unit 4. At this time, operation from a timing where the bus master unit 4 outputs address data ADD, command data CMD and DID data to the bus slave unit 10 to a timing where the bus slave unit 10 returns Devsel and Ack signal is substantially the same as timing of FIGS. 6 and 7 executing read command. Therefore, discussion for the operation will be eliminated in order to avoid redundant discussion and keep the disclosure simple enough to facilitate clear understanding of the present invention. Therefore, discussion will start from the timing where the Ack signal is returned from the bus slave unit 10.

The bus master control circuit 34 of the bus master unit 4 receives the Ack signal output by the bus slave unit 10 through the bus control line to output read selection signal to a multiplexer 36. In response to the read selection signal, the multiplexer 36 outputs 64 bit write data WD0 to WD3 stored in the bus write data buffer 32, and in conjunction therewith, outputs Dvalid64 signal indicating that these data are effective, to the 64 bit data valid line. On the other hand, the bus master control circuit 34 makes the Frame64 signal and the Master signal inactive in response to completion of transfer of data. It should be noted that, in the shown embodiment, the Frame64 signal and the Master signal are made inactive at a timing one clock earlier than that of Dvalid64 signal in order to improve use efficiency of the bus 1.

Write data WD0 to WD3 and the Dvalid64 signal are supplied to data conversion unit 3 via the bus 1. The 64 bit write data WD0 to WDS3 are supplied to the multiplexers 23 and 24 via the 64 bit data line and is written in the data buffer 21 in response to the write selection signal of the timing control portion 22. This write operation is executed by the timing control portion 22 and the multiplexers 23 and 24 similarly to the case where 64 bit data is written in data buffer by executing read command.

Furthermore, the timing control portion 22 is responsive to the Dvalid64 signal to output the 32 bit output selection signal to the multiplexer 26 to sequentially output 32 bit write data WD0 to WD7 to the 32 bit data line, and in conjunction therewith outputs the Dvalid32 signal to a 32 bit data valid signal line, in order to output write data WD0 to WD3 written in the data buffer 21.

Since it has been known that own circuit is selected based on address data ADD, the bus slave control circuit 44 of the bus slave unit 10 outputs write permission signal and transfer start signal to the bus write data buffer 42 in response to the Dvalid32 signal. The bus write data buffer 42 stores write data WD0 to WD7 on the bus write data line in response to the write permission signal.

The bus slave control circuit 44 makes the Dvalid32 signal and the Frame32 signal inactive in response to reception of all write data WD0 to WD7. It should be noted that, in the shown embodiment, Frame32 is made inactive at a timing one clock earlier than that of the Dvalid32 signal in order to improve use efficiency of the bus 2.

On the other hand, the timing control circuit 47 receiving the transfer start signal outputs a transfer request to the external slave unit. The external slave unit is responsive to the transfer request to receive command data CMD, address data ADD, DID data and write data WD0 to WD7 to execute writing on the basis of the command data CMD.

Thus, write command from the external master unit having data width of 64 bits to the external slave unit having data width of 32 bits is executed.

Conversely to the case where write command from the external master unit having data width of 64 bits to the external slave unit having data width of 32 bits, when the write command from the external master unit having data width of 32 bits to the external slave unit having data width of 64 bits is executed, it is similar to the case where the write command is executed as set forth above except that outputting of the write data WD0 to WD3 of 64 bit width and Dvalid64 is waited until half or more of 3 bit width write data WD0 to WD7 from the bus master unit are received as shown in FIG. 9 and control is effected by the timing control portion 22 of the data conversion unit 3 so that conversion of data is reversed. Therefore, detailed discussion for this operation will be eliminated for avoiding redundant discussion and for simplification of disclosure to facilitate clear understanding of the present invention. On the other hand, concerning manner of conversion of data, discussion will be eliminated since discussion has already been given for the case where the read command is executed as set forth above.

As set forth above, in the bus connection circuit of the shown embodiment, even when read data bus and write data bus are common, upon performing split transfer, it becomes unnecessary to perform arbitration of bus right upon transfer across buses and only conversion of data is required, lesser clock cycles are required in read access and write access.

On the other hand, a sender (e.g. CPU) is responsive to the Ack signal from transmission destination (e.g. memory) to release the bus right of the bus, to which the sender is connected. Accordingly, data transfer from the sender to the transmission destination is performed in the same bus cycle. Therefore, upon occurrence of data transfer error, loss of data for storing of data in the sender is not caused until completion of the bus cycle.

When data transfer error to the transmission destination is caused, occurrence of data transfer error is notified to the sender by feeding the NACK signal by the transmission destination between the bus 1 and the bus 2 through the common control command bus.

Furthermore, by providing only hardware to perform conversion data by extracting necessary condition of data conversion, and complete parsing of the control command or the line is not necessary, circuit construction becomes simple and necessary hardware amount can be reduced.

On the other hand, in the bus control circuit in this embodiment, for smaller number of times of arbitration for bus right, delay can be small. As a result, throughput of the bus can be improved.

It should be noted that while the foregoing discussion has been given in terms of the bus master unit incorporating the DID comparison circuit, it is also possible to externally provide the DID comparison circuit independently of the bus master unit.

As set forth above, in the first embodiment, discussion has been given for the case where the split transfer is performed. Discussion will be given hereinafter with respect to the case where non-split transfer is performed.

Second Embodiment

Figure 10:
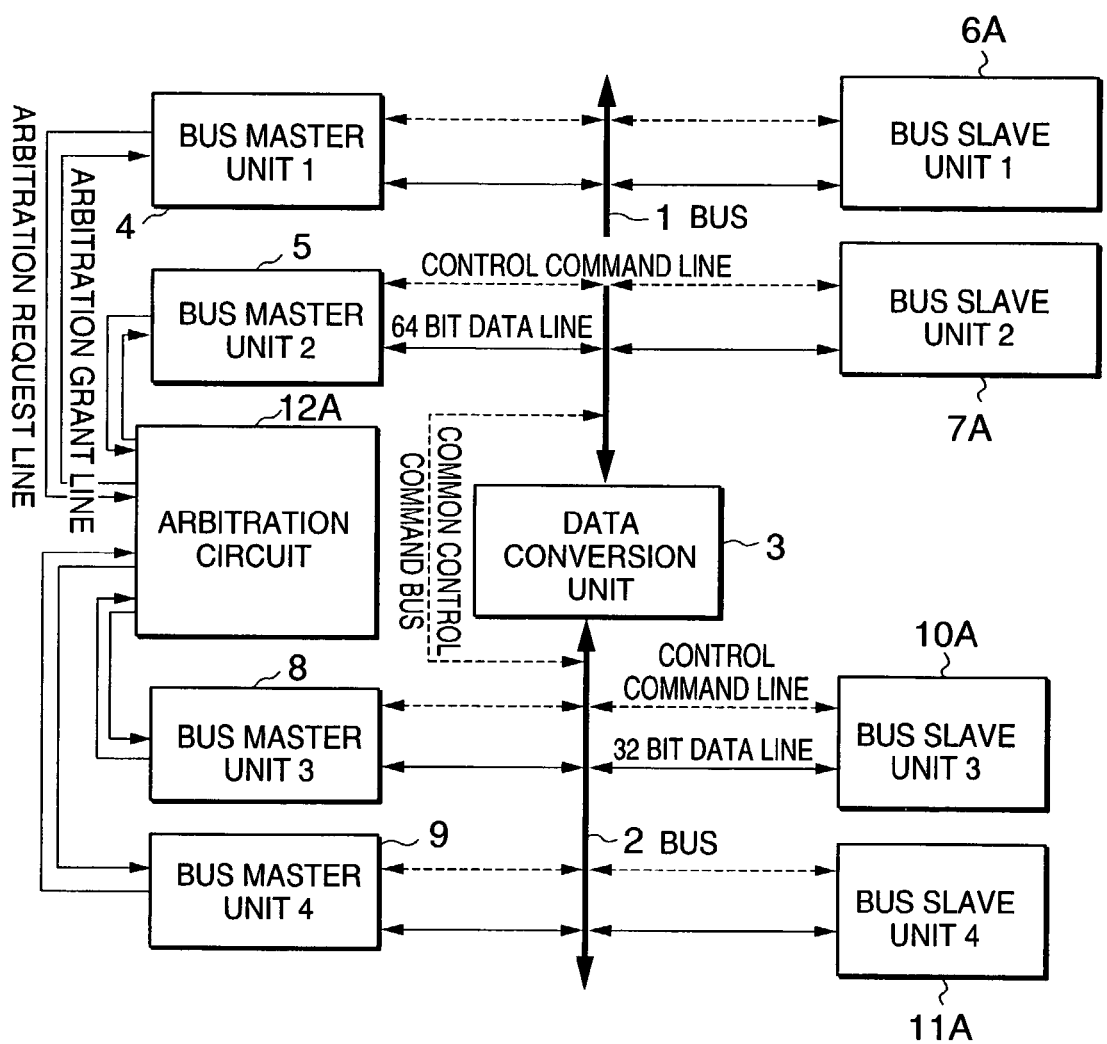
FIG. 10 is a block diagram showing a construction of the second embodiment of the bus system according to the present invention.
Figure 11:
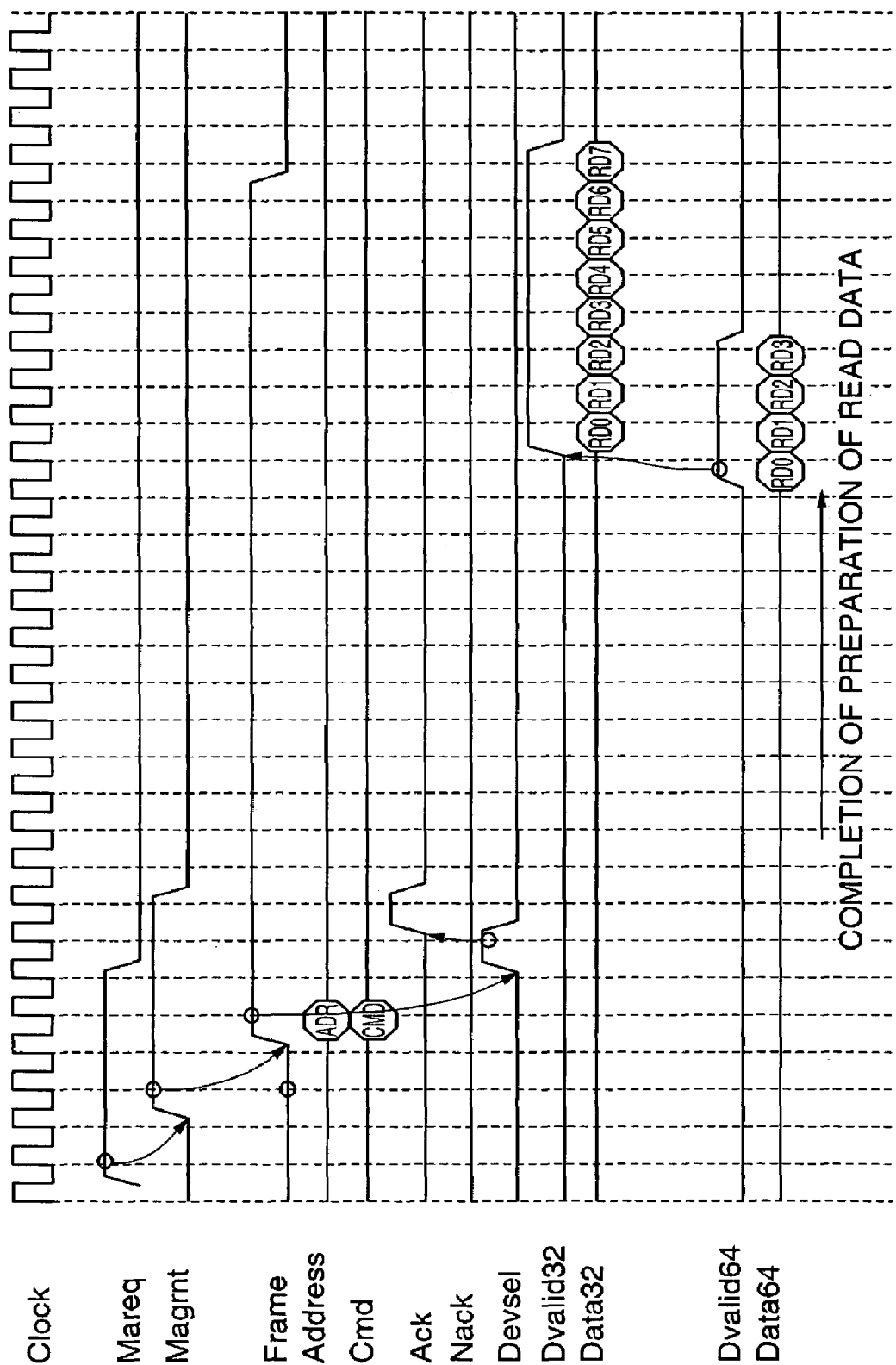
FIG. 11 is a timing chart showing a data transfer operation upon read access to a 64 bit bus slave unit from a 32 bit bus master unit in the second embodiment.

FIG. 10 is a block diagram showing a construction of the second embodiment of the bus system according to the present invention, FIG. 11 is a timing chart showing a data transfer operation upon read access to a 64 bit bus slave unit from a 32 bit bus master unit in the second embodiment, and FIG. 12 is an explanatory illustration showing a data structure of a command in the second embodiment.

As the second embodiment, discussion will be given for the bus system performing non-split transfer with reference to FIG. 10. In non-split transfer, since the bus is occupied from outputting of command from the bus master unit, performing process by the bus slave unit and returning of data to the bus master unit, the bus master unit does not require DID data. Also, the bus slave unit does not require arbitration operation. Accordingly, the bus slave unit and the arbitration circuit of the second embodiment are different from those in the first embodiment as not being provided with an arbitration request line and an arbitration grant line in order to connect between the bus slave unit and the arbitration circuit. It should be noted that like elements to those in the first embodiment will be identified by like reference numerals and detailed discussion for these common components will be eliminated for avoiding redundant discussion and whereby keeping the disclosure simple enough to facilitate clear understanding of the present invention.

Hereinafter, operation in the case where the external master unit having data width of 32 bits and connected to the bus master unit 8 outputs the read command to the external slave unit having data width of 64 bits and connected to the bus slave unit 6A, will be discussed with reference to FIGS. 10 and 11.

It should be noted that the operation from a timing of outputting of address data ADD, command data CMD and the transfer request signal Mreq from the external master unit to the bus master unit having data width of 32 bits to a timing of outputting of the Devsel signal and the Ack signal from the bus slave unit 6A having data width of 64 bits to the bus master unit 8, is substantially the same as the timings of FIG. 6, and detailed discussion for these substantially common process will be eliminated for avoiding redundant discussion and whereby keeping the disclosure simple enough to facilitate clear understanding of the present invention.

On the other hand, the bus slave unit of FIG. 10 is substantially the same as that discussed with reference to FIG. 5 except that the bus DID buffer 41C and the bus slave control circuit 44 in the bus slave unit of FIG. 5 do not perform operation for obtaining bus right to the arbitration circuit 12.

The bus slave control circuit 44 of the bus slave unit 6A outputs the transfer start signal together with the Devsel signal and the Ack signal. The external slave unit is responsive to the transfer start signal, address data ADD and command data CMD to execute process to output read data RD0 to RD3 to the bus slave unit 6A. The bus slave unit 6A receiving read data RD0 to RD3 outputs read data to the data conversion unit 3 via the bus read data line and in conjunction therewith outputs the Dvalid64 signal to the bus control line. On the other hand, the bus slave unit 6A makes the Dvalid64 signal inactive when outputting of read data is completed.

The data conversion unit 3 receives the Dvalid64 signal and read data RD0 to RD3 and outputs the Dvalid32 signal in response to the Dvalid64 signal. Also, the data conversion unit 3 converts 64 bit read data RD0 to RD3 into 32 bit read data RD0 to RD7 for outputting. The timing control portion 22 of the data conversion unit 3 makes the Dvalid32 signal invalid in response to completion of outputting of 32 bit read data RD0 to RD7.

The bus master control circuit 34 of the bus master unit 8 receiving 32 bit read data RD0 to RD7 makes the Frame signal inactive in response to completion of reception of read data RD0 to RD7 to release the bus 1. It should be noted that, in the shown embodiment, since data size is preliminarily known, the Frame signal is made inactive to release the bus at a timing one clock earlier than completion of reception.

It should be noted that concerning operation in respective units, except for operation unique to split transfer, operation is similar to that discussed in terms of execution of read command by split transfer set forth in the first embodiment.

When such non-split transfer is to be executed between buses having different bus widths, one arbitration circuit is provided for two buses to obtain bus rights for both buses by arbitration request from the bus master unit at once.

In the shown embodiment of the bus connection circuit, read bus and write bus are common. Upon performing non-split transfer, arbitration of bus right across buses becomes unnecessary and only conversion of data is required. Therefore, number of clock cycles in read access and write access can be reduced.

Even in the shown embodiment, it is similar to the first embodiment in that loss of data in the sender cannot be caused upon occurrence of data transfer error, and occurrence of data transfer error can be notified to the sender.

Furthermore, control over the detail of the command control signal as required in the conventional bus master control circuit and/or the bus slave control circuit, is unnecessary and is only required the hardware for performing data conversion by extracting conditions requiring data conversion. Therefore, circuit construction can be simplified and necessary hardware amount can be reduced.

The bus connection circuit in this embodiment requires smaller hardware amount on slave side in comparison with the case of split transfer system. However, since a period to occupy the bus becomes longer, throughput becomes lower in comparison with the first embodiment. However, in comparison with the non-split transfer employing the bus bridge circuit as in the prior art, throughput is improved.

Discussion for Flowchart

Figure 13:
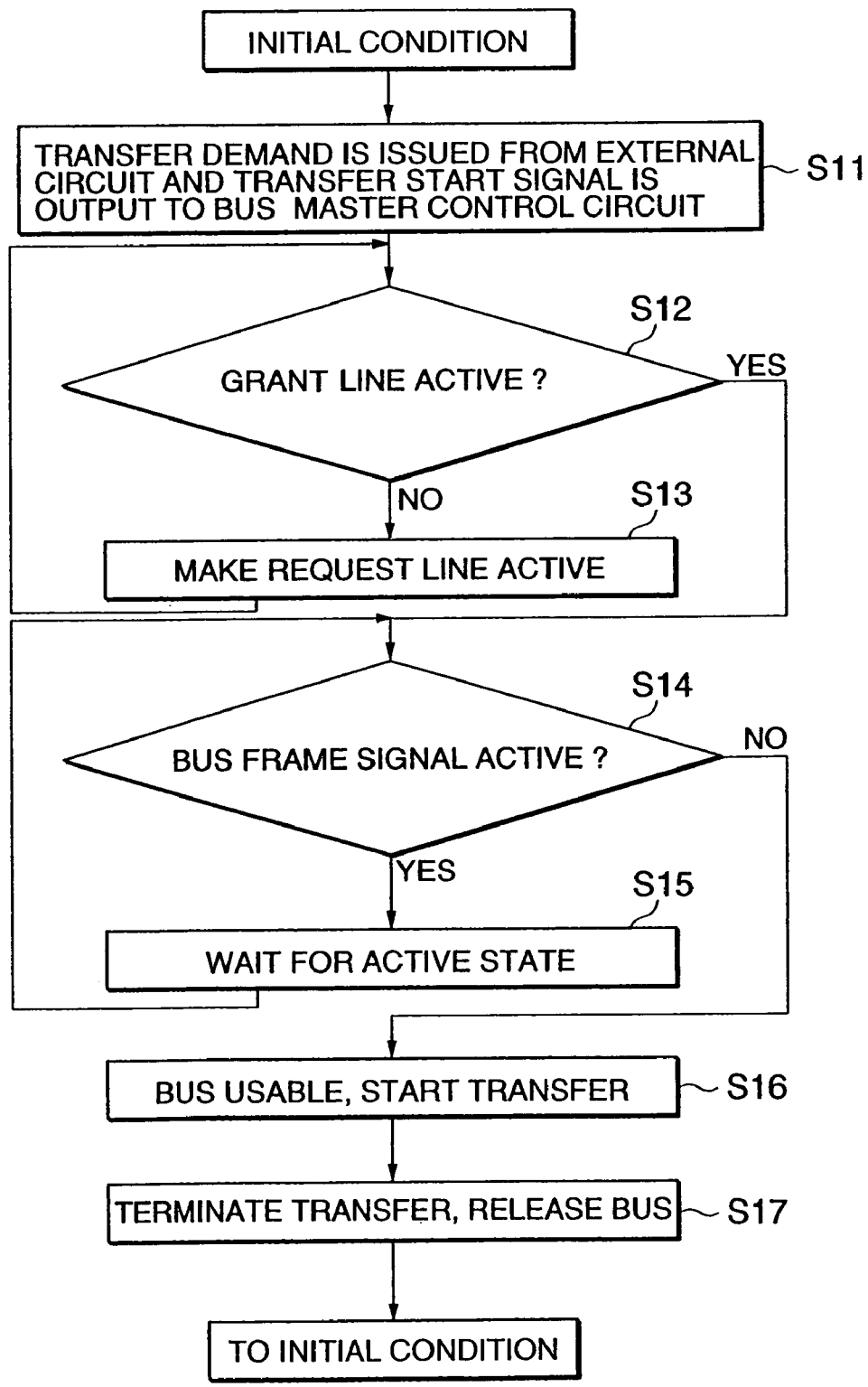
FIG. 13 is a flowchart showing process from arbitration of bus right to use of bus in the second embodiment of the bus connection circuit.
Figure 14:
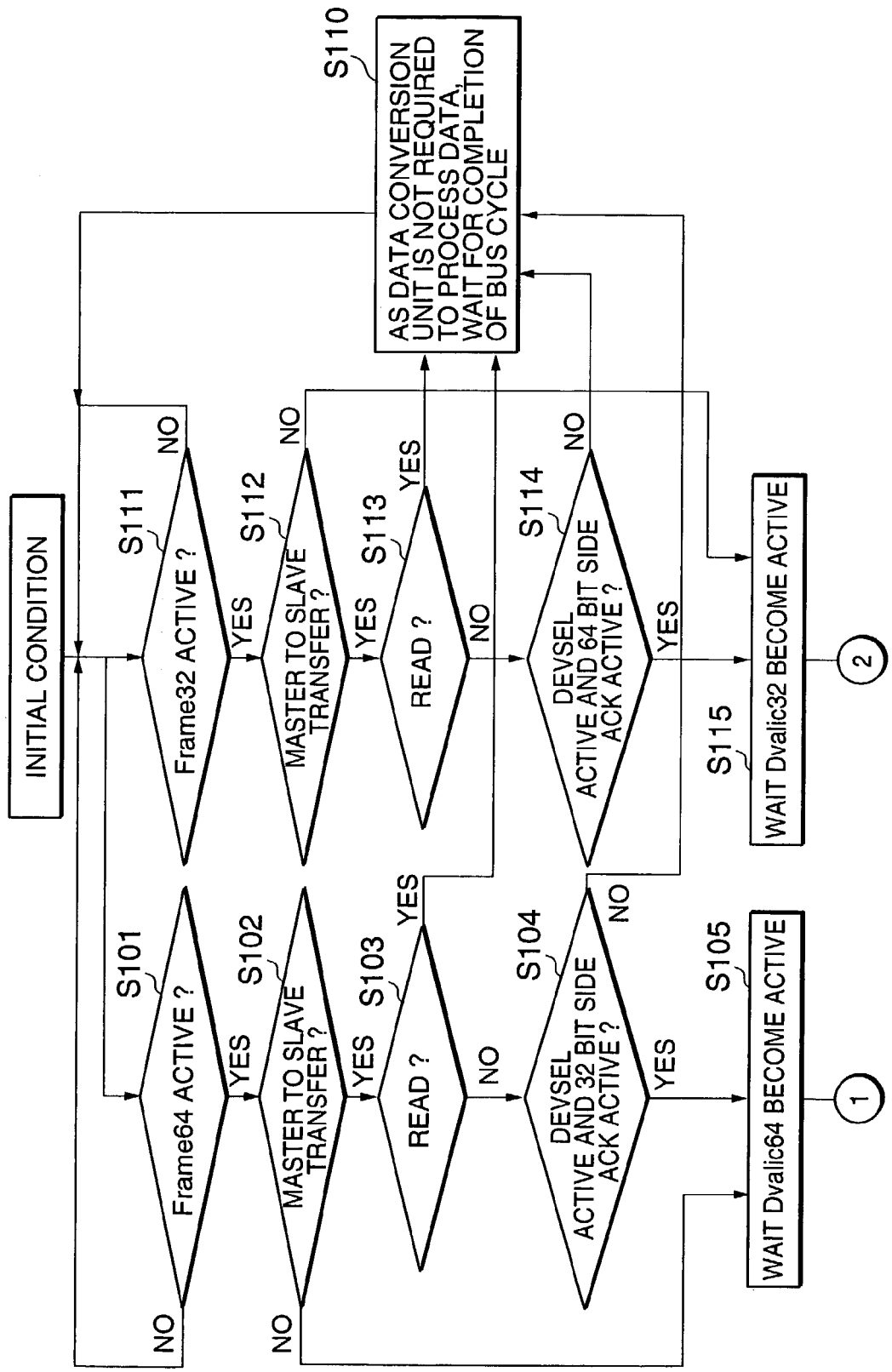
FIG. 14 is a flowchart for explaining process procedure of the data conversion unit upon split transfer in the second embodiment of the bus system.
Figure 15:
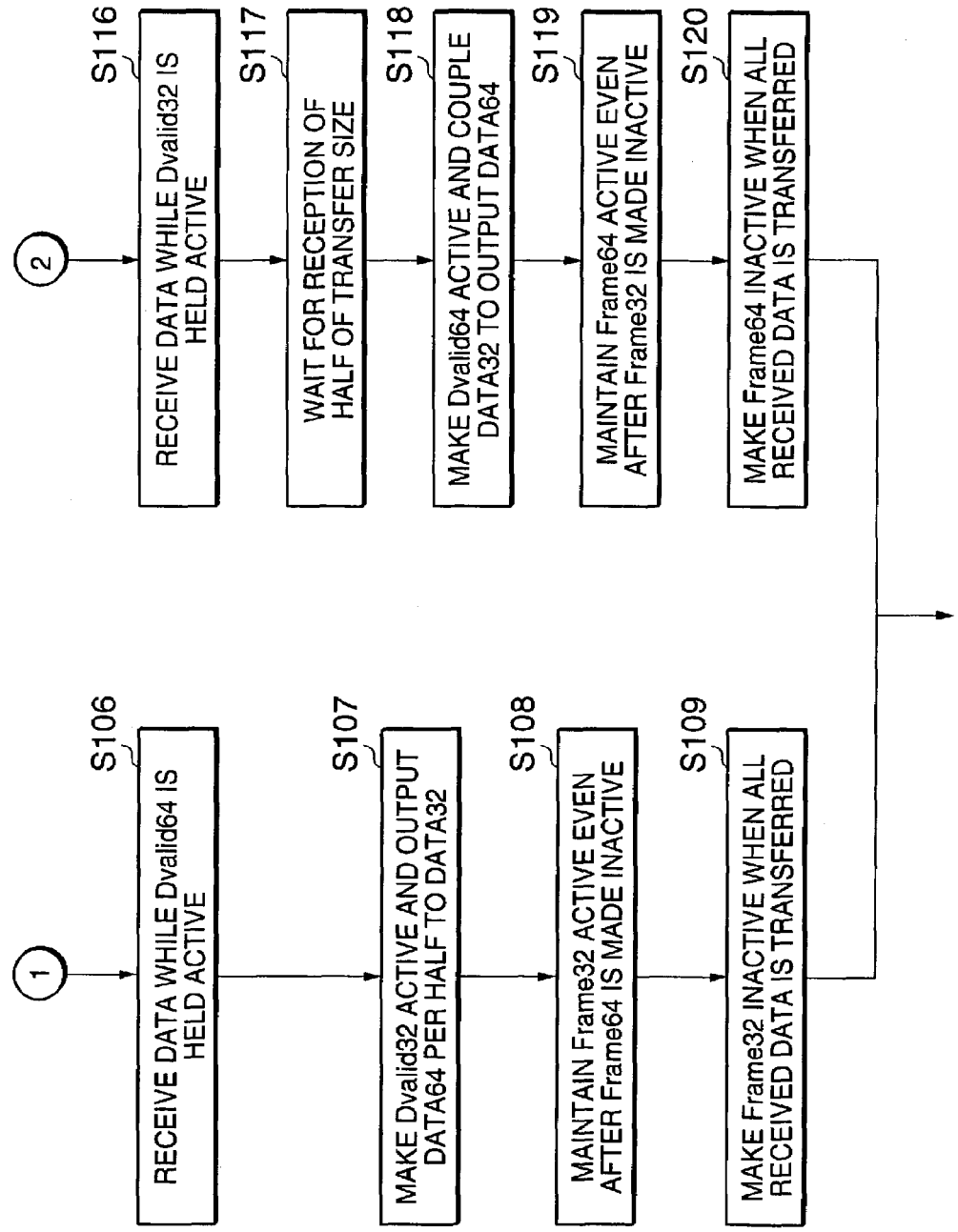
FIG. 15 is a flowchart for explaining process procedure of the data conversion unit upon split transfer in the second embodiment of the bus system.
Figure 16:
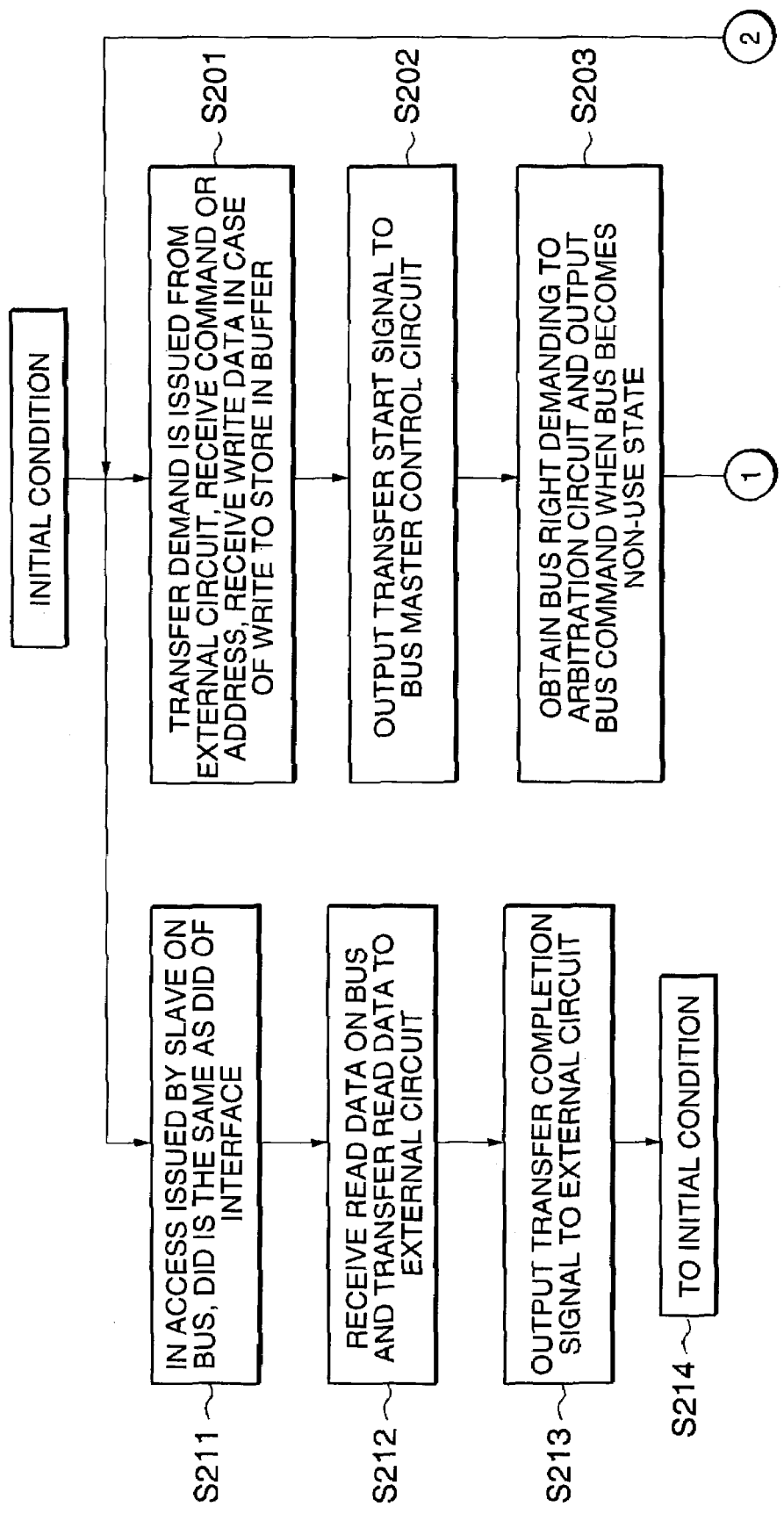
FIG. 16 is a flowchart showing a process of bus master unit including arbitration operation of bus right in the second embodiment of the bus system.
Figure 17:
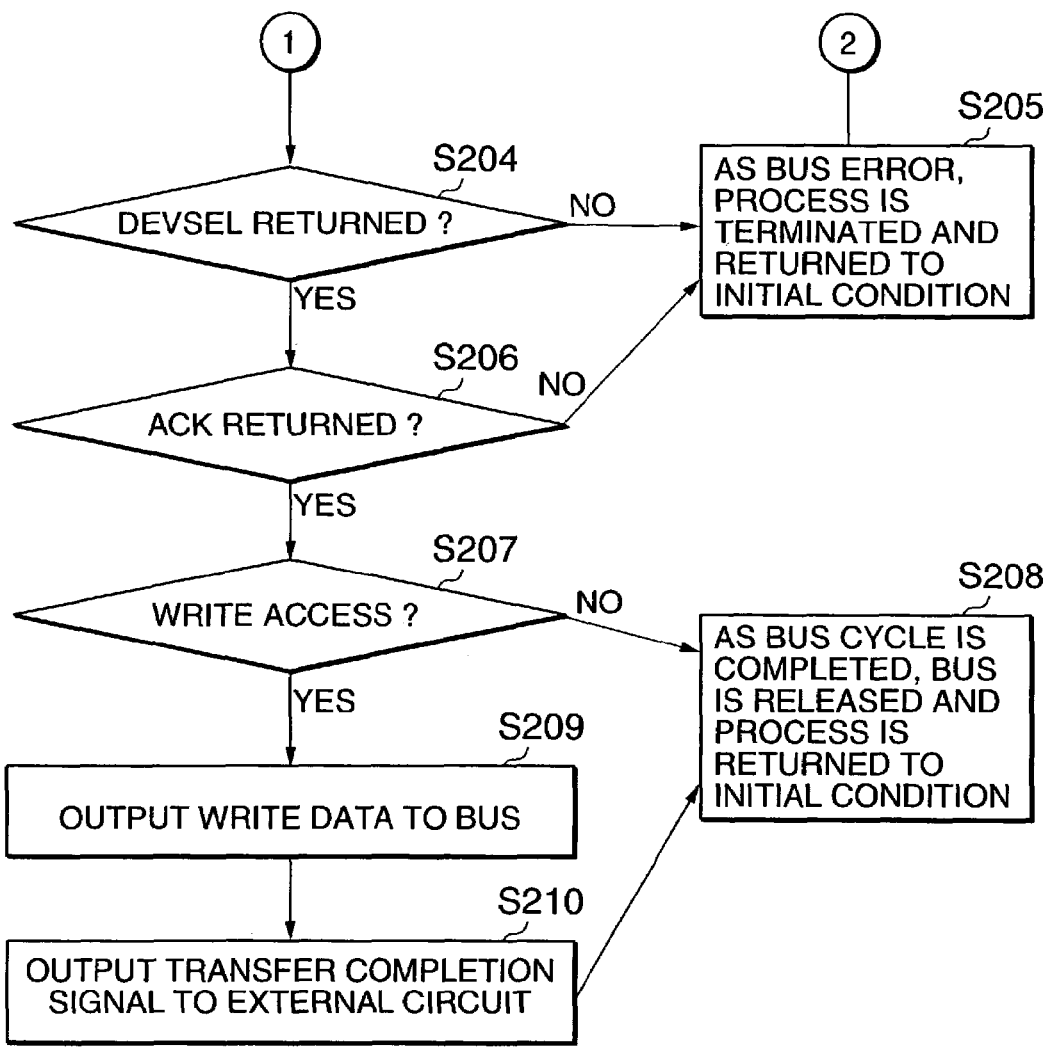
FIG. 17 is a flowchart showing a process of bus master unit including arbitration operation of bus right in the second embodiment of the bus system.
Figure 18:
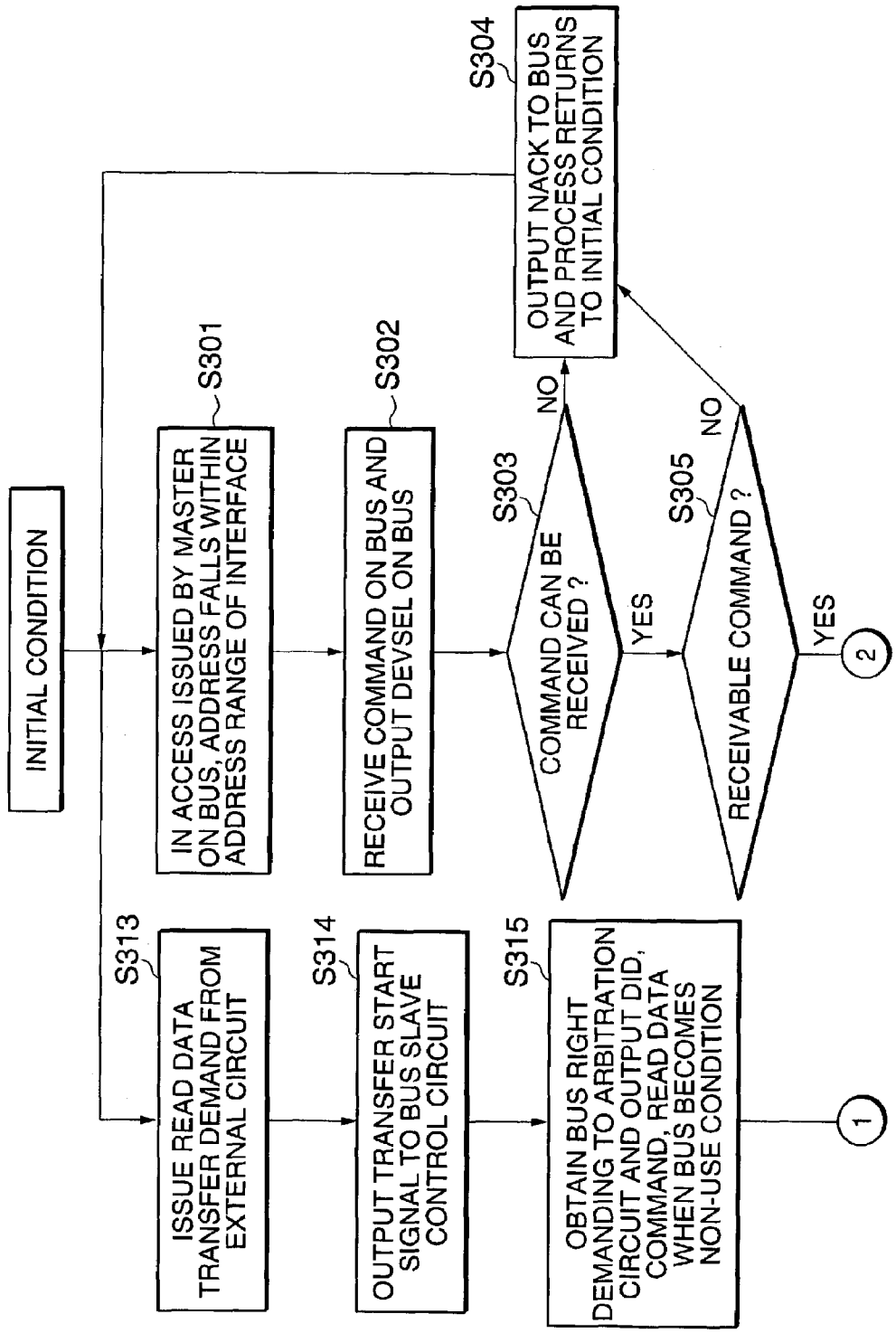
FIG. 18 is a flowchart showing a process of bus slave unit including arbitration operation of bus right in the second embodiment of the bus system.
Figure 19:
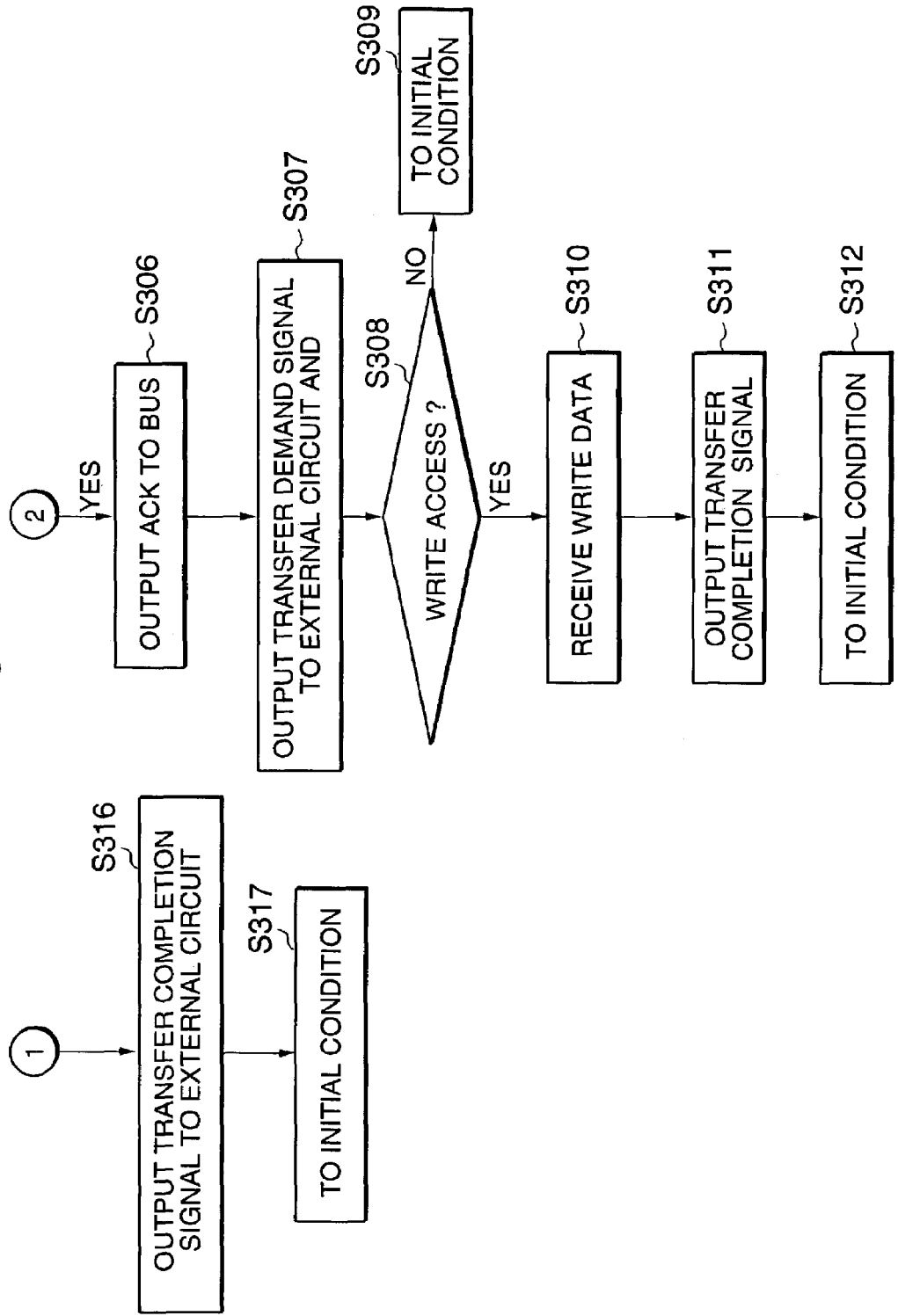
FIG. 19 is a flowchart showing a process of bus slave unit including arbitration operation of bus right in the second embodiment of the bus system.

FIG. 13 is a flowchart showing process from arbitration of bus right to use of bus in the second embodiment of the bus connection circuit, FIG. 14 is a flowchart for explaining process procedure of the data conversion unit upon split transfer in the second embodiment of the bus system, FIG. 15 is a flowchart for explaining process procedure of the data conversion unit upon split transfer in the second embodiment of the bus system, FIG. 16 is a flowchart showing a process of bus master unit including arbitration operation of bus right in the second embodiment of the bus system, FIG. 17 is a flowchart showing a process of bus master unit including arbitration operation of bus right in the second embodiment of the bus system, FIG. 18 is a flowchart showing a process of bus slave unit including arbitration operation of bus right in the second embodiment of the bus system, and FIG. 19 is a flowchart showing a process of bus slave unit including arbitration operation of bus right in the second embodiment of the bus system.

Next, discussion will be given for flow of process from arbitration for the bus right to use of bus in the bus connection circuit of the shown embodiment with reference to the flowchart shown in FIG. 13.

As shown in the illustration of system construction shown in FIG. 2, the arbitration request lines and the arbitration grant lines are connected all bus master units and bus slave units from the arbitration circuit 12. The arbitration request line is used when the bus master unit desires to start transfer. The arbitration grant line is used when the arbitration circuit outputs when arbitration of the bus right is established. Among a plurality of arbitration grant lines, only one is made active selectively. When a plurality of arbitration request lines are made active simultaneously, arbitration is performed in consideration of preference and the arbitration grant line for one of the bus master units is made active.

Now, when transfer demand is generated from the external circuit (external master unit) and the transfer start signal is output to the bus master control circuit (bus master unit) (step S11), check is performed whether the arbitration grant line connected to the bus master control circuit is in active condition or not (step S12). When the arbitration grant line is not active, the arbitration request line is made active (step S13) to wait for turning of the arbitration grant line into active state.

When the arbitration grant line becomes active state, check is performed whether the bus frame signal (Frame64 or Frame32 signal) on the bus is in active state or not (step S14) If the bus frame signal is active, it indicates that bus is on use. In such case, turning of the bus frame signal into inactive state is waited (step S15).

When the bus frame signal becomes inactive state, it represents that bus can be used. Therefore, transfer is started (step S16). Upon completion of transfer, the bus right is made inactive and the bus frame signal is also made inactive to release the bus (step17). Then process returns to the initial state.

Next, process procedure of the data conversion unit 3 upon split transfer in the case of the bus connection circuit of FIG. 1 will be discussed with reference to FIGS. 14 and 15.

(1) Upon Read Access from 32 Bit Bus Master Unit to 64 Bit Bus Slave Unit

When Frame 32 output from the bus master unit to the bus on 32 bit side in the condition where bus right is given as a result of arbitration is active (step S111), in case of transfer from the bus master unit to the bus slave unit (step S112) and read access (step S113), the data conversion unit is not required to process data in read command transmission. Therefore, Frame32 is made inactive, and completion of bus cycle is waited (step S110).

As read data in the bus slave unit get ready, when Frame64 output from the bus slave unit to the bus on 64 bit side is made active (step S101), the process waits for Dvalid64 from the bus slave unit and indicative of effective period becoming active (step S105), Data64 is received from the bus slave unit during a period where Dvalid64 is maintain in active state (step S106).

Then, with receiving 64 bit data from the bus slave unit, Dvalid32 to the bus on 32 bit side is made active, and respective halves of the received Data64 are output to the bus on 32 bit side as Data32 (step S107). Subsequently, even after completion of data transfer from the bus slave unit and Frame on the bus on 64 bit side is made inactive, Frame is maintained in active state on the bus of 32 bit side (step S108). Finally, when all data received from the bus slave unit is transferred, Frame is made inactive and bus cycle is terminated (step S109).

(2) Upon Read Access from 64 Bit Bus Master Unit to 32 Bit Bus Slave Unit

When Frame output from the bus master unit to the bus on 64 bit side is made active in the condition where bus right is given as a result of arbitration (step S101), in case of transfer from the bus master unit to the bus slave unit (step S102) and in case of read access (step S103), since the data conversion unit is not required to process data, Frame is made inactive, and then completion of bus cycle is waited (step S110)

As read data in the bus slave unit get ready, when Frame output from the bus slave unit to the bus on 32 bit side is made active (step S111), the process waits for Dvalid32 from the bus slave unit and indicative of effective period becoming active (step S115), Data32 is received from the bus slave unit during a period where Dvalid32 is maintain in active state (step S116).

Then, waiting reception of data half or more of the transfer size (step S117), Dvalid64 to the bus on 64 bit side is made active to combine data of two Data32 to output to the bus on 64 bit side as Data64 (step S118). At this time, which of two data are placed in upper bits of 64 bit data, is determined depending upon addressing mode determined by system which of upper or lower bit of 64 bit data is counted as higher address.

Subsequently, even after completion of data transfer from the bus slave unit and Frame on the bus on 32 bit side is made inactive, Frame is maintained in active state on the bus of 64 bit side (step S119). Finally, when all data received from the bus slave unit is transferred, Frame is made inactive and bus cycle is terminated (step S120).

(3) Upon Write Access from 32 Bit Bus Master Unit to 64 Bit Bus Slave Unit

When Frame output from the bus master unit to the bus on 32 bit side in the condition where bus right is given as a result of arbitration (step S111), in case of transfer from the bus master unit to the bus slave unit (step S112) and read access (step S113), the data conversion unit waits for Dvalid32 output from the bus master unit becoming active (step S115).

Then, while Dvalid32 is active, the data conversion unit receives Data32 from the bus master unit (step S116) and reception of data half or more of the transfer size is waited (step S117). Subsequently, in the bus on the 64 bit side, Dvalid64 is made active to combine data of two Data32 to output to the bus slave unit as Data64 (step S118). Even after Frame on the bus on 32 bit side is made inactive, Frame is maintained in active state on the bus of 64 bit side (step S119). Finally, when all data received from the bus slave unit is transferred, Frame is made inactive and bus cycle is terminated (step S120).

(4) Upon Write Access from 64 Bit Bus Master Unit to 32 Bit Bus Slave Unit

When Frame output from the bus master unit to the bus on 64 bit side is made active in the condition where bus right is given as a result of arbitration (step S101), in case of transfer from the bus master unit to the bus slave unit (step S102) and in case of read access (step S103), when Devsel output from the bus slave unit on 32 bit side is active and ACK on 32 bit side is active (step S104), the data conversion unit waits for Dvalid64 output from the bus master unit becoming active (step S105).

Then, while Dvalid64 is active, the data conversion unit receives Data64 from the bus master unit (step S106), Dvalid32 output to the bus on 32 bit side is made active, and respective halves of data of Data64 are output to the bus slave unit as Data32 (step S107). Subsequently, even after Frame on the bus on 32 bit side is made inactive, Frame is maintained in active state on the bus of 32 bit side (step S108). Finally, when all data received from the bus slave unit is transferred, Frame is made inactive and bus cycle is terminated (step S109).

Next, discussion will be given for flow of process of the bus master unit and the bus slave unit including arbitration for bus right in the bus connection circuit of FIG. 1 with reference to FIGS. 16 to 19. It should be noted that these flowcharts show processes in split transfer operation.

FIGS. 16 and 17 are flowcharts showing process of the bus master unit including arbitration operation of the bus right.

(1) Transfer Operation of Command and Write Data of Bus Master Unit

Upon occurrence of transfer demand from the external master unit, command and address are received, and in conjunction therewith, in case of write access, write data is also received to store in a buffer (step S201). Next, when the transfer start signal is output to the bus master control circuit (step S202), the bus master control circuit obtains the bus right demanding arbitration for bus right to the arbitration circuit, and when bus becomes non-use condition, bus command is output (step S203).

Then, with checking whether Devsel is returned from the bus slave unit (step S204), if Devsel is not returned, it can be judged as bus error being caused. Then, process is terminated to return to initial state (step S205). On the other hand, when Devsel is returned, check is performed whether ACK indicative of permission of transmission of data is returned or not (step S206). If Devsel is not returned, it can be judged as bus error being caused. Then, process is terminated to return to initial state (step S205).

When ACK is returned, check is performed if the demanded access is write access or not (step S207). If the access is not write access, since bus cycle is completed, bus is released and process returns to the initial state (step S208). When the access is write access, write data is output to the bus (step S209) and the completion signal of transfer is output to the external master unit which demanded transfer (step S210). Then, since bus cycle is completed, bus is released and process returns to the initial state (step S208).

(2) Receiving Operation of Read Data from Bus Master Unit

On the other hand, in case of read access, in access issued by the bus slave unit on the bus, and when DID is the same as DID of the bus master unit (step S211), read data on the bus is received and read data is transferred to the external master unit (step S212). Thereafter, the completion signal of transfer is output to the external master unit (step S213) to return to the initial state (step S214).

FIGS. 18 and 19 are flowcharts showing processes of the bus slave unit including arbitration operation for bus right.

(1) Receiving Operation of Command and Write Data of Bus Slave Unit

In access issues by the bus master unit on the bus, if the address falls within an address range of the bus slave unit (step S301), the bus slave unit receives the command on the bus to output Devsel to the bus (step S302).

Then, checking whether command can be received or not (step S303). If reception is not possible, NACK indicating transmission is not permitted is output to the bus. and process returns to initial state (step S304). On the other hand, when the command can be received, check is performed whether the command can be accepted or not (step S305). If the command is not acceptable, NACK is output to the bus and process returns to the initial state (step S304).

If the command is acceptable, ACK indicating transmission is permitted is output to the bus (step S306) and transfer request signal is output to the external slave unit to which the write data is to be output to transfer corresponding command, address, DID and so forth (step S307).

Next, check is performed whether the access is write access or not (step S308). If not write access, the process returns to the initial state (step S309). If write access, write data is received (step S310) and is transferred to the external slave unit. Upon completion of transfer, completion signal of transfer of the external slave unit is output (step S311) and process returns to the initial state (step S312).

(2) Transfer Operation of Read Data of Bus Slave Unit

When transfer demand of the read data is issued from the external slave unit and command and DID are received (step S313), the transfer start signal is output to the bus slave control circuit (step S314). The bus slave control circuit obtains bus right demanding to the arbitration circuit. If the bus becomes non-use state, DID, command and read data are output (step S315). For the external slave unit, the completion signal of transfer is output (step S316), and process is then returned to the initial state (step S317).

Discussion Relating Top Wiring of Bus

Figure 20:
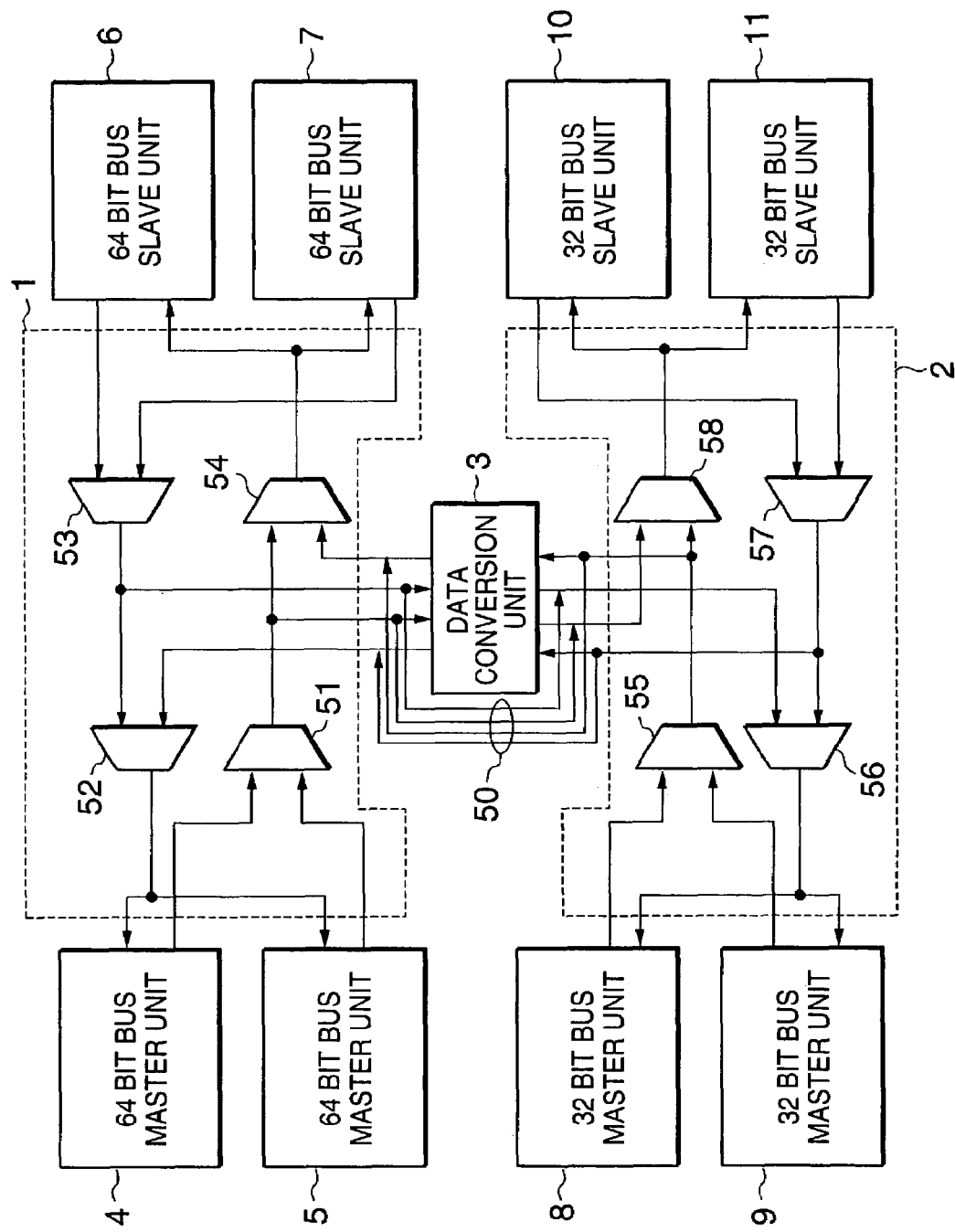
FIG. 20 is an illustration showing a construction of bus employing a multiplexer.
Figure 21:
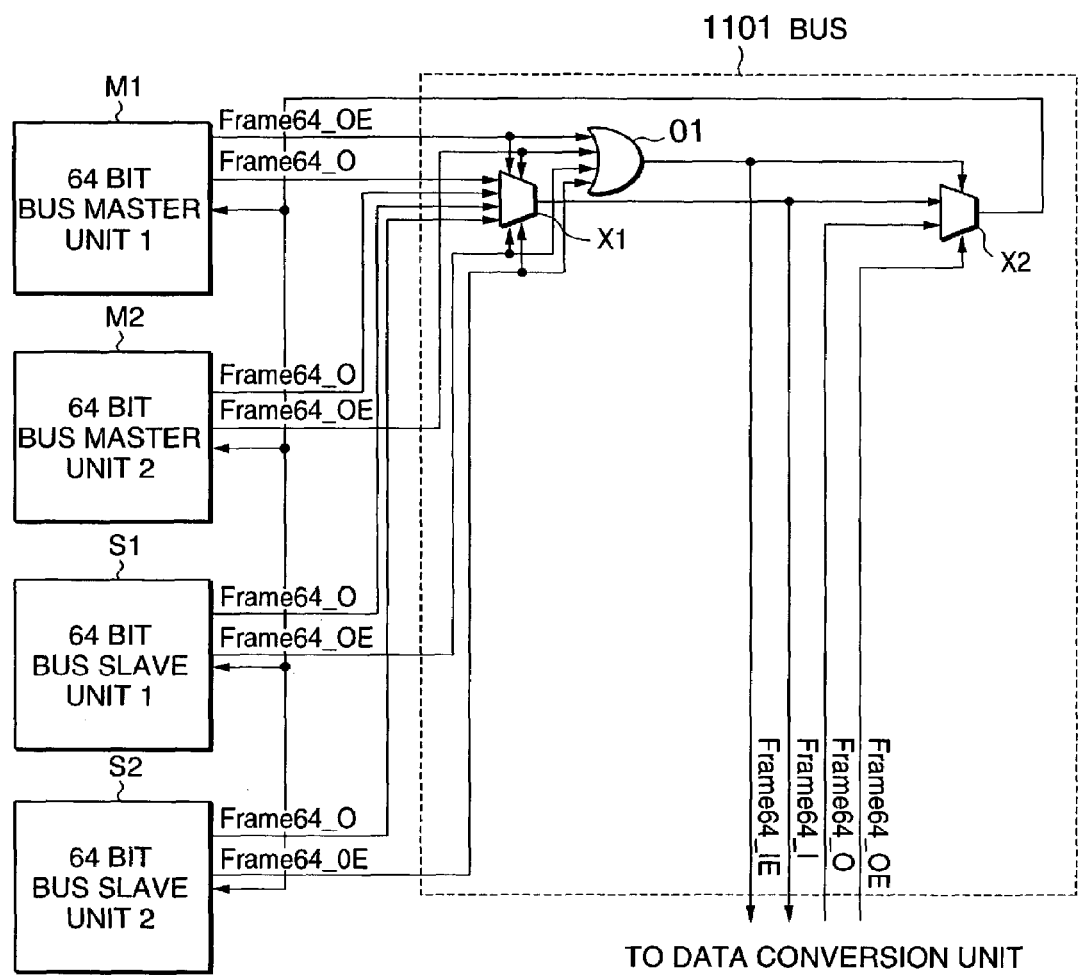
FIG. 21 is an illustration for explaining construction of the bus in multiplexer type in the case of transmitting a signal output by both of the bus master unit and the bus slave unit.
Figure 22:
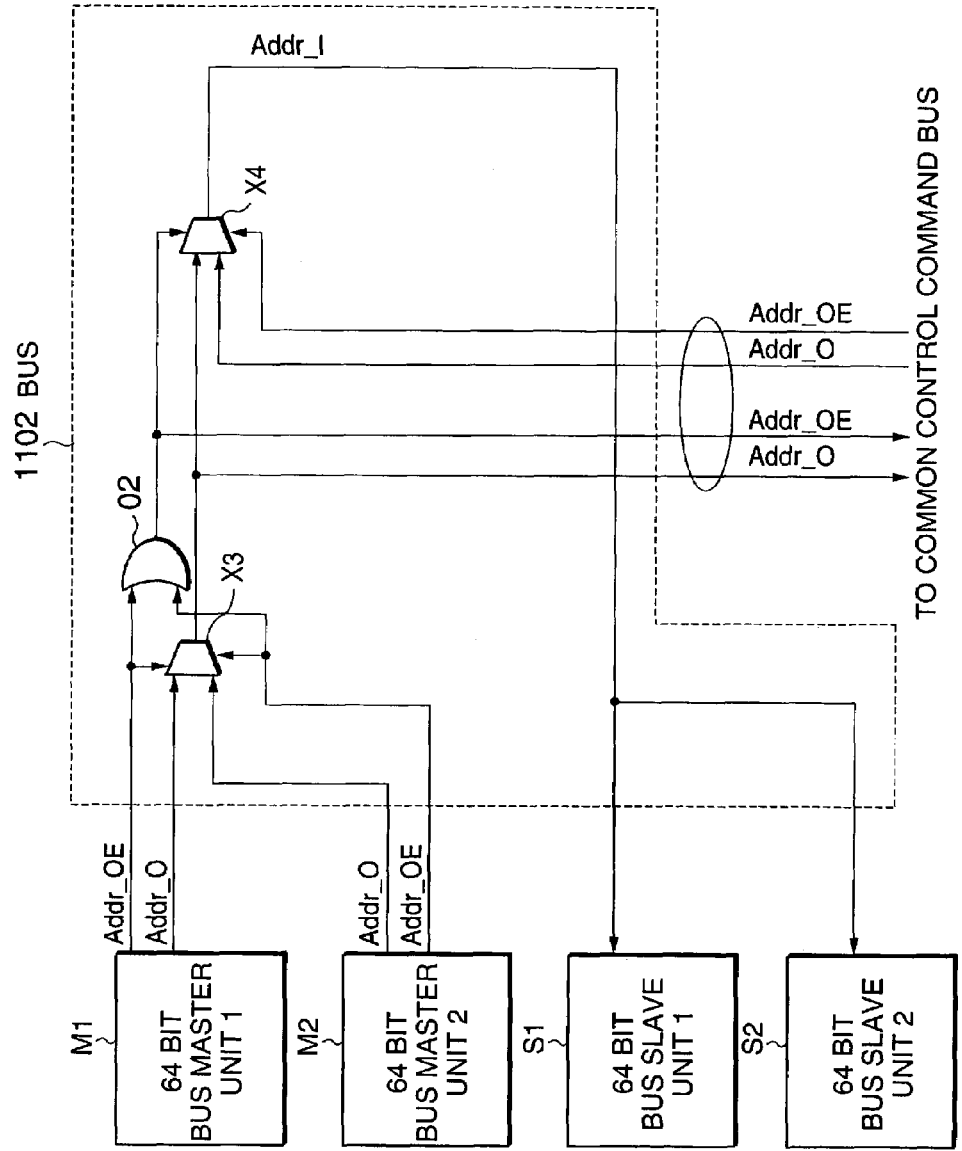
FIG. 22 is an illustration for explaining a construction of the bus in multiplexer type in case of transmitting a signal output only by the bus master unit.
Figure 23:
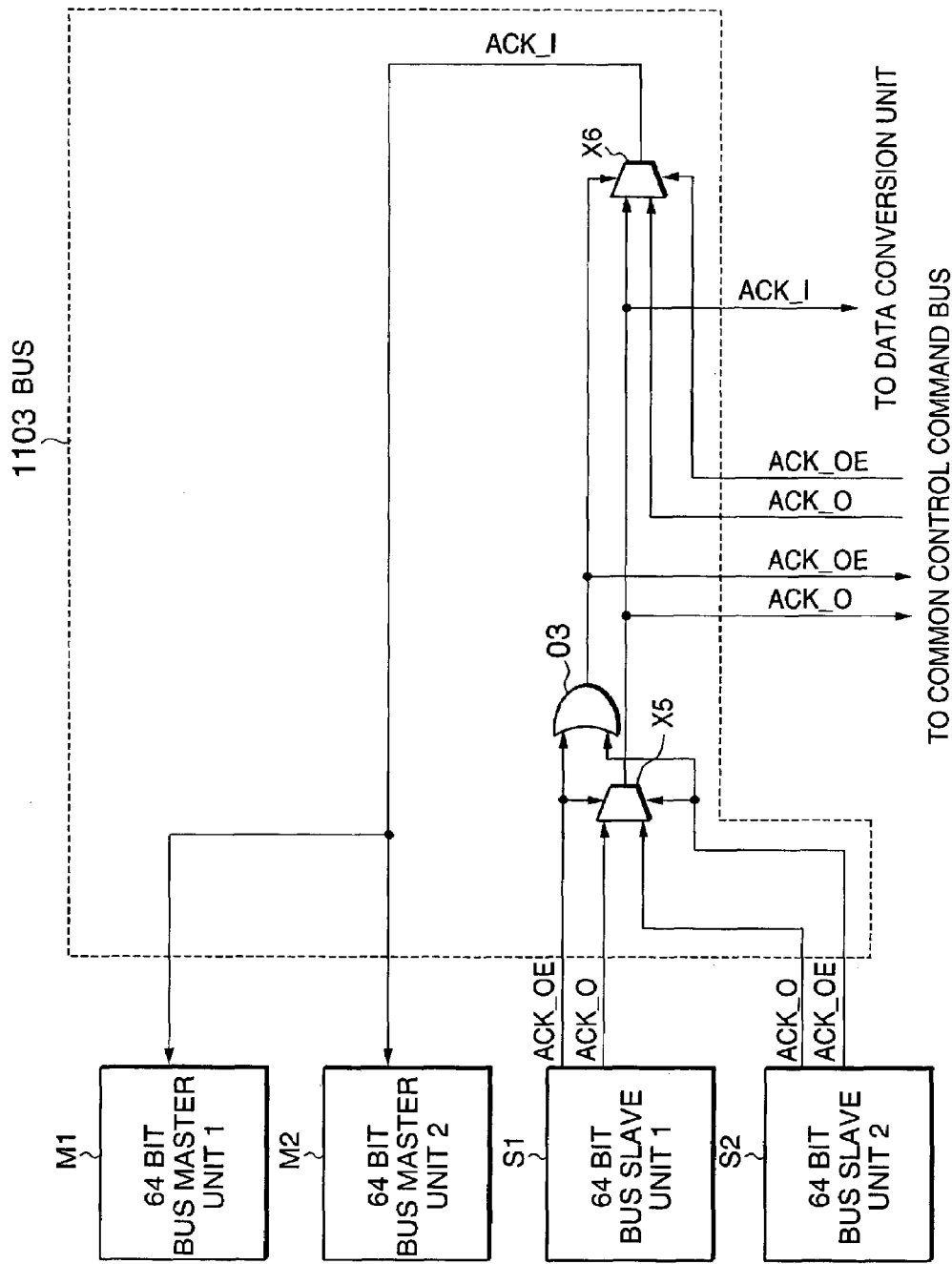
FIG. 23 is an illustration for explaining a construction of the bus in multiplexer type in case of transmitting a signal output only by the bus slave unit.
Figure 24:
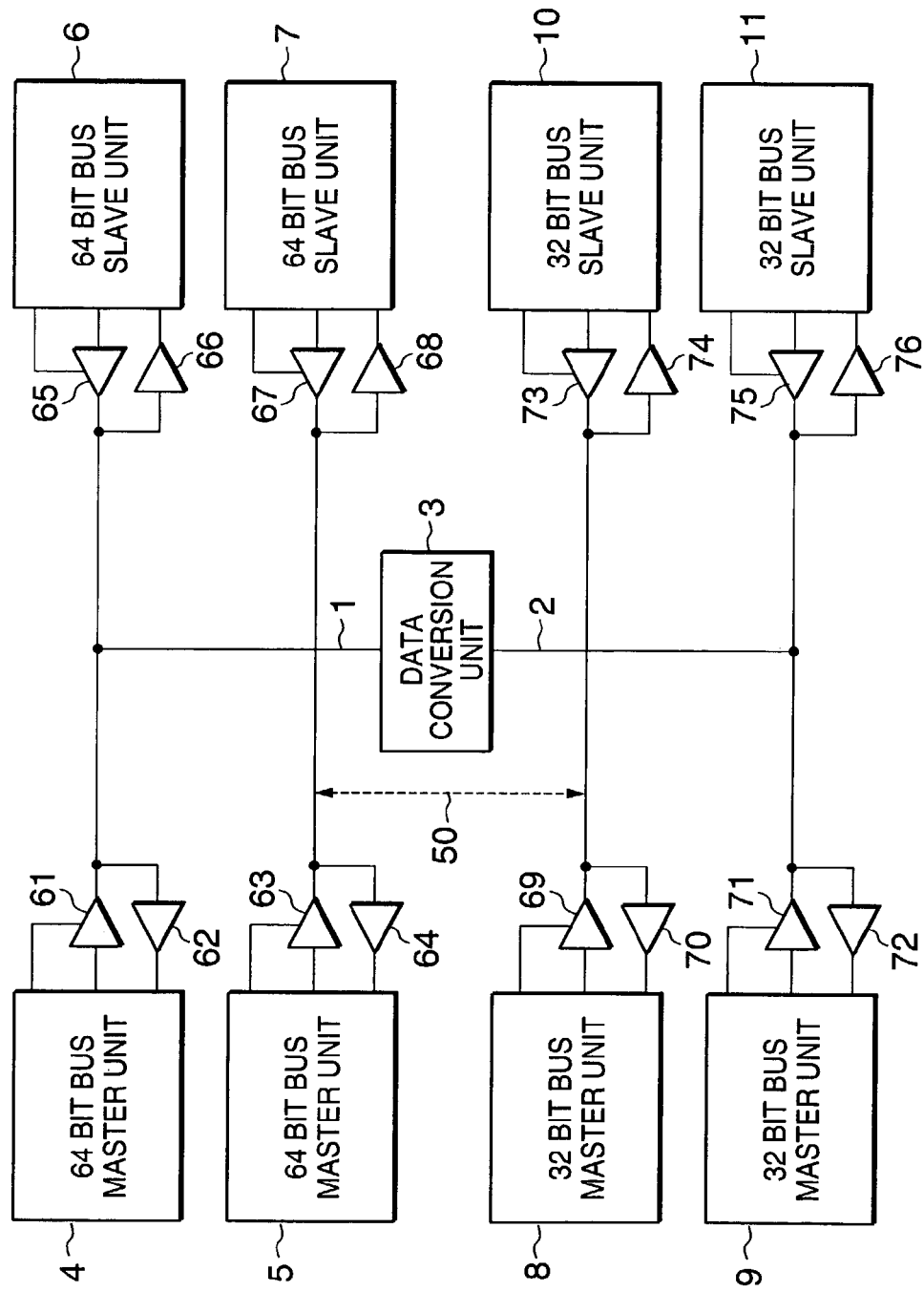
FIG. 24 is an illustration showing a construction of a bus employing a three state buffer.
Figure 25:
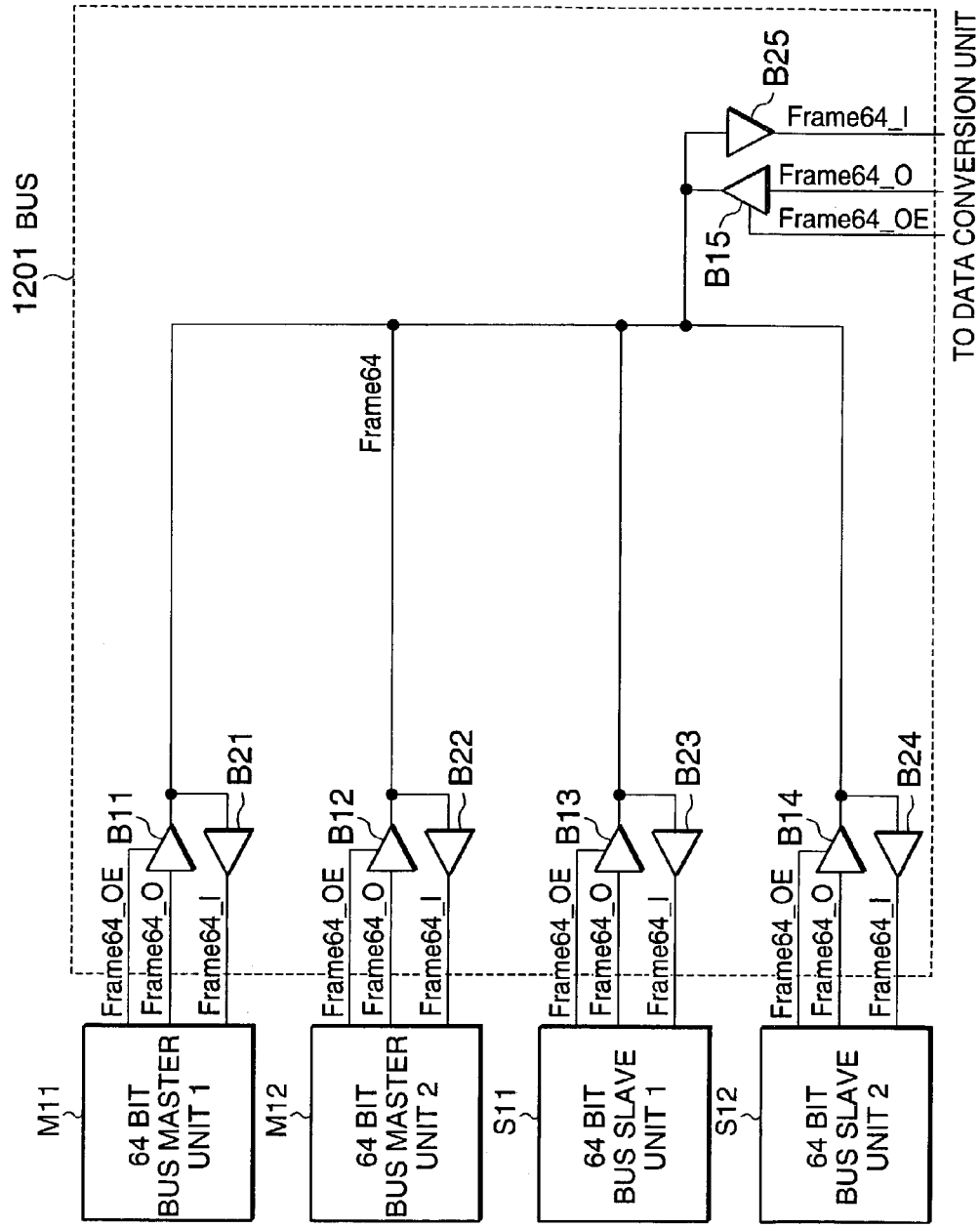
FIG. 25 is an illustration for explaining construction of the bus in three state buffer type in the case of transmitting a signal output by both of the bus master unit and the bus slave unit.
Figure 26:
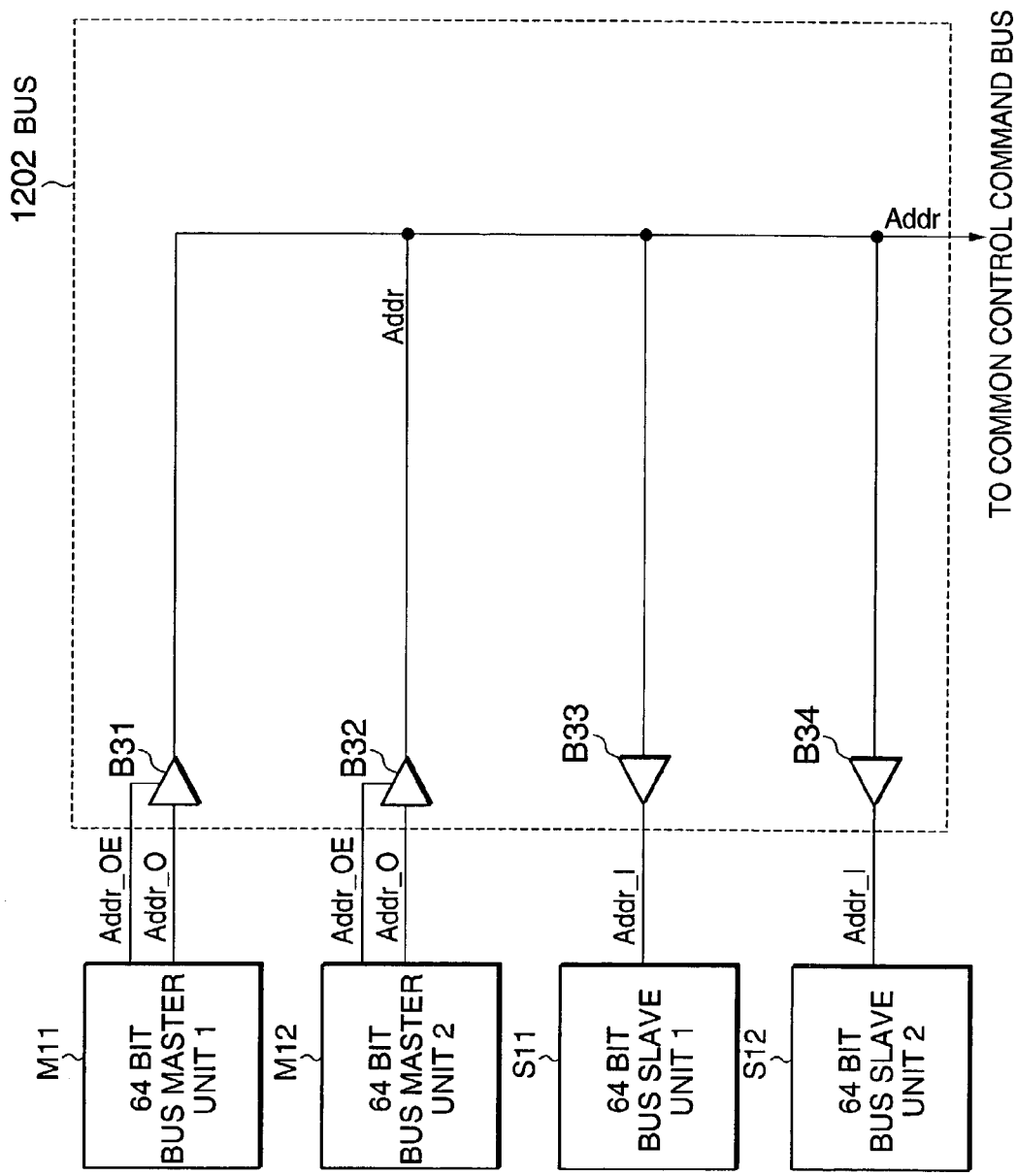
FIG. 26 is an illustration for explaining a construction of the bus in three state buffer type in case of transmitting a signal output only by the bus master unit.
Figure 27:
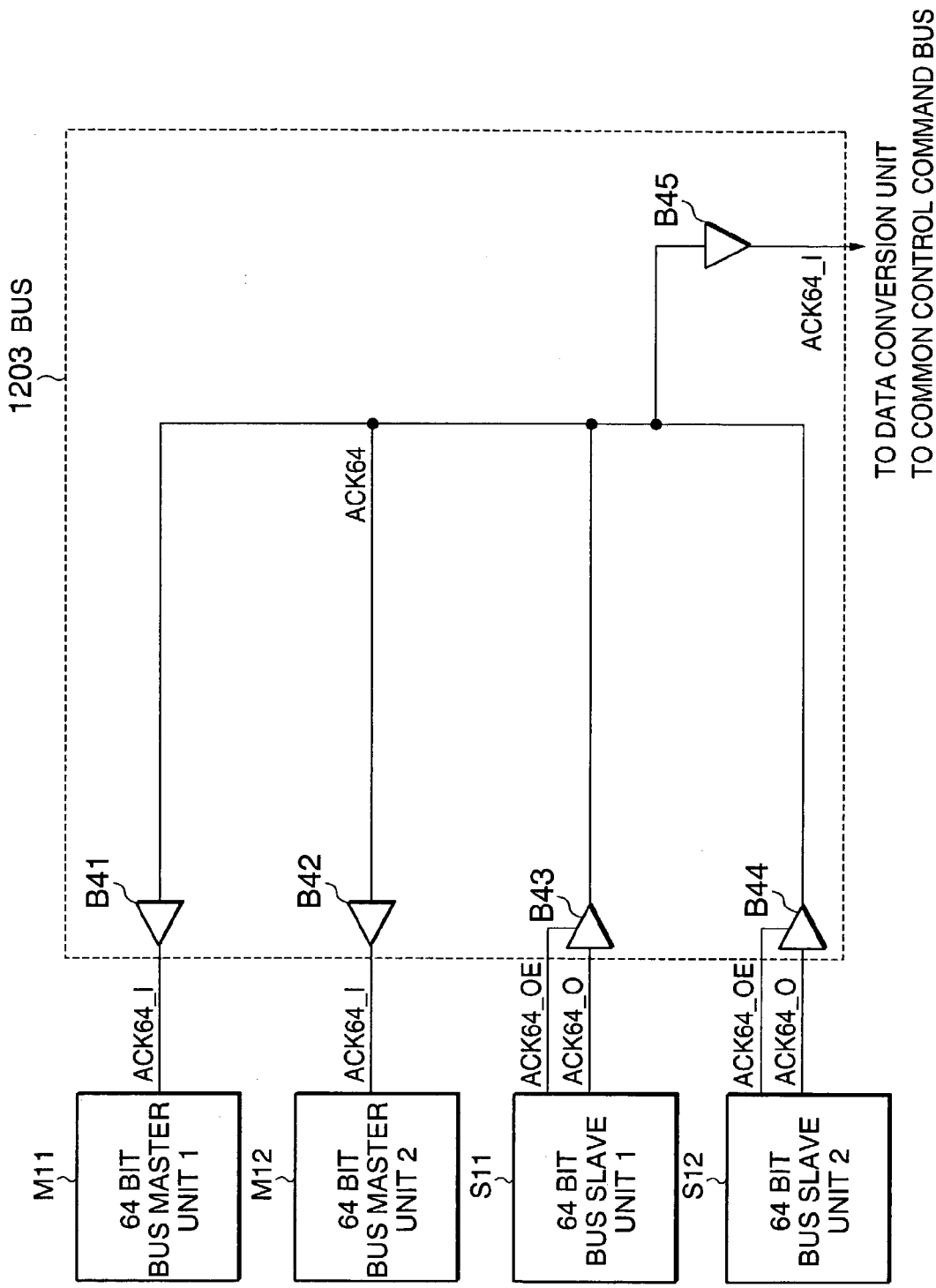
FIG. 27 is an illustration for explaining a construction of the bus in three state buffer type in case of transmitting a signal output only by the bus slave unit.

FIG. 20 is an illustration showing a construction of bus employing a multiplexer, FIG. 21 is an illustration for explaining construction of the bus in multiplexer type in the case of transmitting a signal output by both of the bus master unit and the bus slave unit, FIG. 22 is an illustration for explaining a construction of the bus in multiplexer type in case of transmitting a signal output only by the bus master unit, FIG. 23 is an illustration for explaining a construction of the bus in multiplexer type in case of transmitting a signal output only by the bus slave unit, FIG. 24 is an illustration showing a construction of a bus employing a three state buffer, FIG. 25 is an illustration for explaining construction of the bus in three state buffer type in the case of transmitting a signal output by both of the bus master unit and the bus slave unit, FIG. 26 is an illustration for explaining a construction of the bus in three state buffer type in case of transmitting a signal output only by the bus master unit and FIG. 27 is an illustration for explaining a construction of the bus in three state buffer type in case of transmitting a signal output only by the bus slave unit.

Next, discussion will be given for the case of the bus employing multiplexer in terms of bus construction in the bus connection circuit shown in FIG. 1.

The bus employing multiplexer in the bus connection circuit of FIG. 1 is constructed by forming the bus 1 with multiplexers 51 to 54 and the bus 2 with multiplexers 55 to 58 between the bus conversion unit 3, 64 bit bus master units 4 and 5, 64 bit bus slave units 6 and 7, 32 bit bus master units 8 and 9, 32 bit bus slave units 10 and 11, as shown in FIG. 20.

The multiplexer 51 switches signals having 64 bit width from the bus master units 4 and 5 to connect to the multiplexer 54 and the data conversion unit 3. The multiplexer 52 switches signals having 64 bit width from the multiplexer 53 and the data conversion unit 3 to connect to the bus master units 4 and 5. The multiplexer 53 switches signal of 64 bit width from the bus slave units 6 and 7 to connect to the multiplexer 52 and the data conversion unit 3/ The multiplexer 54 switches signal of 64 bit width from the multiplexer 51 and the data conversion unit 3 to connect to the bus slave units 6 and 7.

The multiplexer 55 switches signal of 32 bit width from the bus master units 8 and 9 to connect to the multiplexer 58 and the data conversion unit 3. The multiplexer 56 switches signal of 32 bit width from the multiplexer 57 and the data conversion unit 3 to connect to the bus master units 8 and 9. The multiplexer 57 switches signal of 32 bit width from the bus slave units 10 and 11 to connect to the multiplexer 56 and the data conversion unit 3. The multiplexer 58 switches signal of 32 bit width from the multiplexer 55 and the data conversion unit 3 to connect to the bus slave units 10 and 11.

Respective signals shown in FIG. 20 are illustrated as signals output only by either bus master unit or bus slave unit and rest signals are eliminated from illustration. Particular constructions of the multiplexer will be discussed hereinafter for the cases where both of bus master unit/bus slave unit output signal, where only bus master unit outputs signal and where only bus slave unit outputs signal with reference to FIGS. 21 to 23. It should be noted that the bus 1 and the bus 2 are respectively constructed by combinations of three kinds of multiplexer structures.

In the bus 1, the construction of the bus will be discussed for the case where the signal commonly is output by the bus master unit and the bus slave unit, for example when Frame signal is transmitted, with reference to FIG. 21.

A bus 1101 for transmitting such signal can be constructed by multiplexers X1 and X2 and an OR circuit O1. It should be noted that the multiplexers 51 and 53 correspond to the multiplexer X1 and the multiplexers 52 and 54 correspond to the multiplexer X2. Hereinafter, operation will be discussed.

When Frame 64_O signal is output as a frame signal in response to a grant signal from the arbitration circuit, the bus master units M1 and M2 and the bus slave units S1 and S2 simultaneously output enabling signal (Frame64_OE signal). Here, the Frame64_OE signal is a signal indicative of a period, in which the corresponding Frame64_O signal is effective. By this, 4:1 multiplexer X1 selects only Frame64_O signal becoming effective and outputs the same. This Frame64_O signal is connected to the data conversion unit as Frame64_I signal indicative of inputting of the frame signal.

Furthermore, when the frame signal is supplied to outside of the bus 1101 (for example, when the frame signal is supplied from the data conversion unit), in the 2:1 multiplexer X2, when the Frame64_OE signal is active HI, the Frame64_O signal selected by the multiplexer X1 and the Frame64_O signal from the data conversion unit are selected and the selected Frame64_O signal is commonly connected to the bus master units M1 and M2 and the bus slave units S1 and S2 as the Frame64_I signal indicating inputting of the frame signal based on an OR output from the OR circuit O1 of the Frame64_OE signals of the bus master units M1 and M2 and the bus slave units S1 and S2 and the Frame64_O signal from the data conversion unit.

Accordingly, when any one of the bus master units M1 and M2, the bus slave units S1 and S2 and the data conversion unit outputs the Frame64_O signal, it is connected to input terminals of all of the bus master units and the bus slave units and the data conversion unit as Frame64_I signal indicating inputting of the frame signal.

In the bus 1, a bus construction in the case where a signal output only by the bus master unit, e.g. address signal, is transmitted, will be discussed with reference to FIG. 22.

A bus 1102 transmitting such signal is constructed with multiplexers X3 and X4 and an OR circuit O2. Operation will be discussed hereinafter.

For example, when the bus master units M1 and M2 output Addr_O signal as address signal, Addr_OE signals indicative of the effective period are simultaneously output respectively. By this, the 2:1 multiplexer X3 outputs only Addr_O signal selected. The selected Addr_O signal is output to the common control command bus together with an OR output of the OR circuit O2 of the Addr_OE signals of the bus master units M1 and M2.

Furthermore, when Addr_O signal and Addr_OE signal are supplied outside of the bus 1102 (in case those signals are supplied from the bus master unit on the side of the bus 2), the Addr_O signal selected by the multiplexer X3 and the Addr_O signal from the common control command bus are selected by the 2:1 multiplexer X4, and the selected Addr_O signal is commonly connected to the bus slave units S1 and S2 as Addr_I signal indicative of the address based on the OR output of the OR circuit O2 between the Addr_OE signals of the bus master units M1 and M2 and the Addr_OE signal from the common control command bus.

When any of the bus master units M1 and M2 and the common control command bus outputs Addr_O signal, it is connected to the input terminals of all bus slave units and the common control command bus as Addr_I signal indicative of address signal.

Next, bus construction of the case where the signal output only by the bus slave unit, e.g. Ack signal, is transmitted in the bus 1 with reference to FIG. 23.

A bus 1103 transmitting such signal is constructed with multiplexers X5 and X6 and an OR circuit O3. Hereinafter, operation will be discussed.

For example, when the bus slave units respectively output ACK_O signal as transmission permission signal, ACK_OE signals indicative of effective period thereof are output simultaneously. By this, 2:1 multiplexer X5 selects and outputs only ACK_O signal which becomes effective. The selected ACK_O signal is output to the common control command bus together with an OR output of the ACK_OE signals of the bus slave units S1 and S2 established by the OR circuit O3, and is connected to the data conversion unit as ACK_I signal indicating inputting of ACK.

Furthermore, when ACK_O signal and ACK_OE signal are supplied from outside of the bus 1103 (when supplied from the bus 2), in the 2:1 multiplexer X6, the ACK_O signal selected by the multiplexer X3 and the ACK_O signal from the common control command bus are selected based on the OR output of the ACK_OE signals of the bus slave units S1 and S2 established by the OR circuit O3 and the ACK_OE signal from the common control command bus, and the selected signal is commonly connected to the bus master units M1 and M2 as ACK_I signal indicating inputting of ACK.

Accordingly, when any of the bus slave units S1 and S2 and the common control command bus outputs the ACK_O signal, it is connected to the input terminals of all of bus master units and the common control command bus as ACK_I signal indicating input of Ack signal.

The bus construction with the multiplexers requires control only for the wiring to be data transfer path as defined by the multiplexers, and it does not require unitary control of long wiring as required in the bus construction with three-state buffer. Therefore, wiring capacity can be made small to permit high frequency operation. Also, all signals are directed to single direction, repeater (drive buffer: not shown) for amplifying the signal can be easily inserted.

On the other hand, as advantage for the data conversion unit, the signal lines on 32 bit side and signal lines on 64 bit side do not become the same. Therefore, for example, when the same ACk signals indicating permission of transmission are present, the signal on 32 bit side and the signal on 64 bit side become different signal for the data conversion unit. Therefore, these signals can be discriminated by the data conversion unit.

It should be noted that, in the bus connection circuit of FIG. 1, since three state buffer may be employed in place of the multiplexer in the bus construction, discussion will be given hereinafter with respect to the bus construction.

As shown in FIG. 24, the bus employing the three state buffer is generally constructed by forming the bus 1 via three state buffers 61 to 68 and the bus 2 via three state buffers 69 to 76 between the data conversion unit 3. 64 bit bus master units 4 and 5, 64 bit bus slave units 6 and 7, 32 bit bus master units 8 and 9, 32 bit bus slave units 10 and 11.

When the three state buffer 61 is controlled into ON by the bus master unit 4, the three state buffer 61 connects the output of the 64 bit bus master unit 4 to the bus 1, and the buffer 64 connects the input from the bus 1 to the bus master unit 4. Similar relationship is established between the three state buffer 63, the buffer 64 and the 64 bit bus master unit 5.

When the three state buffer 65 is controlled into ON by the bus slave unit 6, the three state buffer 65 connects the output of the 64 bit bus slave unit 6 to the bus 1, and the buffer 66 connects the input from the bus 1 to the bus slave unit 6. Similar relationship is established between the three state buffers 67 and 68, the 64 bit bus slave unit 7.

When the three state buffer 69 is controlled into ON by the bus master unit 8, the three state buffer 69 connects the output of the 32 bit bus master unit 8 to the bus 2, and the buffer 70 connects the input from the bus 2 to the bus master unit 8. Similar relationship is established between the three state buffer 71, buffer 72 and the 32 bit bus master unit 9.

When the three state buffer 73 is controlled into ON by the bus slave unit 10, the three state buffer 73 connects the output of the 32 bit bus slave unit 10 to the bus 2, and the buffer 76 connects the input from the bus 2 to the bus slave unit 10. Similar relationship is established between the three state buffers 75 and 76 and the 32 bit bus slave unit 11.

In FIG. 24, the signal lines are illustrated as signals input and output to and from all bus master units and bus slave units. However, signals only input and signals only output may also be present.

Particular construction of the bus in the case where signal is output from both of the bus master unit/bus slave unit, only from the bus master unit or only from the bus slave unit, will be discussed with reference to FIGS. 25 and 26.

In FIG. 25, similarly to the bus constructed by the multiplexers, discussion will be given for the bus construction for transmitting the signal output from both of the bus master unit and the bus slave unit, e.g. Frame signal.

Such bus 1201 is constructed with three state buffers B11, B12, B13, B14 and B15 and buffers B21, B22, B23, B24 and B25.

The bus master units M11 and M12, the bus slave units S11 and S12 and the data conversion unit output the Frame64_O signal together with the Frame64_OE signal. Only when the Frame64_OE signal becomes effective, the three state buffers B11, B12, B13, B14 and B15 output the Frame64_O signal from the corresponding unit.

The Frame signal is commonly connected to the bus master units M11 and M12, the bus slave units S11 and S12 and the data conversion unit via respective buffers B21, B22, B23, B24 and B25 as Frame64_I signal indicating inputting of the frame output.

Accordingly, when any of the bus master units M1 and M2, the bus slave units S1 and S2 and the data conversion unit output the Frame64_O signal, the Frame signal is connected to input terminals of all of the bus master unit/bus slave unit and the data conversion unit as the Frame64_I signal indicating inputting of the. frame signal.

In FIG. 26, discussion will be given for bus construction for transmitting the signal output only from the bus master unit, for example, address signal.

The bus 1202 transmitting such signal is constructed with three state buffers B31 to B34.

The bus master units M11 and M12 respectively output Addr_O signals and Addr_OE signals as address signals. The three state buffers B31 and B32 outputs the Addr_O signal from the corresponding unit only when the Addr_OE signal becomes effective.

The Addr_O signal is output to the bus slave units S11 and S12 as Addr_I signal indicating inputting of address via the buffers B33 and B34, and conjunction therewith is output to the common control command bus.

Accordingly, when any of the bus master units M1 and M2 outputs the Addr_O signal, the Addr signal designating address is input to the input terminals of all bus slave units and conjunction therewith to the common control command bus.

In FIG. 27, discussion will be given for bus construction for transmitting signal output only by the bus slave unit, such as Ack signal.

The bus transmitting such signal is constructed with buffers 41, 42 and 43 and three state buffers B43 and B44.

The bus lave units S11 and S12 outputs the ACK64_O signals indicating permission of transmission and ACK64_OE signals. By this, the three state buffers B43 and B44 output the ACK64_O signal from the corresponding unit only when the ACK64_OE signal becomes effective.

The ACK64 signal is output to the bus master units M11 and M12 as ACK64_I signal indicating inputting of ACK via the buffers B41 and B42, and also output to the data conversion unit via the buffer B45.

Accordingly, when any of the bus slave units S11 and S12 outputs the ACK64_O signal, the ACK64 signal indicating permission of transmission is input to the input terminals of all bus master units and the data conversion unit.

In the bus construction with the three state buffers, direction of the signal in the wiring is bidirectional, insertion of the repeater is difficult. Also, since capacities of the three state buffers connected to the wiring in the data transfer path is added, wiring capacity becomes large to make operation frequency generally low.

Feature for the data conversion unit in the case of three state buffer type is that the signal on 32 bit side and the signal on 64 bit side cannot be distinguished. For example, since the ACK signal is common both on 32 bit side and 64 bit side, different from the bus formed with the multiplexers, even when signal is output on 32 bit side, the same signal is output on 64 bit side. Therefore, it is not possible to discriminate either the ACK signal output on 32 bit side or the ACK signal output on 64 bit side. Accordingly, it becomes necessary to distinguish the ACK signal on 32 bit side and the ACK signal on 64 bit side. The signals required to handle with distinction cannot be used in common as control command signal in the bus construction with the three state buffers.

Third Embodiment

Figure 28:
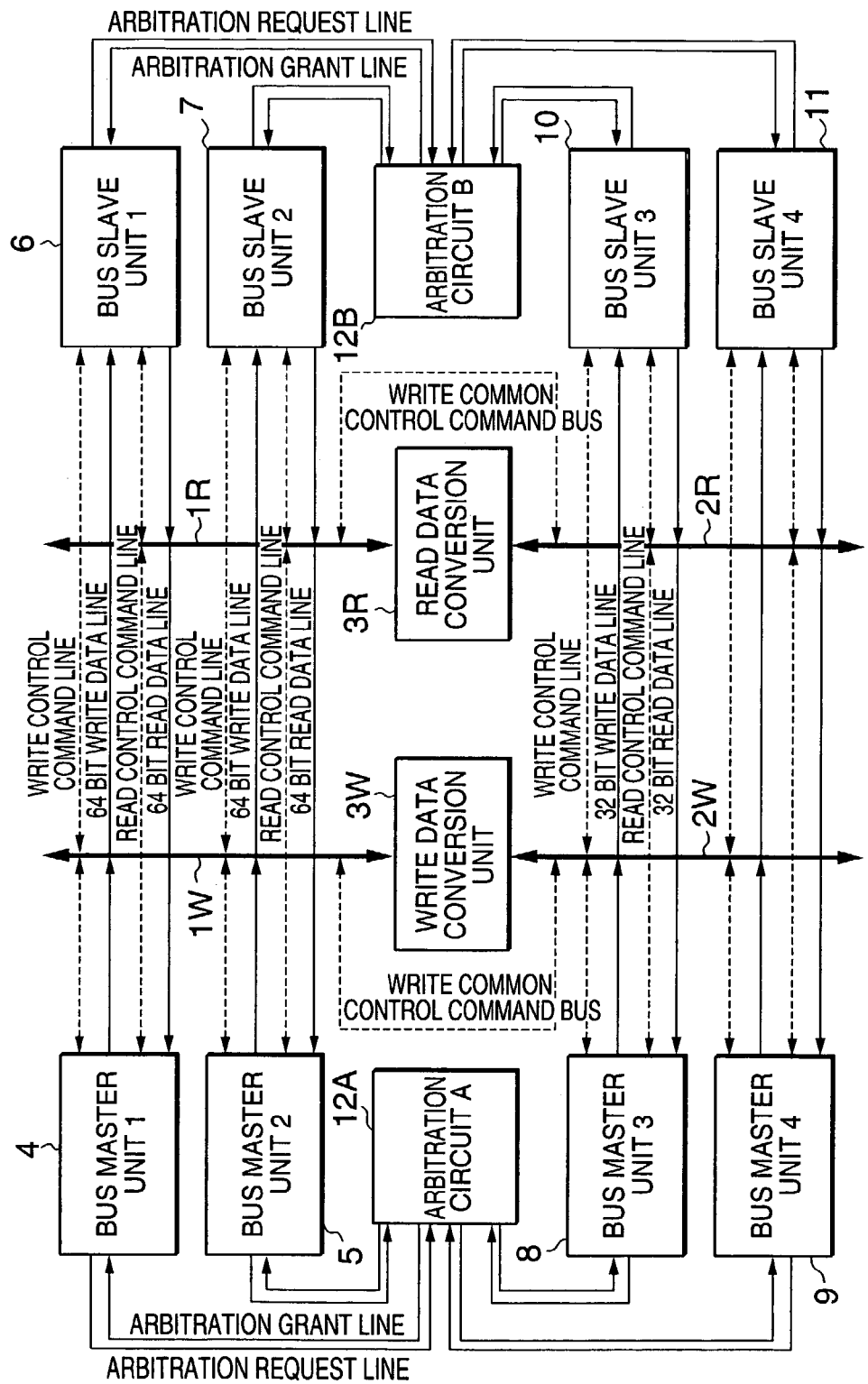
FIG. 28 is a block diagram showing a construction of the third embodiment of the bus system according to the present invention.
Figure 29:
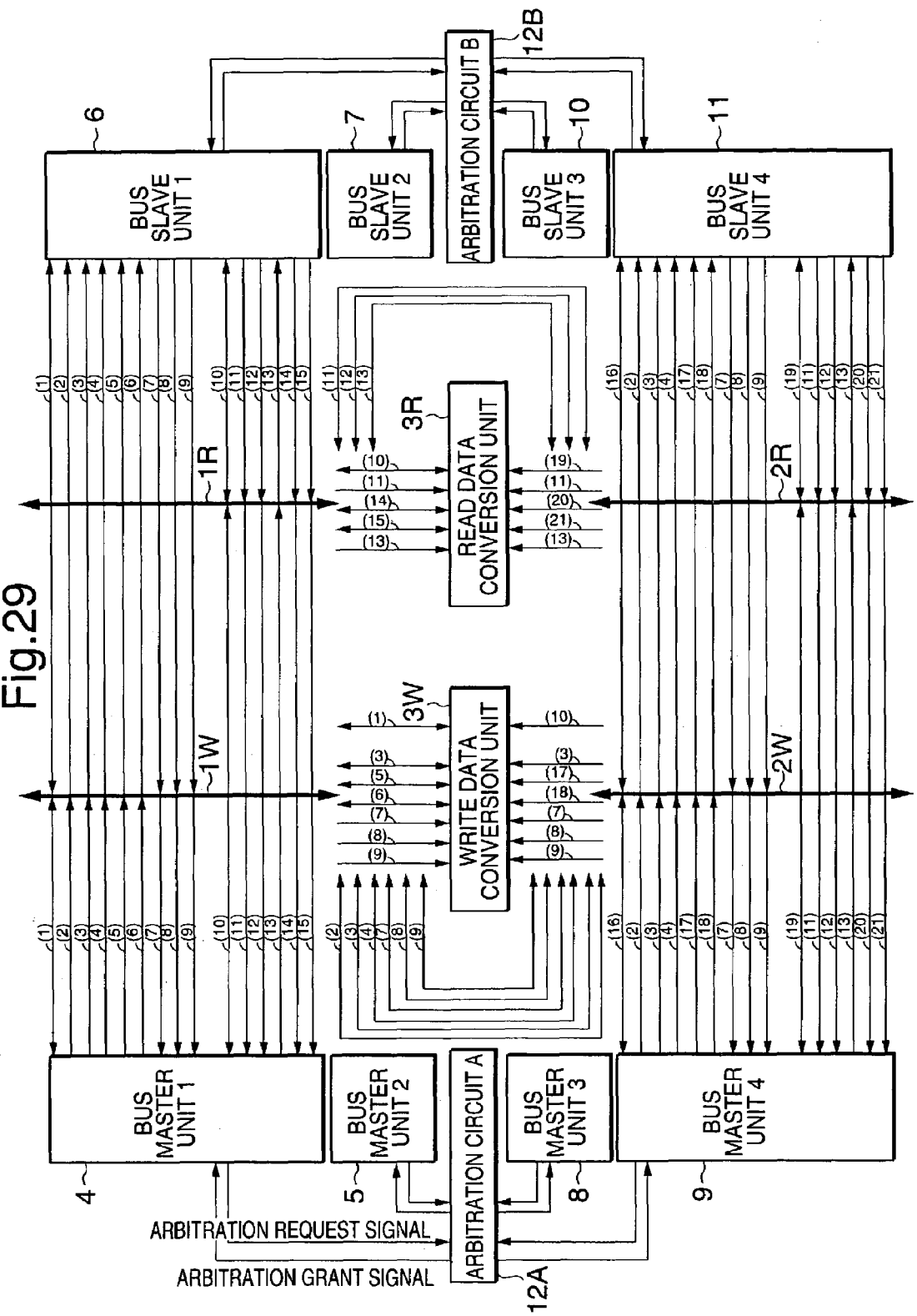
FIG. 29 is an illustration showing a system construction including a common control command bus of the third embodiment of the bus system.
Figure 30:
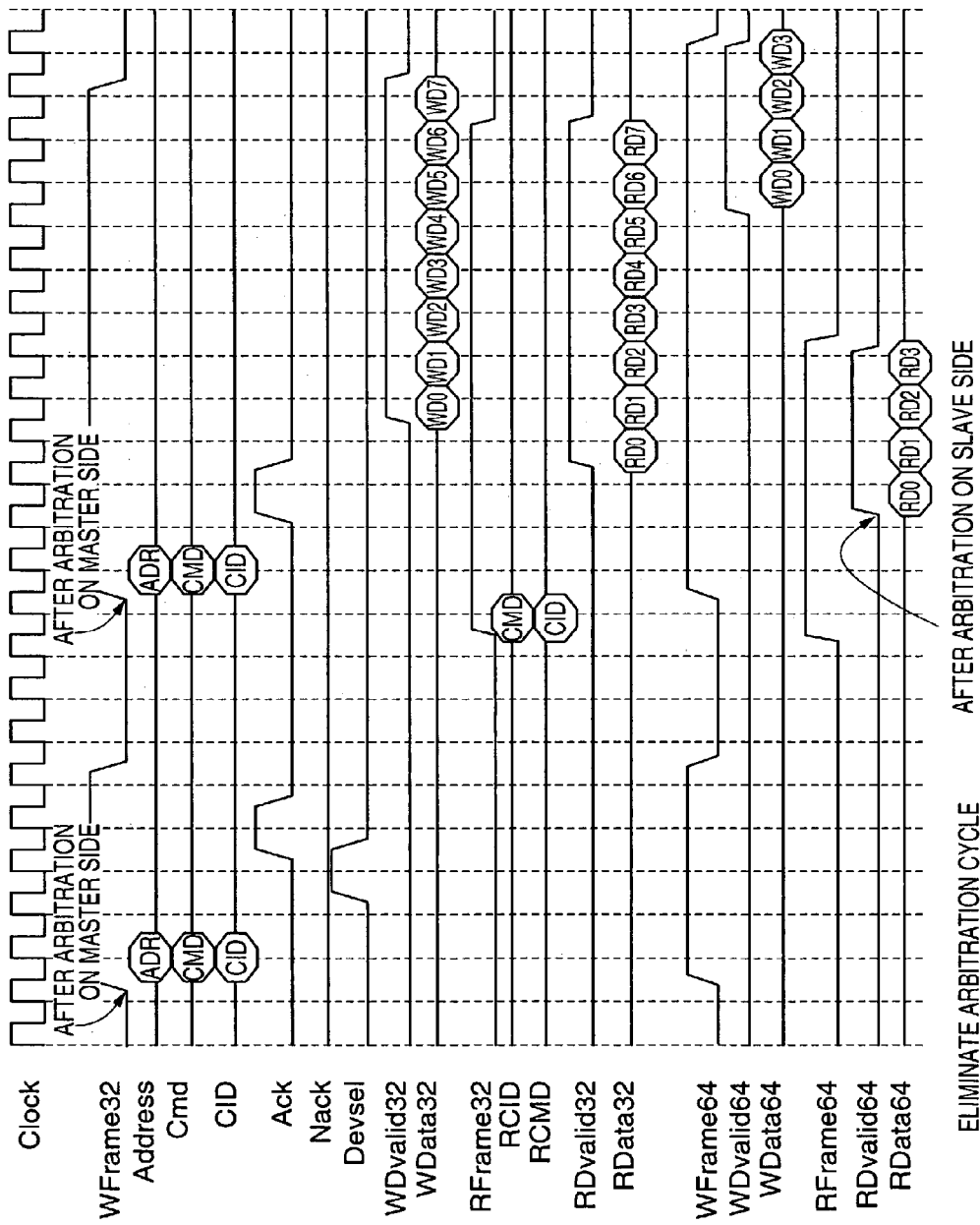
FIG. 30 is a timing chart showing data transfer operation when write access is performed after read access to the 64 bit bus slave unit from the 32 bit bus master unit in the third embodiment.

FIG. 28 is a block diagram showing a construction of the third embodiment of the bus system according to the present invention, FIG. 29 is an illustration showing a system construction including a common control command bus of the third embodiment of the bus system, and FIG. 30 is a timing chart showing data transfer operation when write access is performed after read access to the 64 bit bus slave unit from the 32 bit bus master unit in the third embodiment.

In the third embodiment, discussion will be given hereinafter for the bus system, in which the read bus and the write bus are provided separately and transfer is performed by split transfer.

As shown in FIG. 28, the shown embodiment of the bus system is generally constructed with the bus master units 4 and 5 and the bus slave units 6 and 7 connected with a first write bus 1W, a first read bus 1R, a second write bus 2W, a second read bus 2R and a write data conversion unit 3W, the bus units 8 and 9 and the bus slave units 10 and 11 connected to the second write bus 2W and the second read bus 2R, and arbitration circuits 12A and 12B.

The first write bus 1W has a data width of 64 bits and the second write bus 2W has a data width of 32 bits. The first write bus 1W and the second write bus 2W are connected with each other via a write control command bus for transferring various write control command with each other. The write data conversion unit 3W is connected between the first write bus 1W and the second write bus 2W to perform bit width conversion between data of 64 bit width and data of 32 bit width.

The first read bus 1R has a data width of 64 bits and the second read bus 2R has a data width of 32 bits. The first read bus 1R and the second read bus 2R are connected with each other via a read control command bus for transferring various read control command with each other. The read data conversion unit 3R is connected between the first read bus 1R and the second read bus 2R for performing bit width conversion between data of 64 bit width and data of 32 bit width.

The bus master units 4 and 5 are connected to the first write bus 1W through the write control command line and 64 bit write data line and to the first read bus 1R through the read command line and 64 bit read data line for adjusting respective timings and interfacing between command and write data or the read data between the external master unit, such as CPU, DMA controller and so forth and the first write bus 1W or the first read bus 1R.

The bus slave units 6 and 7 are connected to the first write bus 1W through the write control command line and 64 bit write data line and to the first read bus 1R through the read control command line and 64 bit read data line for adjusting respective timing and interfacing between the command and the write data or the read data between the first write bus or the first read bus 1R and the external slave unit, such as I/O, memory and so forth.

The bus master units 8 and 9 are connected to the second write bus 2W through the write control command line and the 32 bit write data line and to the second read bus 2R through the read control command line and the 32 bit read data line for adjusting respective timing and interfacing between command and write data or read data between the external master unit, such as CPU, DMA controller and so forth and the second write bus 2W or the second read bus 2R.

The bus slave units 10 and 11 are connected to the second write bus 2W through the write control command line and 32 bit write data line and to the second read bus 2R through the read control command line and 32 bit read data line for adjusting respective timing and interfacing between command and write data or read data between the second write bus 2W or the second read bus 2R and the external slave unit, such as I/O, memory and so forth.

The arbitration circuit 12A has functions to perform arbitration for bus right for the first write bus 1W and the second write bus 2W depending upon the arbitration request signal between respective bus master units 4, 5 and 8, 9, and to notify obtaining of bus right to the bus master unit requesting the bus right by the arbitration grant signal when the bus right is established.

The arbitration circuit 12B has functions to perform arbitration for bus right for the first read bus 1R and the second read bus 2R depending upon the arbitration request signal between respective bus slave units 6, 7 and 10, 11 and to notify obtaining of the bus right to the bus slave unit requested the bus right by the arbitration grant signal when the bus right is established.

It should be appreciated that the shown bus construction is similar to the first embodiment shown in FIGS. 5 to 8 and FIGS. 22 to 25 in that the multiplexer type bus and the three state buffer type bus may be used as bus construction in the shown embodiment of the bus connection circuit.

In the shown embodiment of the bus connection circuit, flow of process from arbitration for bus right to use of the bus is similar to the case of the first embodiment shown in FIG. 11. On the other hand, in the shown embodiment of the bus connection circuit, the process procedure of the write data conversion unit 3W or the read data conversion unit 3R upon read access or write access is substantially the same as that in the first embodiment. However, the shown embodiment is differentiated from the first embodiment in that the read access and write access operations can be executed independently of each other.

The system construction including the common control command in the shown embodiment of the bus connection circuit is illustrated in FIG. 29.

In FIG. 29, common elements to those in FIG. 28 will be identified by the same number and signals of respective control command line and respective common control command bus are identified by (1) to (21). wherein (1) denotes a WFrame64, (2) denotes Address, (3) denotes Cmd, (4) denotes DID, (5) denotes WData64, (6) denotes WDvalid64, (7) denotes ACK, (8) denotes NACK, (9) denotes Devsel, (10) denotes RFrame64, (11) denotes Rcmd, (12) denotes RDID, (13) denotes RACK, (14) denotes RData64, (15) denotes RValid64, (16) denotes WFrame32, (17) denotes WData32, (18) denotes WDvalid, (19) denotes RFrame32, (20) denotes RData32 and (21) denotes RValid32.

Among these, a prefix W represents write access and a prefix R represents read access.

Various commands employed in the system construction shown in FIG. 29 have substantially the same contents as those shown in FIG. 10. It should be appreciated that, in the shown embodiment, a part of control signals (e.g. Master) are eliminated as compared with the first embodiment. On the other hand, in case that the read data bus and the write data bus are provided separately, Frame signal, Data signal, Dvalid signal, Cmd signal and DID signal for read data transfer are additionally required for read data transfer as compared with the case where bus is used in common for write and read.

Here, WFrame64 is information indicating occupying of the bus having 64 bit width in write access, Address is information for identifying the bus slave unit, Cmd is command information, DID is information for identifying the bus master unit, WData64 is transfer data on the bus of 64 bit width in write access, WDvalid is information indicative of effective period of data on the bus of 64 bit width in write access, ACK is information indicating the condition where the selected unit can executed demanded operation, NACK is information indicating the condition where the selected unit cannot execute the demanded operation, Devsel is information indicating that the unit is selected, RFrame64 is information showing occupying of the bus of 64 bit width in read access, RCmd is command information in read access, RDID is information for identifying the bus master unit in read access, RACK is information indicating that the selected unit can execute demanded operation in read access, RData64 is transfer data on the bus of 64 bit width in read access, and RDvalid64 is information indicating effective period of data on the bus of 64 bit width in read access.

On the other hand, WFrame32 is information indicating occupying of the bus of 32 bit width by write access, WData32 is information indicative of the transfer data on the bus of 32 bit width by write access, WValid32 is information indicating effective period of data on the bus of 32 bit width in write access, RFrame32 is information indicating occupying the bus of 32 bit width by read access, RData32 is transfer data on the bus of 32 bit width by read access, and RDvalid32 is information indicating effective period of data on the bus of 23 bit width in read access.

Next, with reference to FIGS. 28 to 30, in the shown embodiment of the bus connection circuit, example of operation in exchanging read data, and at the same time, exchanging write data by slit transfer, will be discussed in terms of the case where read access is performed and then write access is performed from the 32 bit bus master unit to the 64 bit bus slave unit. It should be noted that detail of arbitration operation is eliminated in the timing chart of FIG. 30.

Initially, arbitration for bus right for the write buses 1W and 2W is performed in response to arbitration request from the bus master unit. As a result, when bus right is granted, WFrame on the write bus 2W on 32 bit side is made active from the bus master unit. Furthermore, WFrame on the write bus 1W on 64 bit side is made active from the write data conversion unit 3W. At the same time, Address identifying the bus slave unit, Cmd indicating data size and so forth and DID identifying the bus master unit are output from the bus master unit as command.

By this, the designated bus slave unit returns Devsel, and further outputs ACK indicating approval of designation of Cmd to the write bus 1W on 64 bit side. Subsequently, the bus master unit makes WFrame inactive once, and also makes WFrame inactive.

Next, in the bus master unit, when read data get ready, arbitration of bus right for read bus 1R and 2R is performed by issuing arbitration request. As a result, when bus right is granted, RFrame64 on read bus 1R on 64 bit side is made active. By this, RFrame 32 on the read bus 2R on 32 bit side is made active from the read data conversion unit 3R.

At the same time, RCmd indicating data size or the like and RDID identifying the bus master unit are output from the bus slave unit as command. By this, the bus slave unit makes RDvalid64 on the read bus 1R on 64 bit side active to output RData64. Upon completion of outputting of RData64, the bus slave unit makes RDvalid64 inactive, and in conjunction therewith, makes RFrame64 inactive. It should be noted that, at this time, ACK from the bus master unit is not necessary.

In the read data conversion unit 3R, upon reception of EData64, RDvalid32 on the read bus 2R on 32 bit side is made active to convert received RData64 into RData32 to feed to the bus master unit. Upon completion of transmission, the read data conversion unit 3R makes RDvalid32 inactive, and further makes RFrame32 inactive.

On the other hand, arbitration of bus right for the write bus 1W and 2W is performed in response to arbitration request from the bus master unit again. As a result, upon granting bus right, WFrame on the write bus 2W on 32 bit side is made active from the bus master unit, and further makes WFrame on the write bus 1W on 64 bit side active from the write data conversion unit 3W. At the same time, Address, Cmd and DID are output from the bus master unit as command. By this, the designated bus slave unit returns Devsel, and in conjunction therewith, outputs ACK indicating approval of designation of Cmd to the write bus 1W on 64 bit side.

Next, the bus master unit makes Dvalid to be output to the write bus 2W on 32 bit side active to output WData32. Upon completion, WDvalid32 is made inactive and whereby WFrame32 is made inactive.

Upon reception of WData32, the write data conversion unit 3W converts the received WData32 into WData64, makes WDvalid on the write bus 1W on 64 bit side active, and outputs WData64 to the bus slave unit. Upon completion, WDvalid 62 is made inactive, and in conjunction therewith, WFrame64 is made inactive.

Read access and write access from the 64 bit bus master unit to the 32 bit bus slave unit can also be performed simultaneously as combination of respective operation of the first embodiment shown in FIGS. 18 to 21.

As set forth above, in the shown embodiment of the bus connection circuit, when the read data bus and the write data bus are provided separately, read access and write access in split transfer can be performed independently. At this time, number of clock cycle in read access and write access can be reduced.

At this time, loss of data in sender is not caused upon occurrence of data transfer error and notification of occurrence of data transfer error to the sender is possible similarly to the first embodiment.

Furthermore, control over the detail of the command control signal as required in the conventional bus master control circuit and/or the bus slave control circuit, is unnecessary and is only required the hardware for performing data conversion by extracting conditions requiring data conversion. Therefore, circuit construction can be simplified and necessary hardware amount can be reduced.

On the other hand, in the shown embodiment of the bus control circuit, number of times of bus arbitration becomes lesser. Accordingly, delay becomes small to shorten period to occupy the bus. As a result, throughput of the bus can be improved.

Fourth Embodiment

Figure 31:
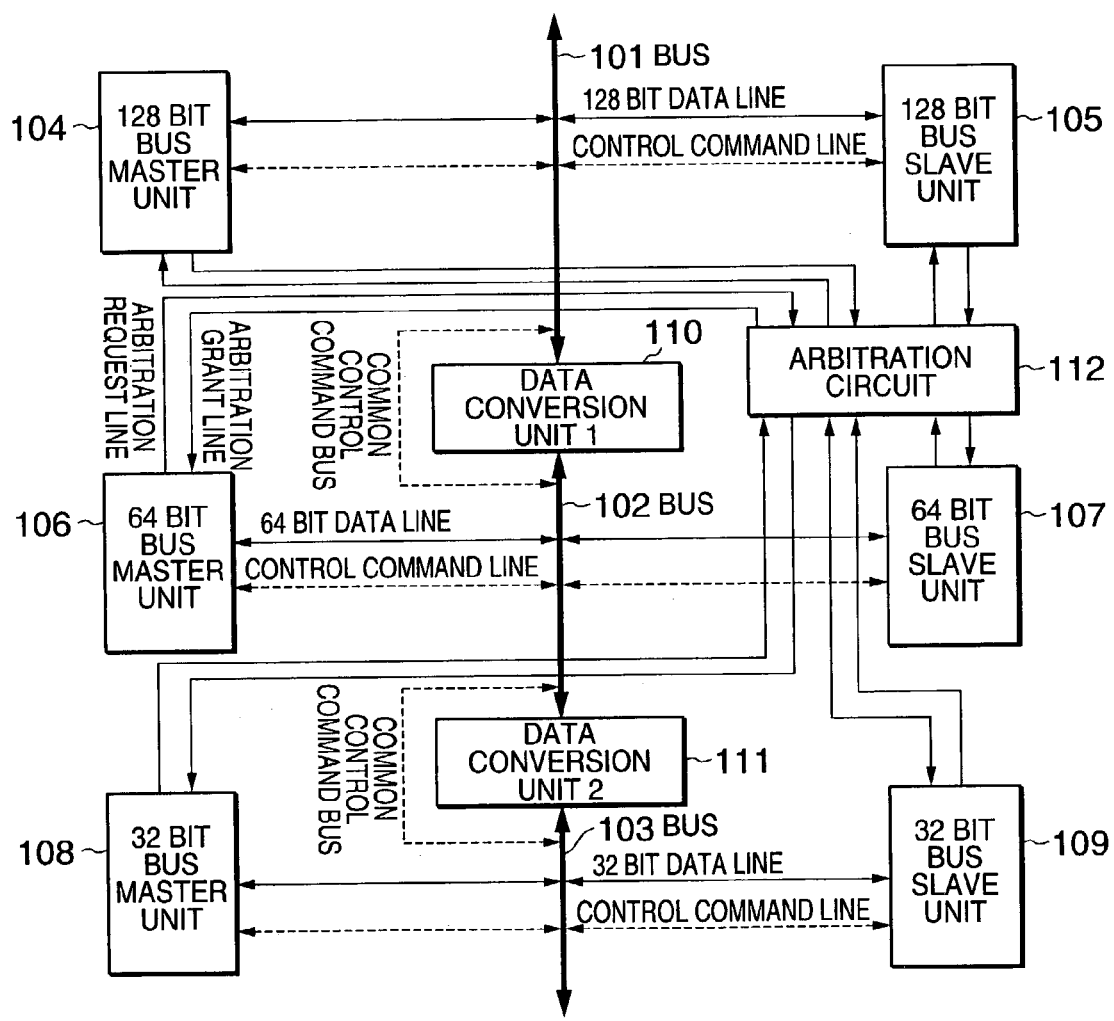
FIG. 31 is a block diagram showing a construction of the fourth embodiment of the bus system for the case to perform two stage bus width conversion using two data conversion unit.

FIG. 31 is a block diagram showing a construction of the fourth embodiment of the bus system for the case to perform two stage bus width conversion using two data conversion unit.

Hereinafter, as the fourth embodiment, discussion will be given for bus system for the case where read data bus and write data bus are common, and two data conversion units are used in interconnecting three kinds of buses respectively having mutually different bus widths to perform conversion of bus width in two stages.

As shown in FIG. 31, the bus system in the shown embodiment is generally constructed with a first bus 101, a second bus, a third bus 103, a 128 bit bus master unit 104 connected to the first bus 101, a 128 bit bus slave unit 105 connected to the first bus 101, a 64 bit bus master unit 106 connected to the second bus 102. a 64 bit bus slave unit 107 connected to the second bus 102, a 32 bit bus master unit 108 connected to the third bus 103, a 32 bit bus slave unit 109 connected to the third bus 103, a first data conversion unit 110, a second data conversion unit 111 and an arbitration circuit 112.

The first bus 101 has 128 bit data width, the second bus 102 has 64 bit data width and the third bus 103 has 32 bit data width. Between the first bus 101 and the second bus 102 and between the second bus 102 and the third bus 103, common control command buses are connected respectively for transferring signals on an address bus and a control bus.

The bus master unit 104 interfaces between a 128 bit external master unit (not shown) and the first bus 101 for command, read data and write data. The bus slave unit 105 interfaces between a 128 bit external slave unit (not shown) and the first bus 104 for command, read data and write data.

The bus master unit 106 interfaces between a 64 bit external master unit (not shown) and the second bus 102 for command, read data and write data. The bus slave unit 107 interfaces between a 64 bit external slave unit (not shown) and the second bus 102 for command, read data and write data.

The bus master unit 108 interfaces between a 32 bit external master unit (not shown) and the third bus 103 for command, read data and write data. The bus slave unit 109 interfaces between a 32 bit external slave unit (not shown) and the third bus 103 for command, read data and write data.

The first data conversion unit 110 performs conversion of bit width between data of 128 bit width and data of 64 bit width with each other between the first bus 101 and the second bus 102. The second data conversion unit 111 performs conversion of bit width between data of 64 bit width and data of 32 bit width with each other between the second bus 102 and the third bus 103.

The arbitration circuit 112 is responsive to respective arbitration requests from the bus master unit 104, the bus slave unit 105, the bus master unit 106, the bus slave unit 107, the bus master unit 108 and the bus slave unit 109 to perform arbitration for bus right for the first bus 101, the second bus 102 and the third bus 103, and outputs arbitration grant signal for the bus master unit or the bus slave unit which obtained bus right.

In the bus connection circuit shown in FIG. 31, connection of bus between the first bus 101 and the second bus 102 and connection of bus between the second bus 102 and the third bus 103 is performed in similar manner as the first embodiment set forth above. On the other hand, connection of bus between the first bus 101 and the second bus 103 can be established by sequentially establishing connection between the first bus 101 and the second bus 102 and connection between the second bus 102 and the third bus 103.

Accordingly, with the bus connection circuit shown in FIG. 31, three buses having three different kinds of bit widths, i.e. 128 bit width, 64 bit width and 32 bit width, may be mutually connected with each other.

As set forth above, with the shown embodiment of the bus connection circuit, by performing two stage bus width conversion using two data conversion unit, read access and write access in split transfer can be performed by mutually connecting buses having three kinds of different bus widths with using read data bus and write data bus in common. At this time, arbitration across the buses becomes unnecessary, and only data conversion is required to perform, number of clock cycle in read access and write access can be reduced.

Accordingly, since data transfer from the sender to transmission destination can be performed within the same bus cycle, loss of data in sender is not caused upon occurrence of data transfer error and notification of occurrence of data transfer error to the sender is possible similarly to the first embodiment.

Furthermore, control over the detail of the command control signal as required in the conventional bus master control circuit and/or the bus slave control circuit, is unnecessary and is only required the hardware for performing data conversion by extracting conditions requiring data conversion. Therefore, circuit construction can be simplified and necessary hardware amount can be reduced.

On the other hand, in the shown embodiment of the bus control circuit, number of times of bus arbitration becomes lesser. Accordingly, delay becomes small to shorten period to occupy the bus. As a result, throughput of the bus can be improved.

Fifth Embodiment

Figure 32:
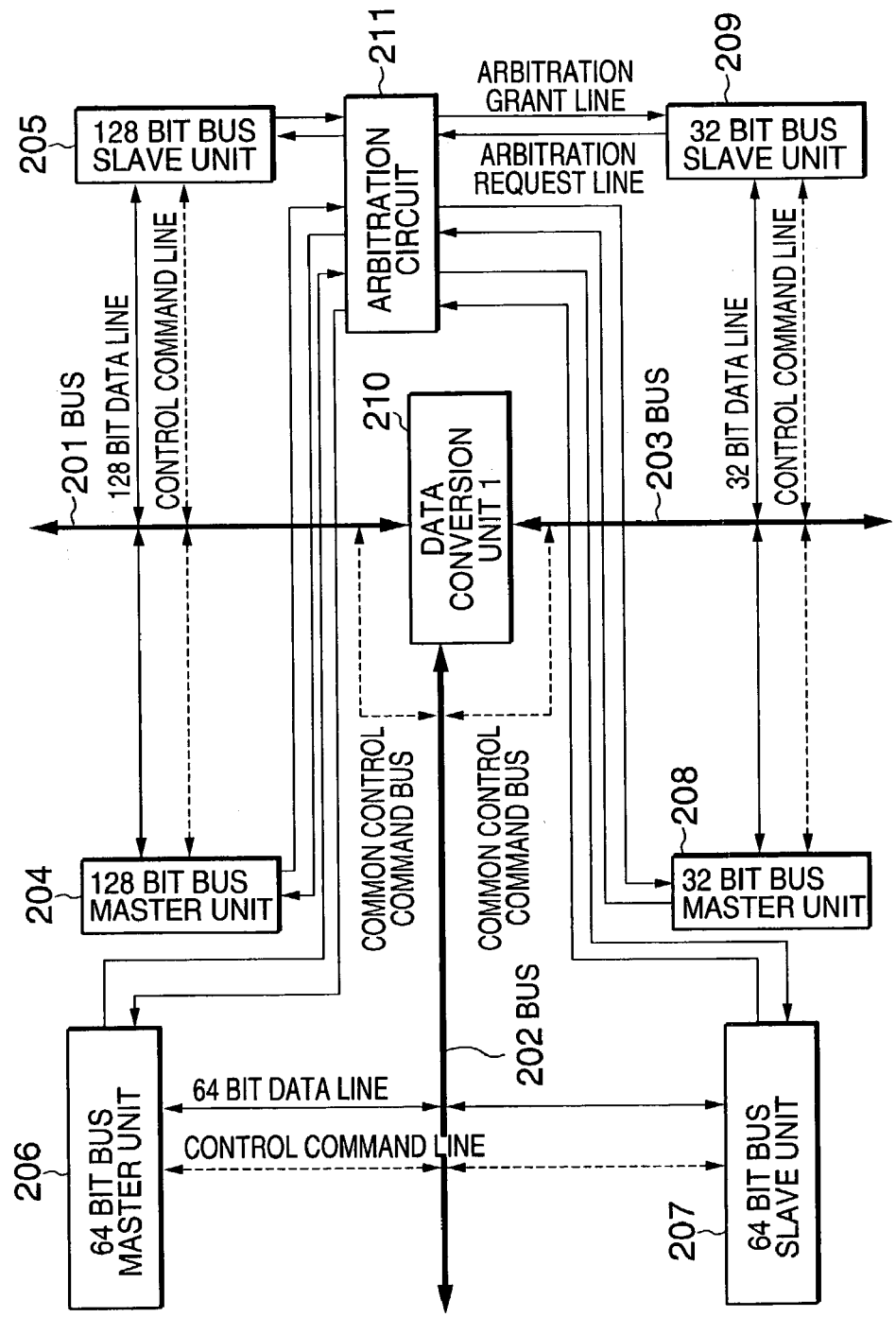
FIG. 32 is a block diagram showing a construction of the fifth embodiment of the bus system for the case where buses having three different bit widths using one data conversion unit.
Figure 33:
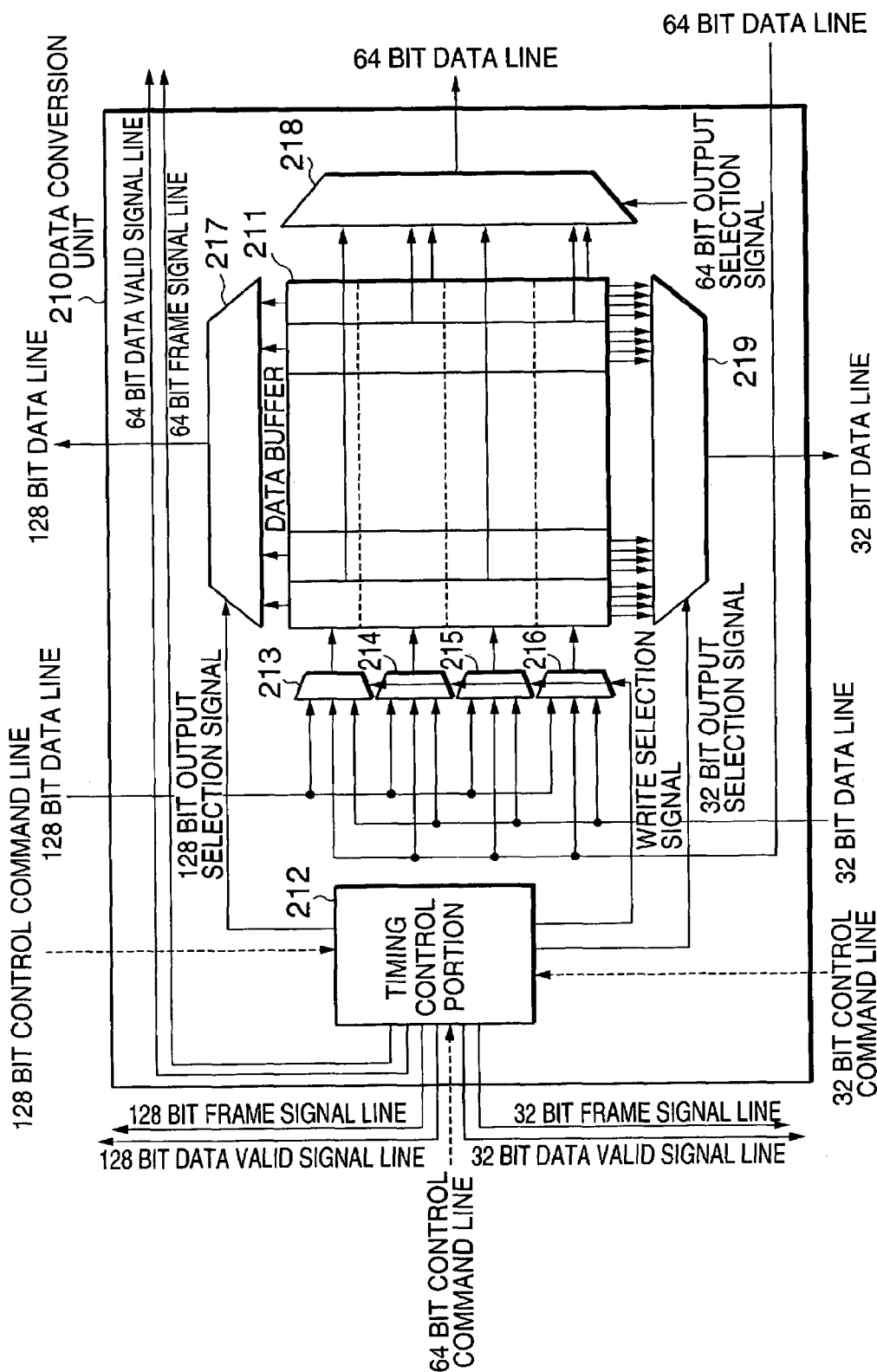
FIG. 33 is a block diagram showing an embodiment of a construction of the data conversion unit in the fifth embodiment of the bus system.
Figure 34:
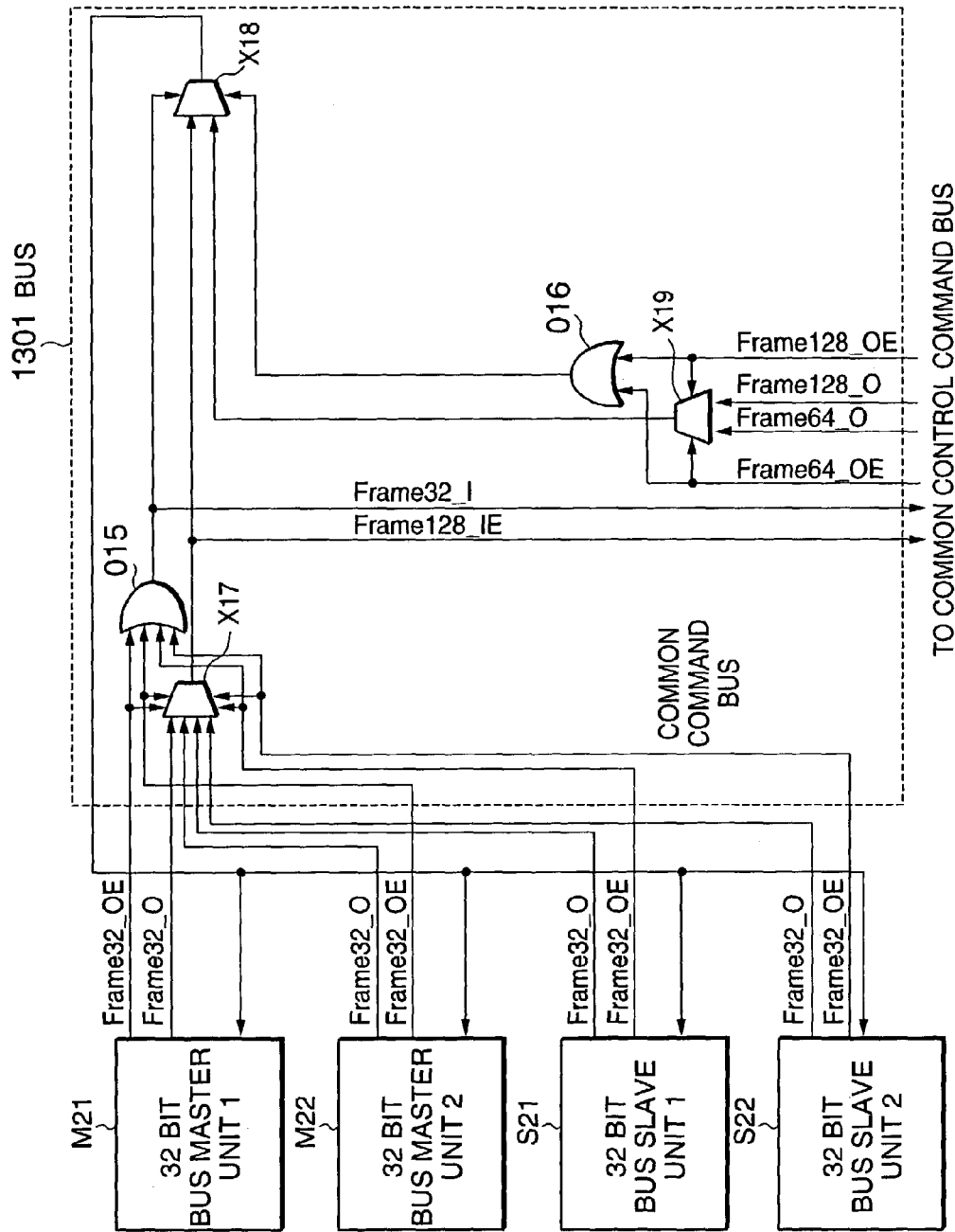
FIG. 34 is an illustration for explaining construction of the bus in the case of transmitting a signal output by both of the bus master unit and the bus slave unit in the fifth embodiment of the bus system.
Figure 35:
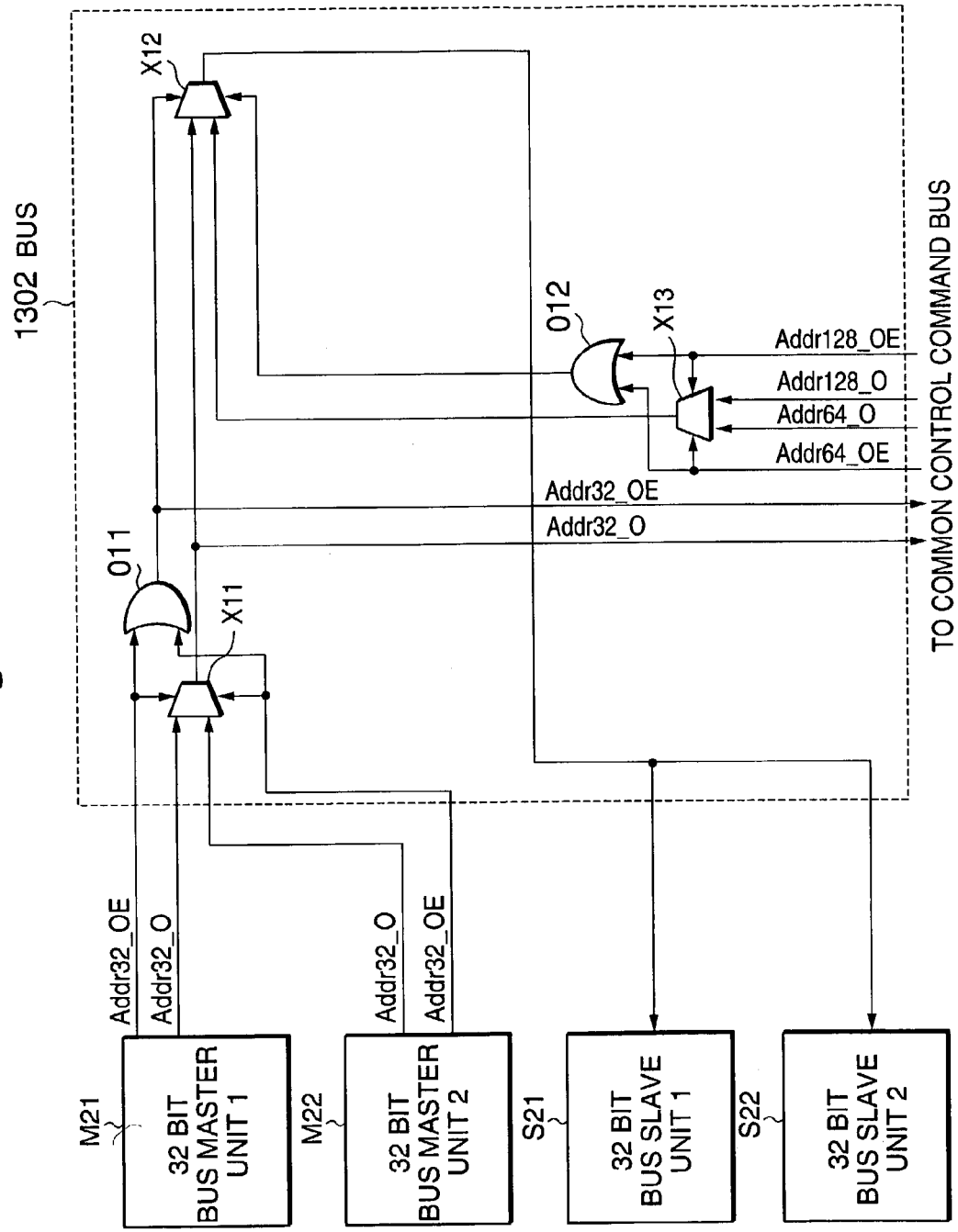
FIG. 35 is an illustration for explaining a construction of the bus in case of transmitting a signal output only by the bus master unit in the fifth embodiment of the bus system.
Figure 36:
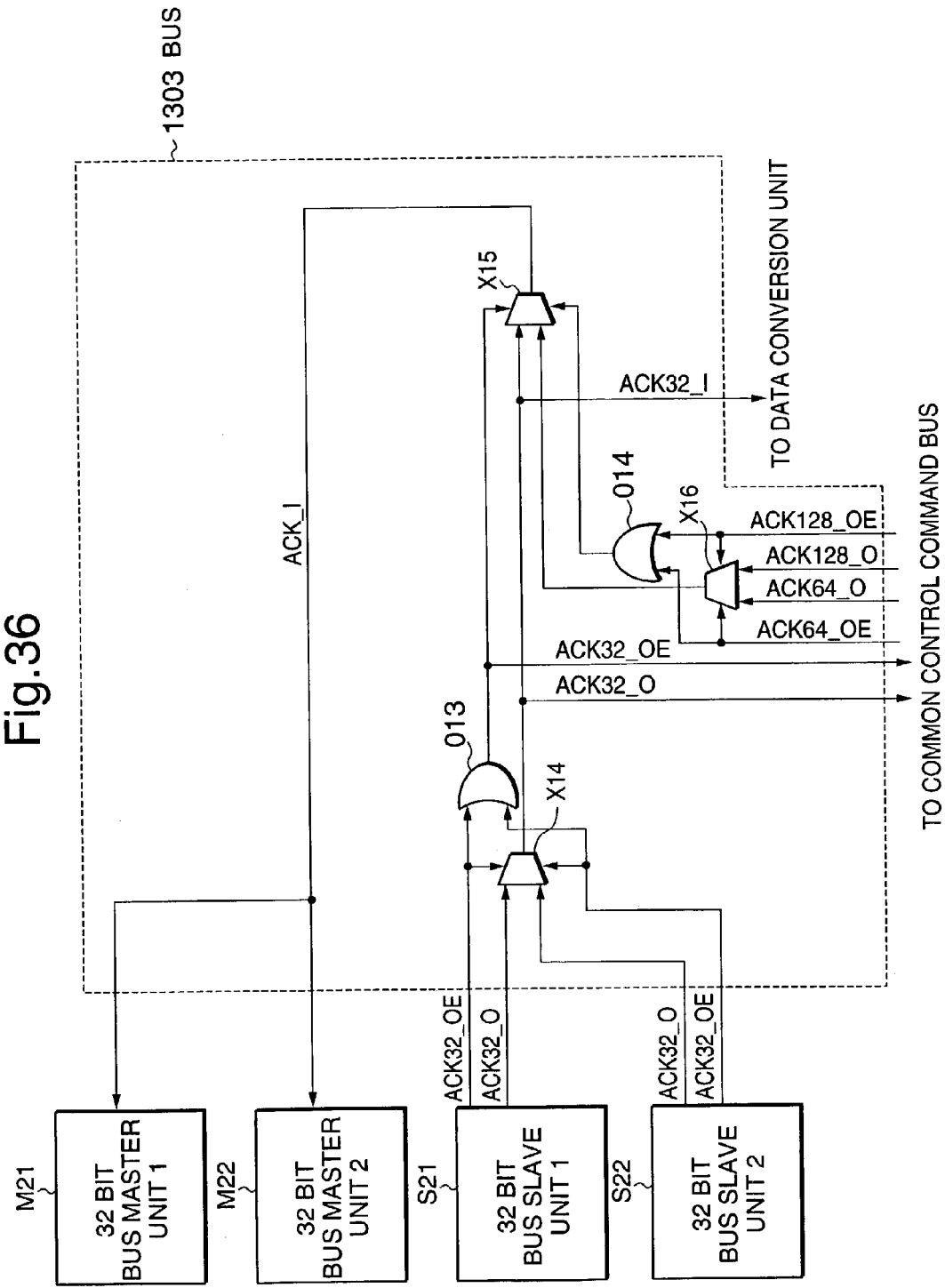
FIG. 36 is an illustration for explaining a construction of the bus in case of transmitting a signal output only by the bus slave unit in the fifth embodiment of the bus system.

FIG. 32 is a block diagram showing a construction of the fifth embodiment of the bus system for the case where buses having three different bit widths using one data conversion unit, FIG. 33 is a block diagram showing an embodiment of a construction of the data conversion unit in the fifth embodiment of the bus system, FIG. 34 is an illustration for explaining construction of the bus in the case of transmitting a signal output by both of the bus master unit and the bus slave unit in the fifth embodiment of the bus system, FIG. 35 is an illustration for explaining a construction of the bus in case of transmitting a signal output only by the bus master unit in the fifth embodiment of the bus system and FIG. 36 is an illustration for explaining a construction of the bus in case of transmitting a signal output only by the bus slave unit in the fifth embodiment of the bus system.

Hereinafter, discussion will be given for the case of conversion of bus widths with each other using one data conversion unit upon establishing connection of three kinds of buses having respectively different bus widths as fifth embodiment.

As shown in FIG. 32, the shown embodiment of the bus system is generally constructed with a first bus 201, a second bus, a third bus 203, a 128 bit bus master unit 204 connected to the first bus 201, a 128 bit bus slave unit 205 connected to the first bus 201, a 64 bit bus master unit 206 connected to the second bus 202. a 64 bit bus slave unit 207 connected to the second bus 202, a 32 bit bus master unit 208 connected to the third bus 203, a 32 bit bus slave unit 209 connected to the third bus 203, a data conversion unit 210 and an arbitration circuit 211.

The first bus 201 has 128 bit data width, the second bus 202 has 64 bit data width and the third bus 203 has 32 bit data width. Between the first bus 201 and the second bus 202 and between the second bus 202 and the third bus 203, common control command buses are connected respectively for transferring signals on an address bus and a control bus.

The bus master unit 204 interfaces between a 128 bit external master unit (not shown) and the first bus 201 for command, read data and write data. The bus slave unit 205 interfaces between a 128 bit external slave unit (not shown) and the first bus 204 for command, read data and write data.

The bus master unit 206 interfaces between a 64 bit external master unit (not shown) and the second bus 202 for command, read data and write data. The bus slave unit 207 interfaces between a 64 bit external slave unit (not shown) and the second bus 202 for command, read data and write data.

The bus master unit 208 interfaces between a 32 bit external master unit (not shown) and the third bus 203 for command, read data and write data. The bus slave unit 209 interfaces between a 32 bit external slave unit (not shown) and the third bus 203 for command, read data and write data.

The first data conversion unit 210 performs conversion of bit width between data of 128 bit width, data of 64 bit width and data of 32 bit width with each other between the first bus 201, the second bus 202 and third bus 203.

The arbitration circuit 211 is responsive to respective arbitration requests from the bus master unit 204, the bus slave unit 205, the bus master unit 206, the bus slave unit 207, the bus master unit 208 and the bus slave unit 209 to perform arbitration for bus right for the first bus 201, the second bus 202 and the third bus 203, and outputs arbitration grant signal for the bus master unit or the bus slave unit which obtained bus right.

FIG. 33 shows an example of construction of the data conversion unit in the bus connection circuit of FIG. 32.

As shown in FIG. 33, the data conversion unit 210 is generally constructed with a data buffer 211, a timing control portion 212 and multiplexers 213, 214, 215, 216, 217, 218 and 219.

The data buffer 211 is constructed with FIFO memory performing conversion of bit width with each other between data of 128 bit width, data of 64 bit width and data of 32 bit width, for example. Namely, conversion from data of 128 bits to data of 64 bits is performed writing data of 128 bit width and dividedly reading out data twice per 64 bits in the data buffer 211 or conversion from data of 128 bits to data of 32 bits is performed writing data of 128 bit width and dividingly reading out data four times per 32 bits in the data buffer 211. In the alternative, conversion from data of 64 bits to data of 32 bits is performed writing data of 64 bit width and dividedly reading out data twice per 32 bits in the data buffer 211.

Furthermore, conversely, by combining data of 32 bit width dividingly written twice from upper bit to lower bit or from lower bit to upper bit and then reading as data of 64 bit width, conversion of data of 32 bit width into data of 64 bit width is performed. Also, by combining data of 32 bit width dividingly written four times from upper bit to lower bit or from lower bit to upper bit and then reading as data of 128 bit width, conversion of data of 32 bit width into data of 128 bit width is performed. In the further alternative, by combining data of 64 bit width dividingly written twice from upper bit to lower bit or from lower bit to upper bit and then reading as data of 128 bit width, conversion of data of 64 bit width into data of 128 bit width is performed.

The timing control circuit 212 is responsive to the 128 bit control command signal, 64 bit control command signal or 32 bit control command signal to control the multiplexers 213, 214, 215, 216 by a writing selection signal to input data on the 128 bit data line to the data buffer 211 upon writing of 128 bit data, to control the multiplexers 213, 214 or 215, 216 by writing selection signal to input data on the 64 bit data line to the data buffer 211 upon writing of 64 bit data, or to control any one of the multiplexers 213, 214, 215, 216 by a writing selection signal to input data on the 32 bit data line to the data buffer 211 upon writing of 32 bit data. Also, the timing control circuit 212 is also responsive to the 128 bit control command signal, 64 bit control command signal or 32 bit control command signal, to perform control in that, upon reading of 128 bit data, the multiplexer 217 is controlled by 128 bit output selection signal to output 128 bit data to the 128 bit data line, upon reading of 64 bit data, the multiplexer 218 is controlled by 64 bit output selection signal to output 64 bit data to the 64 bit data line, and upon reading of 32 bit data, the multiplexer 219 is controlled by 32 bit output selection signal to output 32 bit data to the 32 bit data line.

Furthermore, upon outputting 128 bit data, the timing control portion 212 outputs 128 bit data valid signal indicating valid period of 128 bit data and 128 bit frame signal indicating that 128 bit data line is active. Upon outputting 64 bit data, the timing control portion 212 outputs 64 bit data valid signal indicating valid period of 64 bit data and 64 bit frame signal indicating that 64 bit data line is active. Upon outputting 32 bit data, the timing control portion 212 outputs 32 bit data valid signal indicating valid period of 32 bit data and 32 bit frame signal indicating that 32 bit data line is active.

FIG. 34 shows a bus construction for transferring signal, such as frame signal, output from both of the bus master unit and the bus slave unit in a plurality of buses forming the bus 203 in the bus connection circuit shown in FIG. 34.

The bus 1301 for transmitting such signal is constructed with multiplexers X17, X18 and X19 and OR circuits O15 and O16.

The 4:1 multiplexer X17 receives Frame32_O and Frame32_OE from the master units M21 and M22 and SDlave units S21 and S22 and selectively outputs the Frame32_O signal on the basis of the Frame32_OE.

The 2:1 multiplexer X19 selectively outputs the frame signal from outside (frame signal from the bus 201 or bus 202) of the bus 1301.

The 2:1 multiplexer X18 supplied one of an output of the multiplexer X17 and an output of the multiplexer X19 to the master unit M21 and M22 and the slave units S21 and S22 on the basis of the outputs of the OR circuit O15 and the OR circuit O16.

FIG. 35 shows a construction of the bus for transmitting the signal, such as address signal, output only from the bus master unit in a plurality of buses forming the bus 203 in the bus connection circuit shown in FIG. 32.

The bus 1302 for transmitting such signal is constructed with the multiplexers X11, X12, X13 and the OR circuits O11 and O12.

For example, 32 bit bus master units M21 and M22 outputs Addr32_O signal as the address signal and Addr_OE signal indicating effectiveness of the Addr32_O signal. By this, the multiplexer M11 selects and outputs only Addr32_O signal which becomes active. This Addr32_O signal is output to the common control command bus together with OR output of Addr_OE signals from the bus master units M21 and M22 in the OR circuit O11.

Furthermore, the multiplexer X13 selects a signal selected among Addr128_O signal from the 128 bit bus and Addr64_O signal from the 64 bit bus by the Addr128_OE signal from the 128 bit bus and the Addr64 —OE signal from the 64 bit bus, and Addr32_O signal selected by the multiplexer X11, by OR output of the Addr128_OE signal from the 128 bit bus and Addr64_OE signal from the 64 bit bus. The selected signal is commonly connected to the 32 bit bus slave units S21 and S22 as $Addr_{13}$ I signal indicating inputting of address.

By performing such manner of connection between the 64 bit master unit, 128 bit bus master unit and 32 bit bus master unit, between 128 bit bus master unit, 32 bit bus master unit and 64 bit bus master unit, the control command can be made common between the bus of 32 bit width, bus of 64 bit width and bus of 128 bit width.

FIG. 36 shows a construction of the bus transmitting the signal, such as Ack signal, output only from the bus slave unit in a plurality of buses forming the bus 203 in the bus connection circuit shown in FIG. 32.

The bus 1303 for transmitting such signal is constructed with the multiplexers X14, X15 and X16 and OR circuits O13 and O14.

For example, when 32 bit bus slave units S21 and S22 output ACK32_O signals indicating permission of transmission, respectively, ACK32_OE signal indicating effectiveness of ACK32_O signal is output simultaneously. By this, the multiplexer X14 outputs only ACK32_O signal which becomes effective. The ACK32_O signal is output to the common control command bus together with OR output of ACK32_OE signals from the bus slave units S21 and S22 of the OR circuit O13.

Furthermore, in the multiplexer X16, a signal selected among ACK128_O signal from the 128 bit bus and ACK64_Osignal from 64 bit bus based on ACK128_OE signal from the 128 bit bus and ACK64_OE signal from the 64 bit bus and the ACK32_O signal selected by the multiplexer X14 based on OR output of the OR circuit O13 and OR output of the OR circuit O14 of ACK128_OE signal from the 128 bit bus and ACK64_OE signal from the 64 bit bus. The selected signal is commonly connected to the bus master units M21 and M22 as ACK_I signal indicating inputting of ACK.

By further establishing such connected between the 64 bit bus master unit, the 128 bit bus master unit and the 32 bit bus master unit and between the 128 bit bus master unit, the 32 bit bus master unit and the 64 bit bus master unit, control command can be made common between the bus of 32 bit width, the bus of 64 bit width and the bus of 128 bit width.

As set forth above, with the shown embodiment of the bus connection circuit, by performing conversion of bus width using one data conversion unit, buses having three different kinds of bus widths with common read data bus and write data bus are mutually connected to permit read access and write access if split transfer. At this time, it becomes unnecessary to perform arbitration of bus right upon transfer across buses and only conversion of data is required, lesser clock cycles are required in read access and write access.

Accordingly, since data transfer from the sender to transmission destination, it is similar to the first embodiment in that loss of data in the sender cannot be caused upon occurrence of data transfer error, and occurrence of data transfer error can be notified to the sender.

Furthermore, control over the detail of the command control signal as required in the conventional bus master control circuit and/or the bus slave control circuit, is unnecessary and is only required the hardware for performing data conversion by extracting conditions requiring data conversion. Therefore, circuit construction can be simplified and necessary hardware amount can be reduced.

The bus connection circuit in this embodiment requires lesser number of bus arbitration, and accordingly reduce delay to shorten occupying period. As a result, throughput of the bus can be improved.

APPLICATION

Next, an information processing system applied the bus system according to the present invention set forth above, and an embodiment of the information processing system including a chip applied the bus system according to the present invention, will be briefly discussed with reference to FIGS. 37 and 38.

It should be noted that like components to respective embodiments set forth about may be identified by like reference numerals. Discussion for those common components will be eliminated for avoiding redundant discussion and whereby for keeping the disclosure simple enough to facilitate clear understanding of the present invention.

Figure 37:
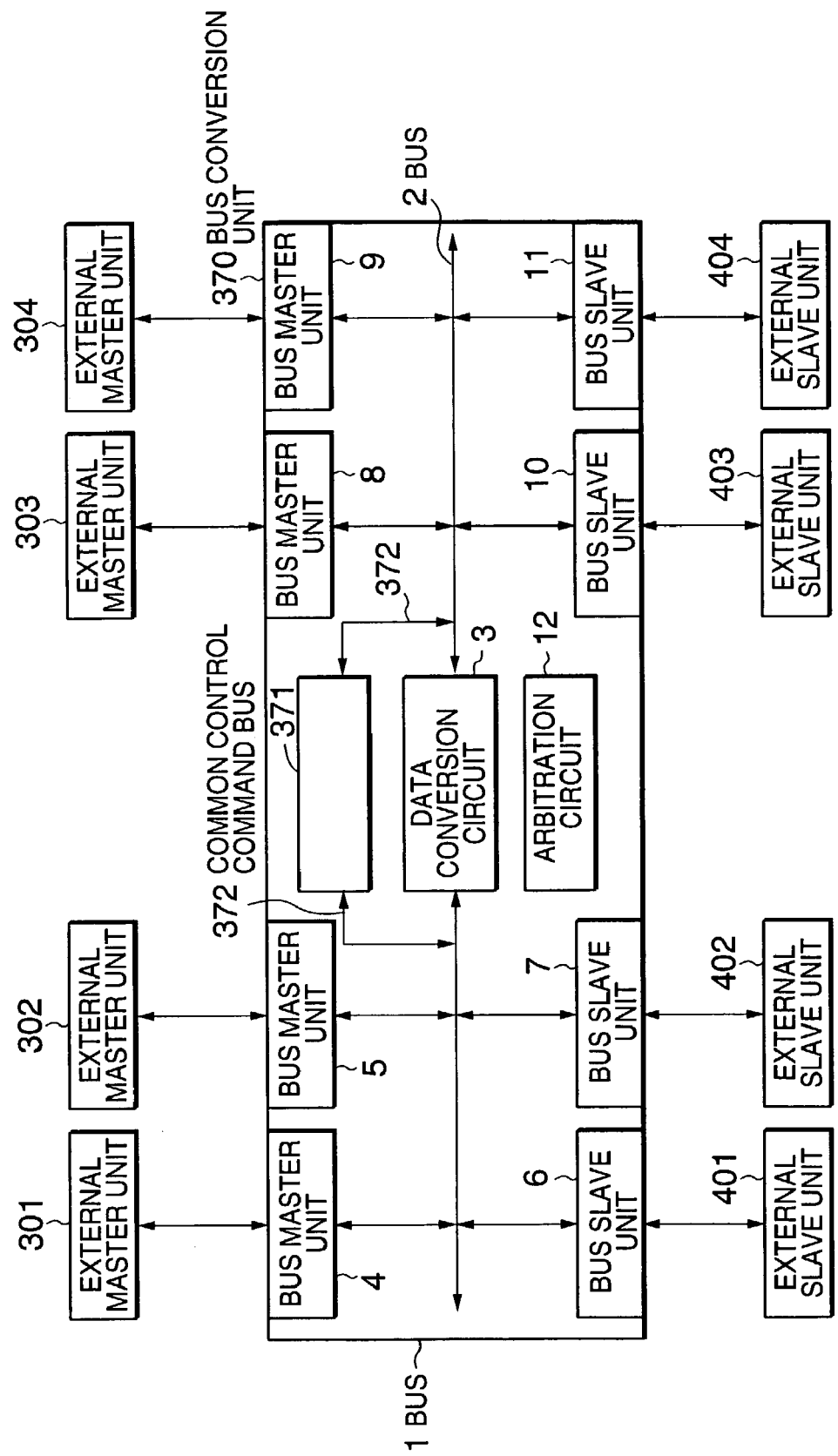
FIG. 37 is a block diagram of an information processing system, to which the bus conversion unit according to the present invention is applied.

FIG. 37 shows an embodiment of the information processing system, to which the bus conversion unit according to the present invention is applied.

The bus conversion unit 370 according to the present invention is constructed with the bus 1, the bus 2. the data conversion unit 3, the bus master units 4, 5, 8 and 9, the bus slave units 6, 7, 10 and 11, arbitration circuit 12, a common control command bus 372, a control command conversion circuit 371. It should be noted that lines between the arbitration circuit, the bus master units and the bus slave units are eliminated from illustration.

To this bus conversion unit 370, external master units 301, 302, 303 and 304 and external slave units 401, 402, 403 and 404 are connected to form the shown embodiment of the information processing system.

Here, when formats of commands on the control command line are different between the bus 1 and the bus 2, a control command conversion circuit 371 is disposed in the common control command bus 372 for accommodating difference in format of the commands by the control command conversion circuit 371.

On the other hand, considering the bus conversion unit 370 as one macro, for the external master unit and the external slave unit, consideration should be given only for interface with the bus master unit and the bus slave unit, and internal circuit construction is not necessary to consider.

On the other hand, the information processing system illustrated in FIG. 37 may be formed on one chip.

As set forth above, when the information processing system is formed on one chip, the following information processing system may also be constructed.

Figure 38:
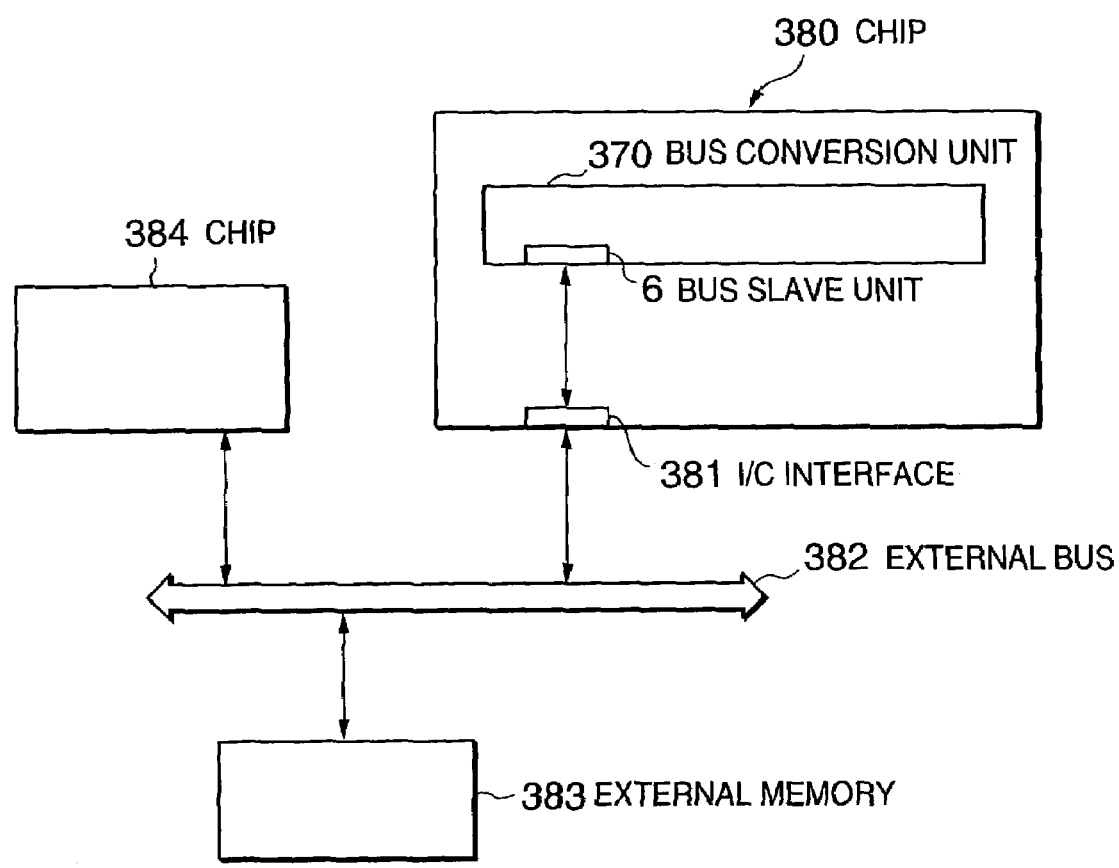
FIG. 38 is a block diagram of an information processing system including a chip, to which the bus conversion unit according to the present invention is applied.
Figure 39:
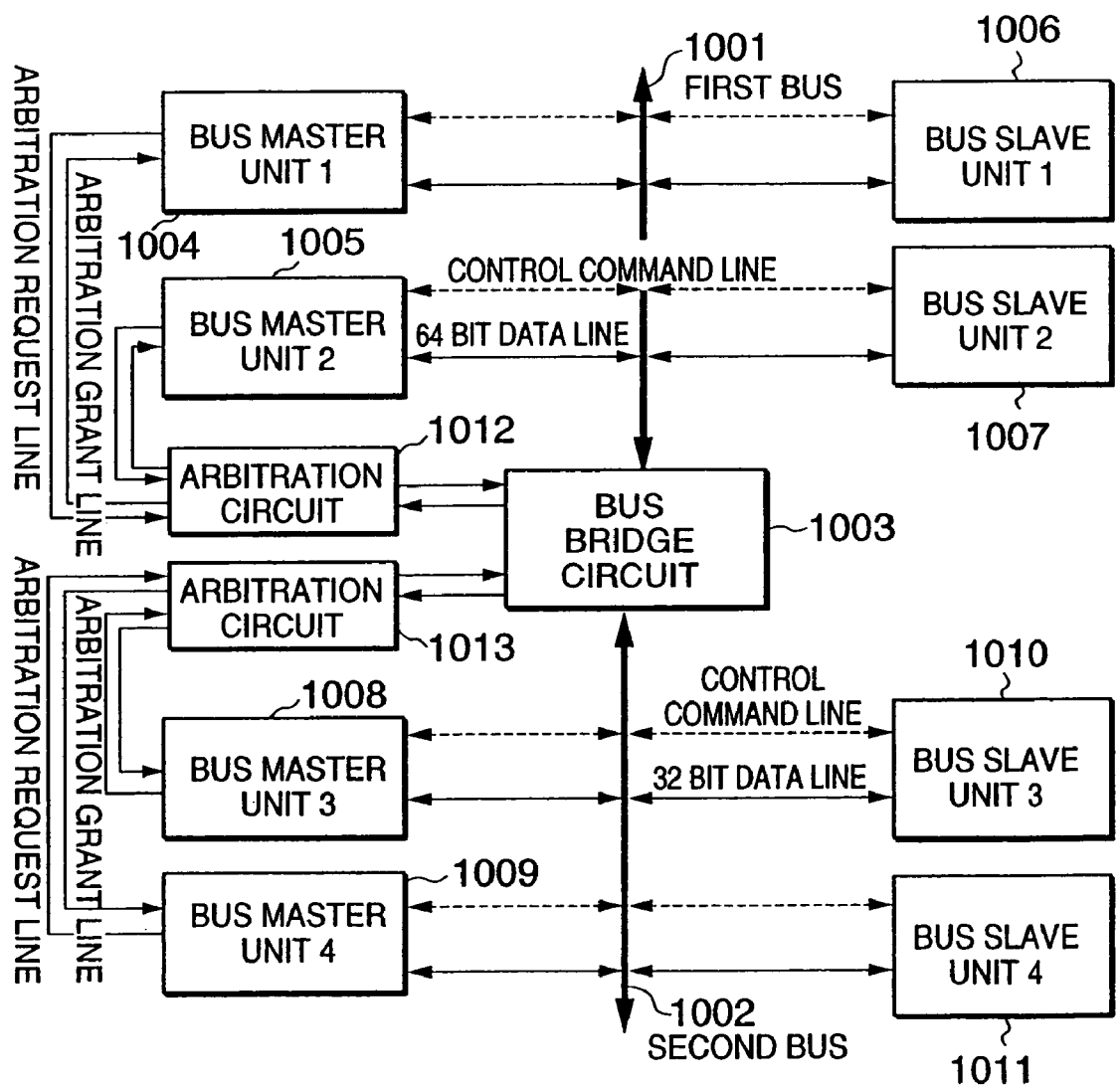
FIG. 39 is a block diagram showing an example of construction of the conventional bridge type bus connection circuit.

As one example of the information processing system, one constructed with a chip 380, an external bus 382, an external memory 383 and a chip 384 is illustrated in FIG. 38.

The chip 380 including the bus conversion unit 370 has an I/O interface 381 connected to the bus slave unit in the bus conversion unit 370. (In FIG. 38, an external slave unit 401 is considered as replaced by the I/O interface 381). The I/O interface 381 connects the external memory 383 and another chip 384 via an external bus 382.

In the shown embodiment, the bus master unit connected to the bus conversion unit can access the external memory 383 and the chip 384 via the bus slave unit 6. At this time, since the bus conversion unit 370 has small latency, the bus conversion unit 370 can access the external memory 383 and the chip 384 as external slave unit at high speed.

On the other hand, it is also possible to connect the chip 380 with the external master unit provided outside of the chip by employing the bus master unit in place of the bus slave unit 6. For example, with taking the chip 384 as the external master unit, it is possible to access to the memory on the chip 380. At this time, the chip 384 may access the memory on the chip 380 at high speed since the latency of the bus conversion unit is small.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

For instance, the logic constructed using the OR circuit employed in the shown embodiments of the present invention is premised on active HIGH. In case of active LOW, it is possible to construct the system with employing AND circuit.

It should be noted that, while the shown system employs the bus slave unit incorporating the address comparison circuit in the embodiment, the address comparison circuit may be provided externally of the bus slave unit.

On the other hand, in the shown embodiment, the timing control portion 22 performs control of bit conversion corresponding to the bus from which the Frame signal and Ack signal are fed in read data transfer from the slave. When the master outputting the Ack signal is to be placed in a condition where it can always receive data, the Ack signal from the master side becomes unnecessary. However, if the Ack signal is not output, the timing control portion 22 cannot see the direction to perform bit conversion to constantly perform bit conversion. In this case, since it becomes unnecessary to wait for the Ack signal, signal transfer can be done at high speed. However, power consumption becomes large. Conversely, when Ack signal on master side is output, system becomes low speed for presence of Ack signal. However, for bit conversion is unnecessary, power consumption can be reduced.

On the other hand, in the shown embodiments, discussion has been given for bus of data transfer between two or three buses having mutually different bit widths. However, the present invention does not limit to the shown embodiment and is applicable upon conversion of bit widths between buses having two or more different bit widths.

On the other hand, even upon connecting buses defined different control commands, the present invention can be applied by connecting the conversion circuits for the control commands to the common control command bus.

Also, while particular constructions of the circuits relating to the bus system have been exemplified in the shown embodiment, it is possible to generate an electronic data expressing the bus system and the circuit structures relating to the chip 380 including bus system, and to store such electronic data in an information storage medium (not shown) as software readable by a computer system.

Furthermore, it is also possible to express a computer program making the computer processing system to simulate the operation of the bus system and the chip 380 including the bus system by a programming language, such as C language or so forth or a hardware description language, such as Verilog-HDL and so forth, and so forth and to store such program in the information storage medium (not shown). It is further possible to for a computer system incorporating the computer program and/or foregoing electronic data in the information storage medium.

The electronic data of the circuit construction in the present invention may be software which permits identifying logic structure of the circuit construction. For example, the electronic data may be net list of circuit system consisted of operation description data, RTL (Register Transfer Level) data, gate level data, transistor level data and so forth.

ON the other hand, the information storage medium in the present invention may be hardware preliminarily storing the computer program for operating the computer system for executing various processes. For example, the information storage medium may be implemented by ROM (Read Only Memory), HDD (Hard Disk Drive), CD (Compact Disk)-ROM exchangeably loaded in the computer system, FD (Floppy Disc-Cartridge) and so forth.

LS1 applied the present invention is applicable for various different actual systems. At this time, as advantages, 1. in the actual system applied the present invention, on the basis of low latency access as particular effect of the bus conversion unit according to the present invention, even in case of access to outside of the chip, latency (number of clock cycles) can be made smaller, and 2. it is only required to perform only interfacing between the bus master unit and the bus slave unit and does not require designing in consideration of the condition of the transfer destination of data, even when LSI is replaced with bus having greater bit width, the chip may be continuously used in the same system.

Furthermore, by providing the bus connection circuit according to the present invention, it becomes possible to construct the information processing system performing arbitrary information process with data on a plurality of buses having different bit widths. Also, the bus connection circuit and the information processing system of the present invention may be constructed as integrated circuit on a semiconductor substrate. Also, these circuit and system information may be stored in the storage medium as electronic data.

As set forth above, in the bus connection circuit and the bus system according to the present invention, it becomes possible to reduce number of times of arbitration operation upon obtaining bus right between a plurality of buses having data lines of different bit widths. Therefore use efficiency of the bus can be improved, and high speed access between the bus master unit and the bus slave unit can be achieved.

Since the present invention is applicable not only for connection of buses having two different bus widths but also for connection for of buses having three or more difference bus widths.

Even upon occurrence of data transfer error, since common control command bus connecting the first bus and the second bus is present, occurrence of data transfer error can be notified from the transfer destination to the sender.

Furthermore, since a plurality of bus master units and the bus slave units can be controlled by the common control circuit, circuit construction can be simplified and necessary hardware amount can be reduced.

What is claimed is:

1. A bus system comprising:

a common control command bus commonly connecting control command lines of a plurality of buses having data lines of different bit widths, said common control command bus transmitting the same command data as a portion of the command data transmitted by the control command lines of the plurality of buses; and data converting means to which data lines of said plurality of buses are connected, for performing conversion of bit width between said data lines of different bit widths, for performing conversion of bit width between a plurality of buses having different bit widths in the same bus cycle, the common control command bus bypassing the data converting means, which further comprises a master side interface means including:

a bus command buffer holding address indicative of the bus slave unit and command from the external master unit;

first multiplexer means for controlling output of address and command from said bus command buffer and identification information indicative of the master side interface means to the common control command bus;

a bus write data buffer holding a part or all of write data from said external master unit;

second multiplexer means for controlling output of write data from said bus write data buffer to the bus;

a bus read data buffer for holding a part or all of read data from the bus;

timing control means for outputting a transfer start signal in response to a transfer request signal from the external master unit and outputting a completion signal to said external master unit;

comparing means for detecting matching of identification information indicative of said master side interface means and identification information from the bus; and a bus master control circuit responsive to detection of matching in said comparing means to output the arbitration request signal, upon reception of the arbitration grant signal, controlling said first multiplexer means for outputting to the common control command bus and outputting a write permission signal to permit writing of the read data from the but to said bus read data buffer, responsive to said transfer start signal from said timing control circuit, to permit said second multiplexer to read the write data from said bus write data buffer to the bus.

2. A bus system comprising:

a first bus connected to first interface means via a first control command line of said first bus transmitting at least an address and a first data line of said first bus having first bit width;

a second bus connected to second interface means via a second control command line of said second bus transmitting at least an address and a second data line of said second bus having second bit width;

a common control command bus commonly connecting said first and second control command lines and transmitting common command information;

data conversion means performing conversion of bit width between said data lines having different bit widths; and a single arbitration circuit granting bus right for both of said first and second buses at one time in response to an arbitration request from said first or second interface means, the common control command bus bypassing the data conversion means, which further comprises a master side interface means including:

a bus command buffer holding address indicative of the bus slave unit and command from the external master unit;

first multiplexer means for controlling output of address and command from said bus command buffer and identification information indicative of the master side interface means to the common control command bus;

a bus write data buffer holding a part or all of write data from said external master unit; second multiplexer means for controlling output of write data from said bus write data buffer to the bus;

a bus read data buffer for holding a part or all of read data from the bus;

timing control means for outputting a transfer start signal in response to a transfer request signal from the external master unit and outputting a completion signal to said external master unit;

comparing means for detecting matching of identification information indicative of said master side interface means and identification information from the bus; and a bus master control circuit responsive to detection of matching in said comparing means to output the arbitration request signal, upon reception of the arbitration grant signal, controlling said first multiplexer means for outputting to the common control command bus and outputting a write permission signal to permit writing of the read data from the but to said bus read data buffer, responsive to said transfer start signal from said timing control circuit, to permit said second multiplexer to read the write data from said bus write data buffer to the bus.

3. A bus system comprising:

a first write bus connected to first interface means via a first write control command line of said first write bus transmitting at least an address and a write data line of said first write bus having first bit width;

a first read bus connected to said first interface means via a first read control command line of said first read bus transmitting at least an address and a read data line of said first read bus having the first bit width;

a second write bus connected to second interface means via a second write control command line of said second write bus transmitting at least an address and a write data line of said second write bus having second bit width;

a second read bus connected to said second interface means via a second read control command line of said second read bus transmitting at least an address and a read data line of said second read bus having the second bit width;

a first common control command bus commonly connecting said first write control command line and said second write control command line;

a second common control command bus commonly connecting said first read control command line and said second read control command line;

a write data conversion circuit to which said first write bus and said second write bus are connected and performing conversion of bit width between these write buses;

a read data conversion circuit to which said first read bus and said second read bus are connected and performing conversion of bit width between these read buses;

a first single arbitration circuit granting bus right for both of said first and second write buses at one time in response to a demand from said first or second interfaces; and a second single arbitration circuit granting bus right for both of said first and second read buses at one time in response to a demand from said first or second interfaces, said first common control command bus bypassing said write data conversion circuit and said second common control command bus bypassing said read data conversion circuit, which further comprises a master side interface means including:

a bus command buffer holding address indicative of the bus slave unit and command from the external master unit;

first multiplexer means for controlling output of address and command from said bus command buffer and identification information indicative of the master side interface means to the common control command bus;

a bus write data buffer holding a part or all of write data from said external master unit;

second multiplexer means for controlling output of write data from said bus write data buffar to the bus;

a bus read data buffer for holding a part or all of read data from the bus;

timing control means for outputting a transfer start signal in response to a transfer request signal from the external master unit and outputting a completion signal to said external master unit;

comparing means for detecting matching of identification information indicative of said master side interface means and identification information from the bus; and a bus master control circuit responsive to detection of matching in said comparing means to output the arbitration request signal, upon reception of the arbitration grant signal, controlling said first multiplexer means for outputting to the common control command bus and outputting a write responsive to said transfer start signal from said timing control circuit, to permit said second multiplexer to read the write data from said bus write data buffer to the bus.

4. A bus system comprising:

n in number of buses connecting master side interface means and slave side interface means via control command lines of said n in number of buses transmitting at least an address and data lines of said n in number of buses having mutually different bit widths;

a common control command bus commonly connecting respective control command lines of n in number of buses;

a data conversion circuit connected to data lines of respective of n in number of buses and performing conversion of bit width between different bit widths; and a single arbitration circuit granting bus right for both of at least two of said n in number of buses at one time, the common control command bus bypassing the data conversion circuit, wherein said master side interface means comprises;

a bus command buffer holding address indicative of the bus slave unit and command from the external master unit;

first multiplexer means for controlling output of address and command from said bus command buffer and identification information indicative of the master side interface means to the common control command bus;

a bus write data buffer holding a part or all of write data from said external master unit;

second multiplexer means for controlling output of write data from said bus write data buffer to the bus;

a bus read data buffer for holding a part or all of read data from the bus;

timing control means for outputting a transfer start signal in response to a transfer request signal from the external master unit and outputting a completion signal to said external master unit;

comparing means for detecting matching of identification information indicative of said master side interface means and identification information from the bus; and a bus master control circuit responsive to detection of matching in said comparing means to output the arbitration request signal, upon reception of the arbitration grant signal, controlling said first multiplexer means for outputting to the common control command bus and outputting a write permission signal to permit writing of the read data from the but to said bus read data buffer, responsive to said transfer start signal from said timing control circuit, to permit said second multiplexer to read the write data from said bus write data buffer to the bus.

5. A bus system comprising:

a common control command bus commonly connecting control command lines of a plurality of buses having data lines of different bit widths, said common control command bus transmitting the same command data as a portion of the command data transmitted by the control command lines of the plurality of buses; and data converting means to which data lines of said plurality of buses are connected, for performing conversion of bit width between said data lines of different bit widths, for performing conversion of bit width between a plurality of buses having different bit widths in the same bus cycle, the common control command bus bypassing the data converting means, which further comprises slave side interface means including:

a bus command buffer holding command and address indicative of the bus slave unit from the common control command bus and identification information indicative of the master side interface means;

a bus write buffer holding write data from the bus;

a bus read data buffer holding a part or all of read data from the external slave unit;

multiplexer means controlling outputting of read data from said bus read data buffer;

comparing means for detecting matching of address assigned to the external slave unit and address from the common control command bus;

a timing control circuit responsive to detection of matching in said comparing means to output write permission signal to permit writing of the write data to said bus write data buffer, outputting a transfer request signal to said external slave unit in response to said transfer start signal, and outputting the transfer start signal of read data in response to reception of the completion signal from said external slave unit; and a bus slave control circuit outputting a read permission signal in response to the transfer start signal of read data to permit said multiplexer to output read data to the bus.

6. A bus system comprising:

a first bus connected to first interface means via a first control command line of said first bus transmitting at least an address and a first data line of said first bus having first bit width;

a second bus connected to second interface means via a second control command line of said second bus transmitting at least an address and a second data line of said second bus having second bit width;

a common control command bus commonly connecting said first and second control command lines and transmitting common command information;

data conversion means performing conversion of bit width between said data lines having different bit widths; and a single arbitration circuit granting bus right for both of said first and second buses at one time in response to an arbitration request from said first or second interface means, the common control command bus bypassing the data conversion means, which further comprises slave side interface means including:

a bus command buffer holding command and address indicative of the bus slave unit from the common control command bus and identification information indicative of the master side interface means;

a bus write buffer holding write data from the bus;

a bus read data buffer holding a part or all of read data from the external slave unit;

multiplexer means controlling outputting of read data from said bus read data buffer;

comparing means for detecting matching of address assigned to the external slave unit and address from the common control command bus;

a timing control circuit responsive to detection of matching in said comparing means to output write permission signal to permit writing of the write data to said bus write data buffer, outputting a transfer request signal to said external slave unit in response to said transfer start signal, and outputting the transfer start signal of read data in response to reception of the completion signal from said external slave unit; and
a bus slave control circuit outputting a read permission signal in response to the transfer start signal of read data to permit said multiplexer to output read data to the bus.

7. A bus system comprising:
a first write bus connected to first interface means via a first write control command line of said first write bus transmitting at least an address and a write data line of said first write bus having first bit width;
a first read bus connected to said first interface means via a first read control command line of said first read bus transmitting at least an address and a read data line of said first read bus having the first bit width;
a second write bus connected to second interface means via a second write control command line of said second write bus transmitting at least an address and a write data line of said second write bus having second bit width;
a second read bus connected to said second interface means via a second read control command line of said second read bus transmitting at least an address and a read data line of said second read bus having the second bit width;
a first common control command bus commonly connecting said first write control command line and said second write control command line;
a second common control command bus commonly connecting said first read control command line and said second read control command line;
a write data conversion circuit to which said first write bus and said second write bus are connected and performing conversion of bit width between these write buses;
a read data conversion circuit to which said first read bus and said second read bus are connected and performing conversion of bit width between these read buses;
a first single arbitration circuit granting bus right for both of said first and second write buses at one time in response to a demand from said first or second interfaces; and
a second single arbitration circuit granting bus right for both of said first and second read buses at one time in response to a demand from said first or second interfaces,
said first common control command bus bypassing said write data conversion circuit and said second common control command bus bypassing said read data conversion circuit,
which further comprises slave side interface means including:
a bus command buffer holding command and address indicative of the bus slave unit from the common control command bus and identification information indicative of the master side interface means;
a bus write buffer holding write data from the bus;
a bus read data buffer holding a part or all of read data from the external slave unit;
multiplexer means controlling outputting of read data from said bus read data buffer;
comparing means for detecting matching of address assigned to the external slave unit and address from the common control command bus;
a timing control circuit responsive to detection of matching in said comparing means to output write permission signal to permit writing of the write data to said bus write data buffer, outputting a transfer request signal to said external slave unit in response to said transfer start signal, and outputting the transfer start signal of read data in response to reception of the completion signal from said external slave unit; and
a bus slave control circuit outputting a read permission signal in response to the transfer start signal of read data to permit said multiplexer to output read data to the bus.

8. A bus system comprising:
n in number of buses connecting master side interface means and slave side interface means via control command lines of said n in number of buses transmitting at least an address and data lines of said n in number of buses having mutually different bit widths;
a common control command bus commonly connecting respective control command lines of n in number of buses;
a data conversion circuit connected to data lines of respective of n in number of buses and performing conversion of bit width between different bit widths; and
a single arbitration circuit granting bus right for both of at least two of said n in number of buses at one time,
the common control command bus bypassing the data conversion circuit,
wherein said slave side interface means comprises;
a bus command buffer holding command and address indicative of the bus slave unit from the common control command bus and identification information indicative of the master side interface means;
a bus write buffer holding write data from the bus;
a bus read data buffer holding a part or all of read data from the external slave unit;
multiplexer means controlling outputting of read data from said bus read data buffer;
comparing means for detecting matching of address assigned to the external slave unit and address from the common control command bus;
a timing control circuit responsive to detection of matching in said comparing means to output write permission signal to permit writing of the write data to said bus write data buffer, outputting a transfer request signal to said external slave unit in response to said transfer start signal, and outputting the transfer start signal of read data in response to reception of the completion signal from said external slave unit; and
a bus slave control circuit outputting a read permission signal in response to the transfer start signal of read data to permit said multiplexer to output read data to the bus.

* * * * *